(12) United States Patent
Tan et al.

(10) Patent No.: US 10,437,481 B2
(45) Date of Patent: Oct. 8, 2019

(54) DATA ACCESS METHOD AND RELATED APPARATUS AND SYSTEM

(71) Applicant: Huawei Technologies Co., Ltd., Shenzhen (CN)

(72) Inventors: Chunyi Tan, Chengdu (CN); Jinshui Liu, Plano, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 15/815,280

(22) Filed: Nov. 16, 2017

(65) Prior Publication Data

US 2018/0081565 A1 Mar. 22, 2018

Related U.S. Application Data

(63) Continuation of application No. PCT/CN2016/085759, filed on Jun. 14, 2016.

(51) Int. Cl.
*G06F 12/00* (2006.01)
*G06F 3/06* (2006.01)
(Continued)

(52) U.S. Cl.
CPC .......... *G06F 3/0611* (2013.01); *G06F 3/0656* (2013.01); *G06F 3/0659* (2013.01);
(Continued)

(58) Field of Classification Search
None
See application file for complete search history.

(56) References Cited

U.S. PATENT DOCUMENTS 8,819,335 B1 8/2014 Salessi et al.
2014/0129753 A1* 5/2014 Schuette ............ G06F 13/4068
710/301
(Continued)

FOREIGN PATENT DOCUMENTS

CN 103955440 A 7/2014
CN 104182508 A 12/2014
(Continued)

OTHER PUBLICATIONS

Machine Translation and Abstract of Chinese Publication No. CN104182508, Dec. 3, 2014, 14 pages.
(Continued)

*Primary Examiner* — John A Lane
(74) *Attorney, Agent, or Firm* — Conley Rose, P.C.

(57) ABSTRACT

A data access method and a related apparatus and system, where the data access method includes receiving, by a non-volatile memory express (NVMe) from a processor, a first key-value command whose format meets an NVMe interface standard, where the first key-value command carries a first operation manner indicator and a first operation object type indicator, and an operation object type indicated by the first operation object type indicator includes a value, obtaining, by the NVMe, N keys corresponding to the first key-value command, and performing, by the NVMe on a value corresponding to each of the N keys, an operation indicated by the first operation manner indicator. Hence, the data access method is helpful in promoting a data access manner in an NVMe technology.

30 Claims, 45 Drawing Sheets

(51) Int. Cl.
*G06F 13/40* (2006.01)
*G06F 13/42* (2006.01)

(52) U.S. Cl.
CPC .......... *G06F 3/0679* (2013.01); *G06F 3/0688* (2013.01); *G06F 13/4022* (2013.01); *G06F 13/4282* (2013.01); *G06F 2213/0026* (2013.01)

(56) References Cited

U.S. PATENT DOCUMENTS

| | | | |
|---|---|---|---|
| 2015/0370700 A1 | 12/2015 | Sabol et al. | |
| 2016/0299688 A1* | 10/2016 | Devendrappa | G06F 3/061 |
| 2016/0314822 A1* | 10/2016 | Yeung | G06F 13/16 |
| 2017/0109041 A1* | 4/2017 | Qiu | G06F 3/0619 |
| 2017/0109096 A1* | 4/2017 | Jean | G06F 3/0659 |
| 2018/0107467 A1* | 4/2018 | Yang | G06F 8/40 |
| 2018/0157419 A1* | 6/2018 | Ki | G06F 3/0638 |
| 2018/0203734 A1* | 7/2018 | Lowery | G06F 9/50 |
| 2018/0253386 A1* | 9/2018 | Qiu | G06F 3/061 |

FOREIGN PATENT DOCUMENTS

| | | |
|---|---|---|
| CN | 105094707 A | 11/2015 |
| WO | 2015088837 A1 | 6/2015 |

OTHER PUBLICATIONS

Machine Translation and Abstract of Chinese Publication No. CN105094707, Nov. 25, 2015, 26 pages.
"NVM Express," NVM, Revision 1.2, Nov. 3, 2014, 205 pages.
Foreign Communication From a Counterpart Application, PCT Application No. PCT/CN2016/085759, International Search Report dated Feb. 5, 2017, 4 pages.
Foreign Communication From a Counterpart Application, European Application No. 16874090.0, Extended European Search Report dated Nov. 6, 2017, 12 pages.
Machine Translation and Abstract of Chinese Publication No. CN103955440, Jul. 30, 2014, 11 pages.

* cited by examiner

| Opcode (07) | Opcode (06:02) | Opcode (01:00) | Opcode | Command | Description |
|---|---|---|---|---|---|
| Standard Command | Function | Data transfer direction | | | |
| 0b | 000 00b | 00b | 00h | Flush | Refer to an NVMe standard |
| 0b | 000 00b | 01b | 01h | Write | Refer to the NVMe standard |
| 0b | 000 00b | 10b | 02h | Read | Refer to the NVMe standard |
| 0b | 000 01b | 00b | 04h | Write Uncorrectable | Refer to the NVMe standard |
| 0b | 000 01b | 01b | 05h | Compare | Refer to the NVMe standard |
| 0b | 000 10b | 00b | 08h | Write Zeroes | Refer to the NVMe standard |
| 0b | 000 10b | 01b | 09h | Dataset Management | Refer to the NVMe standard |
| 0b | 000 11b | 01b | 0Dh | Reservation Register | Refer to the NVMe standard |
| 0b | 000 11b | 10b | 0Eh | Reservation Report | Refer to the NVMe standard |
| 0b | 001 00b | 01b | 11h | Reservation Acquire | Refer to the NVMe standard |
| 0b | 001 01b | 01b | 15h | Reservation Release | Refer to the NVMe standard |
| 0b | 010 00b | 00b | 40h | Kget | Obtain a value or metadata or both that are corresponding to one key |
| 0b | 010 00b | 01b | 41h | Kput | Write a value or metadata or both that are corresponding to one key |
| 0b | 010 00b | 10b | 42h | Kdel | Delete a value or metadata or both that are corresponding to one key |
| 0b | 010 00b | 11b | 43h | Kmget | Obtain values or metadata or both that are corresponding to multiple keys |
| 0b | 010 01b | 00b | 44h | Kmput | Write values or metadata or both that are corresponding to multiple keys |
| 0b | 010 10b | 00b | 48h | Kmdel | Delete values or metadata or both that are corresponding to multiple keys |
| 0b | 010 10b | 01b | 49h | Kkeylist | Obtain a key list according to a traversal rule |

FIG. 3A

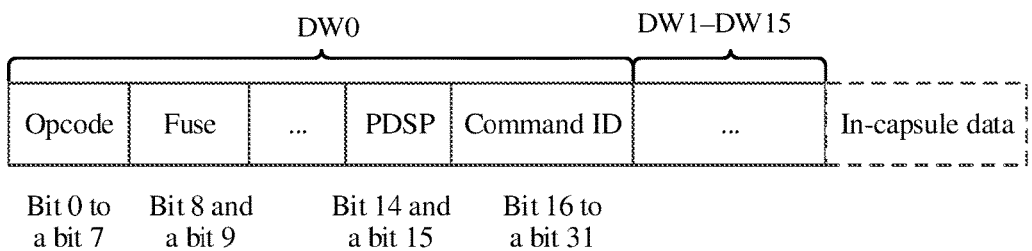

FIG. 3B

DATA ACCESS METHOD AND RELATED APPARATUS AND SYSTEM

CROSS-REFERENCE TO RELATED APPLICATION

This application is a continuation of International Patent Application No. PCT/CN2016/085759 filed on Jun. 14, 2016, which is hereby incorporated by reference in its entirety.

TECHNICAL FIELD

The present disclosure relates to the field of computer technologies, and in particular, to a data access method, a related apparatus, and a related system.

BACKGROUND

In the past two years, an information technology (IT) industry has been transferred, at an accelerating pace, to the third platform represented by cloud computing, the mobile Internet, big data, and social media. Core technologies of the third platform are cloud computing, software definition, and big data. In a storage field, this is represented as follows. A proportion of Not Only structured query language (SQL) database applications greatly increases, but an increase in conventional SQL database applications comes to a standstill.

A Non-Volatile Memory Express (NVMe) device has quite high storage performance. Some high-performance and high-scalability storage technologies are required to develop big data. NVMe over Fabrics (NoF) is generated due to the requirement. As an interface standard for solid state drives (SSD), NVMe generally supports only Peripheral Component Interconnect Express (PCIe), and NVMe becomes NoF when being extended to a network (Fabric). With NoF, a storage device can provide, over a network, a storage service that is comparable in performance to a local SSD.

A conventional NoF technology and NVMe technology also support only a block-based access manner. Because the conventional NoF technology and NVMe technology have a capability of supporting a single access manner, this greatly limits application scopes of the NoF technology and the NVMe technology.

SUMMARY

Embodiments of the present disclosure provide a data access method and a related apparatus and system.

A first aspect of the embodiments of the present disclosure provides a data access method, including receiving, by an NVMe from a processor, a first key-value command whose format meets an NVMe interface standard, where the first key-value command carries a first operation manner indicator and a first operation object type indicator, and an operation object type indicated by the first operation object type indicator includes a value, obtaining N keys corresponding to the first key-value command, and performing, on a value corresponding to each of the N keys, an operation indicated by the first operation manner indicator.

N is an integer greater than or equal to 1.

For example, N may be 1, 2, 3, 4, 5, 6, 7, 9, 10, 15, 51, 80, 97, 100, or another value.

The NVMe and the processor belong to one computer device. The computer device may be a desktop personal computer, a notebook personal computer, a server, or a computer device of another type. The NVMe may be considered as a storage service provision device, and the processor may be considered as a storage service requesting device. The NVMe includes a non-volatile memory (NVM) and an NVMe controller (the NVMe controller of the NVMe may be referred to as a controller).

The foregoing key-value command whose format meets the NVMe standard is, for example, any one of the following key-value commands: a key-value command for requesting to obtain a value and/or metadata, a key-value command for requesting to write a key, a value, and/or metadata, or a key-value command for requesting to delete a key, a value, and/or metadata.

When N is equal to 1, performing, on a value corresponding to each of the N keys, an operation indicated by the first operation manner indicator is performing, on a value corresponding to one key, an operation indicated by the first operation manner indicator.

It may be learned that in technical solutions in some embodiments of the present disclosure, a key-value command whose format meets an NVMe interface standard is innovatively introduced, that is, the key-value command and the NVMe interface standard are organically integrated such that it is possible that an NVMe that can support the NVMe interface standard identifies and executes the key-value command. When receiving the key-value command whose format meets the NVMe interface standard, the NVMe obtains N keys corresponding to the key-value command, and performs, on a value corresponding to each of the N keys, an operation corresponding to the key-value command. The new access mechanism expands an access manner supporting capability of an NVMe technology such that the NVMe technology can support a key-value access manner in addition to a conventional block-based access manner, further, an application scope of the NVMe technology is expanded, and further, new requirements such as a big data application are better met.

Optionally, in some possible implementation manners of the present disclosure, the first key-value command further carries the N keys, and obtaining N keys corresponding to the first key-value command may include obtaining, by parsing the first key-value command, the N keys carried in the key-value command.

It may be understood that N keys are directly carried in a key-value command such that a quantity of times of accessing a memory by an NVMe is reduced.

Optionally, in some possible implementation manners of the present disclosure, the first key-value command further carries N key pointers, and obtaining N keys corresponding to the first key-value command may include obtaining, (for example, in a direct memory access (DMA) manner), the N keys corresponding to the first key-value command from buffers to which the N key pointers point.

It may be understood that N key pointers are carried in a key-value command such that an indication capability of the key-value command is enhanced. Because a key pointer is generally smaller than a key, carrying N key pointers helps indicate more keys.

Optionally, in some possible implementation manners of the present disclosure, the first key-value command further carries N value pointers, and the operation indicated by the first operation manner indicator is an obtain operation.

Performing, on a value corresponding to each of the N keys, an operation indicated by the first operation manner indicator includes obtaining N values corresponding to the N keys from the NVM of the NVMe, and writing all of the obtained N values into buffers to which different value pointers in the N value pointers point, where a value in the N values corresponding to a key-i is written into a buffer to which a value pointer in the N value pointers corresponding to the key-i points, and the key-i is any one of the N keys.

It may be understood that the obtaining mechanism described as an example above helps assist a processor in quickly obtaining required values and the like from an NVMe by batch.

Optionally, in some possible implementation manners of the present disclosure, before the first key-value command is received, the method further includes receiving, by the NVMe, a second key-value command whose format meets the NVMe interface standard, where the second key-value carries a second operation manner indicator and a second operation object type indicator, an operation indicated by the second operation manner indicator is an obtain operation, an operation object type indicated by the second operation object type indicator includes metadata of a value, and the second key-value command further carries N metadata pointers, obtaining, by the NVMe (for example, in a DMA manner), N keys from buffers to which the N key pointers point when the second key-value command further carries N key pointers, or obtaining, by the NVMe by parsing the second key-value command, the N keys carried in the second key-value command when the second key-value command further carries N keys, searching, by the NVMe, the NVM of the NVMe for metadata of N values corresponding to the N keys, and writing, by the NVMe, the metadata of all of the N values into buffers to which different metadata pointers in the N metadata pointers point, where metadata that is of a value corresponding to a key-i and that is in the metadata of the N values is written into a buffer to which a metadata pointer in the N metadata pointers corresponding to the key-i points, and the metadata of the value corresponding to the key-i includes length information of the value corresponding to the key-i.

Accordingly, a processor may allocate, based on, for example, length information of a value corresponding to a key-i, a buffer that quite matches a value length requirement to the value corresponding to the key-i. The mechanism helps assist the processor in properly and effectively allocating a buffer.

Optionally, in some possible implementation manners of the present disclosure, the operation indicated by the first operation manner indicator is a write operation, and the first key-value command further carries N value pointers or N values.

When the first key-value command further carries the N value pointers, performing, on a value corresponding to each of the N keys, an operation indicated by the first operation manner indicator includes obtaining N values corresponding to the N keys from buffers to which the N value pointers carried in the first key-value command point, and writing the N values into the NVM of the NVMe, or performing, on a value corresponding to each of the N keys, an operation indicated by the first operation manner indicator when the first key-value command further carries the N values includes obtaining, by parsing the first key-value command, the N values carried in the first key-value command, and writing the N values into the NVM of the NVMe.

It may be understood that the writing mechanism described as an example above helps assist a processor in quickly writing values and the like into an NVMe by batch.

Optionally, in some possible implementation manners of the present disclosure, the operation indicated by the first operation manner indicator is a delete operation, and performing, on a value corresponding to each of the N keys, an operation indicated by the first operation manner indicator includes deleting values corresponding to the N keys from the NVM of the NVMe.

It may be understood that the writing mechanism described as an example above helps assist a processor in quickly deleting values and the like from an NVMe by batch.

Optionally, in some possible implementation manners of the present disclosure, before the key-value command whose format meets the NVMe interface standard is received from the processor, the method further includes receiving, by the NVMe, a third command whose format meets the NVMe interface standard, where the third command carries a third operation manner indicator and a third operation object type indicator, an operation indicated by the third operation manner indicator is an obtain operation, an operation object type indicated by the third operation object indicator includes a key, and the third command further carries a key set pointer, obtaining, (for example, in a DMA manner), a key set traversal rule from a buffer to which the rule pointer points when the third command further carries a rule pointer, or obtaining, by parsing the third command, the key set traversal rule carried in the third command when the third command further carries a key set traversal rule, obtaining a key set from the NVM of the NVMe based on the key set traversal rule, and writing the obtained key set into a buffer to which the key set pointer points, where some or all of the N keys are some or all keys in the key set.

The key set may be recorded in a list form or another form (the key set may include one or more keys). The key set traversal rule may be described using a regular expression or in another form.

It may be understood that required keys can be quickly obtained by batch using the key set obtaining mechanism described as an example above.

A second aspect of the embodiments of the present disclosure provides a data access method, including receiving, by a target from an initiator, a first key-value command whose format meets an NVMe interface standard, where the first key-value command carries a first operation manner indicator and a first operation object type indicator, and an operation object type indicated by the first operation object type indicator includes a value, obtaining N keys corresponding to the first key-value command, where N is an integer greater than or equal to 1, and performing, on a value corresponding to each of the N keys, an operation indicated by the first operation manner indicator.

N is an integer greater than or equal to 1.

For example, N may be 1, 2, 3, 4, 5, 6, 7, 9, 10, 13, 52, 80, 97, 101, or another value.

Both the initiator and the target are computer devices. The initiator may be a desktop personal computer, a notebook personal computer, a server, or a computer device of another type. The target may be, for example, a storage server, a storage array, a storage cloud, or a computer device of another type. The target may be considered as a storage service provision device, and the initiator may be considered as a storage service requesting device.

The target includes a network adapter, an NVM, an NVMe controller (the NVMe controller of the target may be referred to as a controller), and the like. The network adapter and the NVMe controller may be collectively referred to as an NoF controller, and the NVMe controller and the network adapter may even be integrated.

It may be seen that in technical solutions in some embodiments of the present disclosure, a key-value command whose format meets an NVMe interface standard is innovatively introduced, that is, the key-value command and the NVMe interface standard are organically integrated such that it is possible that a target that can support the NVMe interface standard identifies and executes the key-value command. When receiving the key-value command whose format meets the NVMe interface standard, the target obtains N keys corresponding to the key-value command, and performs, on a value corresponding to each of the N keys, an operation corresponding to the key-value command. The new access mechanism expands an access manner supporting capability of an NoF technology such that the NoF technology can support a key-value access manner in addition to a conventional block-based access manner, further, an application scope of the NoF technology is expanded, and further, new requirements such as a big data application and cloud storage are better met.

Optionally, in some possible implementation manners of the present disclosure, the first key-value command further carries the N keys or N key pointers or pointers that point to N key pointers.

When the first key-value command further carries the pointers that point to the N key pointers, obtaining N keys corresponding to the first key-value command includes obtaining the N key pointers from buffers of the initiator or in-capsule data of the first key-value command based on the pointers that point to the N key pointers and that are carried in the first key-value command, and obtaining the N keys corresponding to the first key-value command from buffers that are of the initiator and to which the N key pointers point, obtaining N keys corresponding to the first key-value command when the first key-value command carries the N key pointers includes obtaining, by parsing the first key-value command, the N key pointers carried in the first key-value command, and obtaining the N keys corresponding to the first key-value command from buffers that are of the initiator and to which the N key pointers point, or obtaining N keys corresponding to the first key-value command when the first key-value command carries the N keys includes obtaining, by parsing the first key-value command, the N keys carried in the first key-value command.

It may be understood that N keys are directly carried in a key-value command such that a quantity of times of accessing a memory of an initiator by a target is reduced. However, N key pointers or pointers that point to N key pointers are carried in a key-value command such that an indication capability of the key-value command is enhanced. Because a key pointer is generally smaller than a key, carrying N key pointers helps indicate more keys.

Optionally, in some possible implementation manners of the present disclosure, the operation indicated by the first operation manner indicator is an obtain operation, and the first key-value command further carries N value pointers or pointers that point to N value pointers.

The method further includes obtaining, by the target by parsing the first key-value command, the N value pointers carried in the first key-value command when the first key-value command further carries the N value pointers, or obtaining, by the target, the N value pointers from buffers of the initiator or the in-capsule data of the first key-value command based on the pointers that point to the N value pointers and that are carried in the first key-value command when the first key-value command further carries the pointers that point to the N value pointers, and performing, on a value corresponding to each of the N keys, an operation indicated by the first operation manner indicator includes obtaining N values corresponding to the N keys from the NVM of the target, and writing all of the obtained N values into buffers that are of the initiator and to which different value pointers in the N value pointers point, where a value in the N values corresponding to a key-i is written into a buffer that is of the initiator and to which a value pointer in the N value pointers corresponding to the key-i points, and the key-i is any one of the N keys.

It may be understood that required keys can be quickly obtained by batch using the key set obtaining mechanism described as an example above.

Optionally, in some possible implementation manners of the present disclosure, before the first key-value command is received, the method further includes receiving, by the target, a fourth key-value command whose format meets the NVMe interface standard, where the fourth key-value command carries a fourth operation manner indicator and a fourth operation object type indicator, an operation indicated by the fourth operation manner indicator is an obtain operation, and an operation object type indicated by the fourth operation object type indicator includes metadata of a value, obtaining, by parsing the fourth key-value command, the N keys carried in the fourth key-value command when the fourth key-value command further carries N keys, or obtaining, by parsing the fourth key-value command, the N key pointers carried in the fourth key-value command, and obtaining the N keys from buffers that are of the initiator and to which the N key pointers point when the fourth key-value command further carries N key pointers, obtaining the N key pointers from buffers of the initiator or in-capsule data of the fourth key-value command based on the pointers that point to the N key pointers and that are carried in the fourth key-value command, and obtaining the N keys from buffers that are of the initiator and to which the N key pointers point when the fourth key-value command carries pointers that point to N key pointers, obtaining, by parsing the fourth key-value command, the N metadata pointers carried in the fourth key-value command when the fourth key-value command further carries N metadata pointers, or obtaining the N metadata pointers from buffers of the initiator or the in-capsule data of the fourth key-value command based on the pointers that point to the N metadata pointers and that are carried in the fourth key-value command when the fourth key-value command further carries pointers that point to N metadata pointers, and searching the NVM of the target for metadata of N values corresponding to the N keys, and writing the metadata of all of the N values into buffers that are of the initiator and to which different metadata pointers in the N metadata pointers point, where metadata that is of a value corresponding to a key-i and that is in the metadata of the N values is written into a buffer that is of the initiator and to which a metadata pointer in the N metadata pointers corresponding to the key-i points, and the metadata of the value corresponding to the key-i includes length information of the value corresponding to the key-i.

Accordingly, an initiator may allocate, based on, for example, length information of a value corresponding to a key-i, a buffer that quite matches a value length requirement to the value corresponding to the key-i. The mechanism helps assist the initiator in properly and effectively allocating a buffer.

Optionally, in some possible implementation manners of the present disclosure, the operation indicated by the first operation manner indicator is a write operation, and the first key-value command further carries N values or N value pointers or pointers that point to N value pointers.

When the first key-value command carries the N values, performing, on a value corresponding to each of the N keys, an operation indicated by the first operation manner indicator includes obtaining, by parsing the first key-value command, the N values carried in the first key-value command, and writing the N values into the NVM of the target, performing, on a value corresponding to each of the N keys, an operation indicated by the first operation manner indicator when the first key-value command further carries the N value pointers includes obtaining, by parsing the first key-value command, the N value pointers carried in the first key-value command, obtaining N values corresponding to the N keys from buffers of the initiator and to which the N value pointers point, and writing the N values into the NVM of the target, or performing, on a value corresponding to each of the N keys, an operation indicated by the first operation manner indicator when the first key-value command further carries the pointers that point to the N value pointers includes obtaining the N value pointers from buffers of the initiator or the in-capsule data of the first key-value command based on the pointers that point to the N value pointers and that are carried in the first key-value command, and obtaining N values corresponding to the N keys from buffers that are of the initiator and to which the N value pointers point, and writing the N values into the NVM of the target.

It may be understood that the writing mechanism described as an example above helps assist an initiator in quickly writing values and the like into a target by batch.

Optionally, in some possible implementation manners of the present disclosure, the operation indicated by the first operation manner indicator is a delete operation, and performing, on a value corresponding to each of the N keys, an operation indicated by the first operation manner indicator includes deleting values corresponding to the N keys from the NVM of the target.

It may be understood that the deleting mechanism described as an example above helps assist an initiator in quickly deleting values and the like from a target by batch.

Optionally, in some possible implementation manners of the present disclosure, before the first key-value command is received, the method further includes receiving, by the target, a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtaining the rule pointer from a buffer of the initiator or in-capsule data of the fifth command based on the pointer that points to the rule pointer and that is carried in the fifth command when the fifth command further carries a pointer that points to a rule pointer and a pointer that points to a key set pointer, obtaining the key set pointer from a buffer of the initiator or the in-capsule data of the fifth command based on the pointer that points to the key set pointer and that is carried in the fifth command, obtaining a key set traversal rule from a buffer that is of the initiator and to which the rule pointer points, obtaining a key set from the NVM of the target based on the key set traversal rule, and writing the obtained key set into a buffer that is of the initiator and to which the key set pointer points, where some or all of the N keys are some or all keys in the key set, receiving, by the target, a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtaining a key set traversal rule from a buffer that is of the initiator and to which the rule pointer points when the fifth command further carries a rule pointer and a key set pointer, obtaining a key set from the NVM of the target based on the key set traversal rule, and writing the obtained key set into a buffer that is of the initiator and to which the key set pointer points, where some or all of the N keys are some or all keys in the key set, or receiving, by the target, a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtaining, by parsing the fifth command, the key set traversal rule carried in the fifth command when the fifth command further carries a key set traversal rule and carries a key set pointer, obtaining a key set from the NVM of the target based on the key set traversal rule, and writing the obtained key set into a buffer that is of the initiator and to which the key set pointer points, where some or all of the N keys are some or all keys in the key set.

The key set may be recorded in a list form or another form (the key set may include one or more keys). The key set traversal rule may be described using a regular expression or in another form.

It may be understood that required keys can be quickly obtained by batch using the key set obtaining mechanism described as an example above.

Optionally, in some possible implementation manners of the present disclosure, a pointer (for example, a key pointer, a pointer that points to a key pointer, a value pointer, a pointer that points to a value pointer, or a pointer that points to a metadata pointer), a key, and the like carried in a key-value command may be, for example, carried in the key-value command in a scatter gather list form or another data format.

A third aspect of the embodiments of the present disclosure provides an NVMe, including a receiving unit configured to receive, from a processor, a first key-value command whose format meets an NVMe interface standard, where the first key-value command carries a first operation manner indicator and a first operation object type indicator, and an operation object type indicated by the first operation object type indicator includes a value, an obtaining unit configured to obtain N keys corresponding to the first key-value command, where N is an integer greater than or equal to 1, and an operation unit configured to perform, on a value corresponding to each of the N keys, an operation indicated by the first operation manner indicator.

Optionally, in some possible implementation manners of the present disclosure, the first key-value command further carries the N keys, and the obtaining unit is further configured to obtain, by parsing the first key-value command, the N keys carried in the key-value command, or the first key-value command further carries N key pointers, and the obtaining unit is further configured to obtain the N keys corresponding to the first key-value command from buffers to which the N key pointers point.

Optionally, in some possible implementation manners of the present disclosure, the first key-value command further carries N value pointers, and the operation indicated by the first operation manner indicator is an obtain operation. The operation unit is further configured to obtain N values corresponding to the N keys from an NVM of the NVMe, and write all of the obtained N values into buffers to which different value pointers in the N value pointers point, where a value in the N values corresponding to a key-i is written into a buffer to which a value pointer in the N value pointers corresponding to the key-i points, and the key-i is any one of the N keys.

Optionally, in some possible implementation manners of the present disclosure, before receiving the first key-value command, the receiving unit is further configured to receive a second key-value command whose format meets the NVMe interface standard, where the second key-value carries a second operation manner indicator and a second operation object type indicator, an operation indicated by the second operation manner indicator is an obtain operation, an operation object type indicated by the second operation object type indicator includes metadata of a value, and the second key-value command further carries N metadata pointers.

The obtaining unit may be further configured to obtain N keys from buffers to which the N key pointers point when the second key-value command further carries N key pointers, or obtain, by parsing the second key-value command, the N keys carried in the second key-value command when the second key-value command further carries N keys.

The operation unit is further configured to search the NVM of the NVMe for metadata of N values corresponding to the N keys, and write the metadata of all of the N values into buffers to which different metadata pointers in the N metadata pointers point, where metadata that is of a value corresponding to a key-i and that is in the metadata of the N values is written into a buffer to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N value pointers or N values.

The operation unit is further configured to obtain N values corresponding to the N keys from buffers to which the N value pointers carried in the first key-value command point, and write the N values into an NVM of the NVMe when the first key-value command further carries the N value pointers, or the operation unit is further configured to obtain, by parsing the first key-value command, the N values carried in the first key-value command, and write the N values into an NVM of the NVMe when the first key-value command further carries the N values.

Optionally, in some possible implementation manners of the present disclosure, the operation indicated by the first operation manner indicator is a delete operation, and the operation unit is further configured to delete values corresponding to the N keys from an NVM of the NVMe.

Optionally, in some possible implementation manners of the present disclosure, the receiving unit is further configured to receive a third command whose format meets the NVMe interface standard, where the third command carries a third operation manner indicator and a third operation object type indicator, an operation indicated by the third operation manner indicator is an obtain operation, an operation object type indicated by the third operation object indicator includes a key, and the third command further carries a key set pointer.

The obtaining unit is further configured to obtain a key set traversal rule from a buffer to which the rule pointer points when the third command further carries a rule pointer, or obtain, by parsing the third command, the key set traversal rule carried in the third command when the third command further carries a key set traversal rule.

The operation unit may be further configured to obtain a key set from the NVM of the NVMe based on the key set traversal rule, and write the obtained key set into a buffer to which the key set pointer points, where some or all of the N keys are some or all keys in the key set.

A fourth aspect of the embodiments of the present disclosure provides a target, including a receiving unit configured to receive, from an initiator, a first key-value command whose format meets an NVMe interface standard, where the first key-value command carries a first operation manner indicator and a first operation object type indicator, and an operation object type indicated by the first operation object type indicator includes a value, an obtaining unit configured to obtain N keys corresponding to the first key-value command, where N is an integer greater than or equal to 1, and an operation unit configured to perform, on a value corresponding to each of the N keys, an operation indicated by the first operation manner indicator.

Optionally, in some possible implementation manners of the present disclosure, the first key-value command further carries the N keys or N key pointers or pointers that point to N key pointers.

The obtaining unit is further configured to obtain the N key pointers from buffers of the initiator or in-capsule data of the first key-value command based on the pointers that point to the N key pointers and that are carried in the first key-value command, and obtain the N keys corresponding to the first key-value command from buffers that are of the initiator and to which the N key pointers point when the first key-value command further carries the pointers that point to the N key pointers, the obtaining unit is further configured to obtain, by parsing the first key-value command, the N key pointers carried in the first key-value command, and obtain the N keys corresponding to the first key-value command from buffers that are of the initiator and to which the N key pointers point when the first key-value command carries the N key pointers, or the obtaining unit is further configured to obtain, by parsing the first key-value command, the N keys carried in the first key-value command when the first key-value command carries the N keys.

Optionally, in some possible implementation manners of the present disclosure, the operation indicated by the first operation manner indicator is an obtain operation, and the first key-value command further carries N value pointers or pointers that point to N value pointers.

The obtaining unit is further configured to obtain, by parsing the first key-value command, the N value pointers carried in the first key-value command when the first key-value command further carries the N value pointers, or obtain the N value pointers from buffers of the initiator or the in-capsule data of the first key-value command based on the pointers that point to the N value pointers and that are carried in the first key-value command when the first key-value command further carries the pointers that point to the N value pointers.

The operation unit is further configured to obtain N values corresponding to the N keys from an NVM of the target, and write all of the obtained N values into buffers that are of the initiator and to which different value pointers in the N value pointers point, where a value in the N values corresponding to a key-i is written into a buffer that is of the initiator and to which a value pointer in the N value pointers corresponding to the key-i points, and the key-i is any one of the N keys.

Optionally, in some possible implementation manners of the present disclosure, before receiving the first key-value command, the receiving unit is further configured to receive a fourth key-value command whose format meets the NVMe interface standard, where the fourth key-value command carries a fourth operation manner indicator and a fourth operation object type indicator, an operation indicated by the fourth operation manner indicator is an obtain operation, and an operation object type indicated by the fourth operation object type indicator includes metadata of a value.

The obtaining unit is further configured to obtain, by parsing the fourth key-value command, the N keys carried in the fourth key-value command when the fourth key-value command further carries N keys, or obtain, by parsing the fourth key-value command, the N key pointers carried in the fourth key-value command, and obtain the N keys from buffers that are of the initiator and to which the N key pointers point when the fourth key-value command further carries N key pointers, or obtain the N key pointers from buffers of the initiator or in-capsule data of the fourth key-value command based on the pointers that point to the N key pointers and that are carried in the fourth key-value command, and obtain the N keys from buffers that are of the initiator and to which the N key pointers point when the fourth key-value command carries pointers that point to N key pointers.

The obtaining unit is further configured to obtain, by parsing the fourth key-value command, the N metadata pointers carried in the fourth key-value command when the fourth key-value command further carries N metadata pointers, or obtain the N metadata pointers from buffers of the initiator or the in-capsule data of the fourth key-value command based on the pointers that point to the N metadata pointers and that are carried in the fourth key-value command when the fourth key-value command further carries pointers that point to N metadata pointers.

The operation unit is further configured to search the NVM of the target for metadata of N values corresponding to the N keys, and write the metadata of all of the N values into buffers that are of the initiator and to which different metadata pointers in the N metadata pointers point, where metadata that is of a value corresponding to a key-i and that is in the metadata of the N values is written into a buffer that is of the initiator and to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N values or N value pointers or pointers that point to N value pointers.

The operation unit is further configured to obtain, by parsing the first key-value command, the N values carried in the first key-value command, and write the N values into an NVM of the target when the first key-value command carries the N values, the operation unit is further configured to obtain, by parsing the first key-value command, the N value pointers carried in the first key-value command when the first key-value command further carries the N value pointers, obtain N values corresponding to the N keys from buffers that are of the initiator and to which the N value pointers point, and write the N values into an NVM of the target, the operation unit is further configured to obtain the N value pointers from buffers of the initiator or the in-capsule data of the first key-value command based on the pointers that point to the N value pointers and that are carried in the first key-value command when the first key-value command further carries the pointers that point to the N value pointers, and obtain N values corresponding to the N keys from buffers that are of the initiator and to which the N value pointers point, and write the N values into an NVM of the target.

Optionally, in some possible implementation manners of the present disclosure, the operation indicated by the first operation manner indicator is a delete operation, and performing, on a value corresponding to each of the N keys, an operation indicated by the first operation manner indicator includes deleting values corresponding to the N keys from an NVM of the target.

Optionally, in some possible implementation manners of the present disclosure, the receiving unit is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key. The obtaining unit is further configured to obtain the rule pointer from a buffer of the initiator or in-capsule data of the fifth command based on the pointer that points to the rule pointer and that is carried in the fifth command when the fifth command further carries a pointer that points to a rule pointer and a pointer that points to a key set pointer, obtain the key set pointer from a buffer of the initiator or the in-capsule data of the fifth command based on the pointer that points to the key set pointer and that is carried in the fifth command, obtain a key set traversal rule from a buffer that is of the initiator and to which the rule pointer points, and the operation unit is further configured to obtain a key set from the NVM of the target based on the key set traversal rule, and write the obtained key set into a buffer that is of the initiator and to which the key set pointer points, where some or all of the N keys are some or all keys in the key set, or the receiving unit is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key. The obtaining unit is further configured to obtain a key set traversal rule from a buffer that is of the initiator and to which the rule pointer points when the fifth command further carries a rule pointer and a key set pointer, and the operation unit may be further configured to obtain a key set from the NVM of the target based on the key set traversal rule, and write the obtained key set into a buffer that is of the initiator and to which the key set pointer points, where some or all of the N keys are some or all keys in the key set, or the receiving unit is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key. The obtaining unit is further configured to obtain, by parsing the fifth command, the key set traversal rule carried in the fifth command when the fifth command further carries a key set traversal rule and carries a key set pointer, and the operation unit is further configured to obtain a key set from the NVM of the target based on the key set traversal rule, and write the obtained key set into a buffer that is of the initiator and to which the key set pointer points, where some or all of the N keys are some or all keys in the key set.

A fifth aspect of the present disclosure provides an NVMe, including a controller (an NVMe controller) and an NVM.

The NVM is configured to provide storage space for data such as a value. For example, the NVM may be further configured to provide storage space for a key, metadata, and the like.

The controller is configured to receive, from a processor, a first key-value command whose format meets an NVMe interface standard, where the first key-value command carries a first operation manner indicator and a first operation object type indicator, and an operation object type indicated by the first operation object type indicator includes a value, obtain N keys corresponding to the first key-value command, where N is an integer greater than or equal to 1, and perform, on a value corresponding to each of the N keys, an operation indicated by the first operation manner indicator.

Optionally, in some possible implementation manners of the present disclosure, the first key-value command further carries the N keys, and for the obtaining N keys corresponding to the first key-value command, the controller is further configured to obtain, by parsing the first key-value command, the N keys carried in the key-value command, or the first key-value command further carries N key pointers, and for the obtaining N keys corresponding to the first key-value command, the controller is further configured to obtain the N keys corresponding to the first key-value command from buffers to which the N key pointers point.

Optionally, in some possible implementation manners of the present disclosure, the first key-value command further carries N value pointers, and the operation indicated by the first operation manner indicator is an obtain operation.

For performing, on a value corresponding to each of the N keys, an operation indicated by the first operation manner indicator, the controller is further configured to obtain N values corresponding to the N keys from the NVM of the NVMe, and write all of the obtained N values into buffers to which different value pointers in the N value pointers point, where a value in the N values corresponding to a key-i is written into a buffer to which a value pointer in the N value pointers corresponding to the key-i points, and the key-i is any one of the N keys.

Optionally, in some possible implementation manners of the present disclosure, the controller may be further configured to receive a second key-value command whose format meets the NVMe interface standard before receiving the first key-value command, where the second key-value carries a second operation manner indicator and a second operation object type indicator, an operation indicated by the second operation manner indicator is an obtain operation, an operation object type indicated by the second operation object type indicator includes metadata of a value, and the second key-value command further carries N metadata pointers, obtain N keys from buffers to which the N key pointers point when the second key-value command further carries N key pointers, or obtain, by parsing the second key-value command, the N keys carried in the second key-value command when the second key-value command further carries N keys, search the NVM of the NVMe for metadata of N values corresponding to the N keys, and write the metadata of all of the N values into buffers to which different metadata pointers in the N metadata pointers point, where metadata that is of a value corresponding to a key-i and that is in the metadata of the N values is written into a buffer to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N value pointers or N values.

When the first key-value command further carries the N value pointers, for performing, on a value corresponding to each of the N keys, an operation indicated by the first operation manner indicator, the controller is further configured to obtain N values corresponding to the N keys from buffers to which the N value pointers carried in the first key-value command point, and write the N values into the NVM of the NVMe, or when the first key-value command further carries the N values, for performing, on a value corresponding to each of the N keys, an operation indicated by the first operation manner indicator, the controller is further configured to obtain, by parsing the first key-value command, the N values carried in the first key-value command, and write the N values into the NVM of the NVMe.

Optionally, in some possible implementation manners of the present disclosure, the operation indicated by the first operation manner indicator is a delete operation, and performing, on a value corresponding to each of the N keys, an operation indicated by the first operation manner indicator includes deleting values corresponding to the N keys from the NVM of the NVMe.

Optionally, in some possible implementation manners of the present disclosure, before receiving, from the processor, the key-value command whose format meets the NVMe interface standard, the controller may be further configured to receive a third command whose format meets the NVMe interface standard, where the third command carries a third operation manner indicator and a third operation object type indicator, an operation indicated by the third operation manner indicator is an obtain operation, an operation object type indicated by the third operation object indicator includes a key, and the third command further carries a key set pointer, obtain a key set traversal rule from a buffer to which the rule pointer points when the third command further carries a rule pointer, obtain, by parsing the third command, the key set traversal rule carried in the third command when the third command further carries a key set traversal rule, obtain a key set from the NVM of the NVMe based on the key set traversal rule, and write the obtained key set into a buffer to which the key set pointer points, where some or all of the N keys are some or all keys in the key set.

A sixth aspect of the embodiments of the present disclosure provides a target, including a controller (for example, an NVMe controller or an NoF controller) and an NVM.

The NVM is configured to provide storage space for data such as a value. For example, the NVM may be further configured to provide storage space for a key, metadata, and the like.

The controller is configured to receive, from an initiator, a first key-value command whose format meets an NVMe interface standard, where the first key-value command carries a first operation manner indicator and a first operation object type indicator, and an operation object type indicated by the first operation object type indicator includes a value, obtain N keys corresponding to the first key-value command, where N is an integer greater than or equal to 1, and perform, on a value corresponding to each of the N keys, an operation indicated by the first operation manner indicator.

Optionally, in some possible implementation manners of the present disclosure, the first key-value command further carries the N keys or N key pointers or pointers that point to N key pointers.

When the first key-value command further carries the pointers that point to the N key pointers, for obtaining N keys corresponding to the first key-value command, the controller is further configured to obtain the N key pointers from buffers of the initiator or in-capsule data of the first key-value command based on the pointers that point to the N key pointers and that are carried in the first key-value command, and obtain the N keys corresponding to the first key-value command from buffers that are of the initiator and to which the N key pointers point, for obtaining when the first key-value command carries the N key pointers, N keys corresponding to the first key-value command, the controller is further configured to obtain, by parsing the first key-value command, the N key pointers carried in the first key-value command, and obtain the N keys corresponding to the first key-value command from buffers that are of the initiator and to which the N key pointers point, or for obtaining when the first key-value command carries the N keys, N keys corresponding to the first key-value command, the controller is further configured to obtain, by parsing the first key-value command, the N keys carried in the first key-value command.

Optionally, in some possible implementation manners of the present disclosure, the operation indicated by the first operation manner indicator is an obtain operation, and the first key-value command further carries N value pointers or pointers that point to N value pointers.

The controller is further configured to obtain, by the target by parsing the first key-value command, the N value pointers carried in the first key-value command when the first key-value command further carries the N value pointers, or obtain, by the target, the N value pointers from buffers of the initiator or the in-capsule data of the first key-value command based on the pointers that point to the N value pointers and that are carried in the first key-value command when the first key-value command further carries the pointers that point to the N value pointers.

For performing, on a value corresponding to each of the N keys, an operation indicated by the first operation manner indicator, the controller is further configured to obtain N values corresponding to the N keys from the NVM of the target, and write all of the obtained N values into buffers that are of the initiator and to which different value pointers in the N value pointers point, where a value in the N values corresponding to a key-i is written into a buffer that is of the initiator and to which a value pointer in the N value pointers corresponding to the key-i points, and the key-i is any one of the N keys.

Optionally, in some possible implementation manners of the present disclosure, before receiving the first key-value command, the controller is further configured to receive a fourth key-value command whose format meets the NVMe interface standard, where the fourth key-value command carries a fourth operation manner indicator and a fourth operation object type indicator, an operation indicated by the fourth operation manner indicator is an obtain operation, and an operation object type indicated by the fourth operation object type indicator includes metadata of a value, obtain, by parsing the fourth key-value command, the N keys carried in the fourth key-value command when the fourth key-value command further carries N keys, or obtain, by parsing the fourth key-value command, the N key pointers carried in the fourth key-value command, and obtain the N keys from buffers that are of the initiator and to which the N key pointers point when the fourth key-value command further carries N key pointers, or obtain the N key pointers from buffers of the initiator or in-capsule data of the fourth key-value command based on the pointers that point to the N key pointers and that are carried in the fourth key-value command, and obtain the N keys from buffers that are of the initiator and to which the N key pointers point when the fourth key-value command carries pointers that point to N key pointers, obtain, by parsing the fourth key-value command, the N metadata pointers carried in the fourth key-value command when the fourth key-value command further carries N metadata pointers, or obtain the N metadata pointers from buffers of the initiator or the in-capsule data of the fourth key-value command based on the pointers that point to the N metadata pointers and that are carried in the fourth key-value command when the fourth key-value command further carries pointers that point to N metadata pointers, search the NVM of the target for metadata of N values corresponding to the N keys, and write the metadata of all of the N values into buffers that are of the initiator and to which different metadata pointers in the N metadata pointers point, where metadata that is of a value corresponding to a key-i and that is in the metadata of the N values is written into a buffer that is of the initiator and to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N values or N value pointers or pointers that point to N value pointers.

When the first key-value command carries the N values, for performing, on a value corresponding to each of the N keys, an operation indicated by the first operation manner indicator, the controller is further configured to obtain, by parsing the first key-value command, the N values carried in the first key-value command, and write the N values into the NVM of the target, or for performing, on a value corresponding to each of the N keys, an operation indicated by the first operation manner indicator when the first key-value command further carries the N value pointers, the controller is further configured to obtain, by parsing the first key-value command, the N value pointers carried in the first key-value command, and obtain N values corresponding to the N keys from buffers that are of the initiator and to which the N value pointers point, and write the N values into the NVM of the target, or for performing, on a value corresponding to each of the N keys, an operation indicated by the first operation manner indicator when the first key-value command further carries the pointers that point to the N value pointers, the controller is further configured to obtain the N value pointers from buffers of the initiator or the in-capsule data of the first key-value command based on the pointers that point to the N value pointers and that are carried in the first key-value command, and obtain N values corresponding to the N keys from buffers that are of the initiator and to which the N value pointers point, and write the N values into the NVM of the target.

Optionally, in some possible implementation manners of the present disclosure, the operation indicated by the first operation manner indicator is a delete operation, and for performing, on a value corresponding to each of the N keys, an operation indicated by the first operation manner indicator, the controller is further configured to delete values corresponding to the N keys from the NVM of the target.

Optionally, in some possible implementation manners of the present disclosure, before receiving, from the initiator, the first key-value command whose format meets the NVMe interface standard, the controller may be further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtain the rule pointer from a buffer of the initiator or in-capsule data of the fifth command based on the pointer that points to the rule pointer and that is carried in the fifth command when the fifth command further carries a pointer that points to a rule pointer and a pointer that points to a key set pointer, obtain the key set pointer from a buffer of the initiator or the in-capsule data of the fifth command based on the pointer that points to the key set pointer and that is carried in the fifth command, obtain a key set traversal rule from a buffer that is of the initiator and to which the rule pointer points, obtain a key set from the NVM of the target based on the key set traversal rule, and write the obtained key set into a buffer that is of the initiator and to which the key set pointer points, where some or all of the N keys are some or all keys in the key set, or before receiving, from the initiator, the first key-value command whose format meets the NVMe interface standard, the controller is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtain a key set traversal rule from a buffer that is of the initiator and to which the rule pointer points when the fifth command further carries a rule pointer and a key set pointer, obtain a key set from the NVM of the target based on the key set traversal rule, and write the obtained key set into a buffer that is of the initiator and to which the key set pointer points, where some or all of the N keys are some or all keys in the key set, or before receiving, from the initiator, the first key-value command whose format meets the NVMe interface standard, the controller is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtain, by parsing the fifth command, the key set traversal rule carried in the fifth command when the fifth command further carries a key set traversal rule and carries a key set pointer, obtain a key set from the NVM of the target based on the key set traversal rule, and write the obtained key set into a buffer that is of the initiator and to which the key set pointer points, where some or all of the N keys are some or all keys in the key set.

A seventh aspect of the embodiments of the present disclosure provides a computer device, including a processor and an NVMe, where the NVMe may be any NVMe in the embodiments of the present disclosure.

An eighth aspect of the embodiments of the present disclosure provides a data access system, including an initiator and a target, where the target may be any target in the embodiments of the present disclosure.

In addition, a ninth aspect of the embodiments of the present disclosure provides a computer readable storage medium. The computer readable storage medium stores program code that is executed by an NVMe and that is used for data access. The program code includes instructions used to execute the method executed by the NVMe in the first aspect.

In addition, a tenth aspect of the embodiments of the present disclosure provides a computer readable storage medium. The computer readable storage medium stores program code that is executed by a target and that is used for data access. The program code includes instructions used to execute the method executed by the target in the second aspect.

In addition, an eleventh aspect of the embodiments of the present disclosure further provides a data access apparatus. Units included in the apparatus can execute the method executed by an NVMe in the first aspect.

In addition, a twelfth aspect of the embodiments of the present disclosure further provides a data access apparatus. Units included in the apparatus can execute the method executed by a target in the second aspect.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

FIG. 3A and FIG. 3B are schematic description diagrams of some commands whose formats that meet an NVMe standard according to an embodiment of the present disclosure;

DESCRIPTION OF EMBODIMENTS

In the specification, claims, and the foregoing accompanying drawings in the present disclosure, the terms "include," "contain," and any other variants mean to cover the non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. The terms "first," "second," "third," "fourth," and the like are intended to distinguish between different objects but do not necessarily indicate a specific sequence.

The inventor of the present disclosure is committed to expanding an access manner supporting capability of an NoF technology or an NVMe technology or both, and expects to expand application scopes of the NoF technology and the NVMe technology by expanding the access manner supporting capability of the NoF technology or the NVMe technology or both.

A key-value technology is a relatively widely applied technology, and the key-value technology is characterized by paired organization and storage of a key and a corresponding value. The key-value technology has a bigger advantage over a file system-based conventional relational database. Therefore, the inventor of the present disclosure considers that the key-value technology may have a quite broad application prospect in a cloud storage field. However, because the conventional NoF technology and NVMe technology still support only a block-based access manner, how to better apply the key-value technology to the NoF technology and/or the NVMe technology to beneficially expand access manner supporting capabilities of the NoF technology and the NVMe technology becomes a significant technical problem that needs to be resolved. The following describes resolution ideas of the foregoing technical problem using specific embodiments.

Figure 1A:
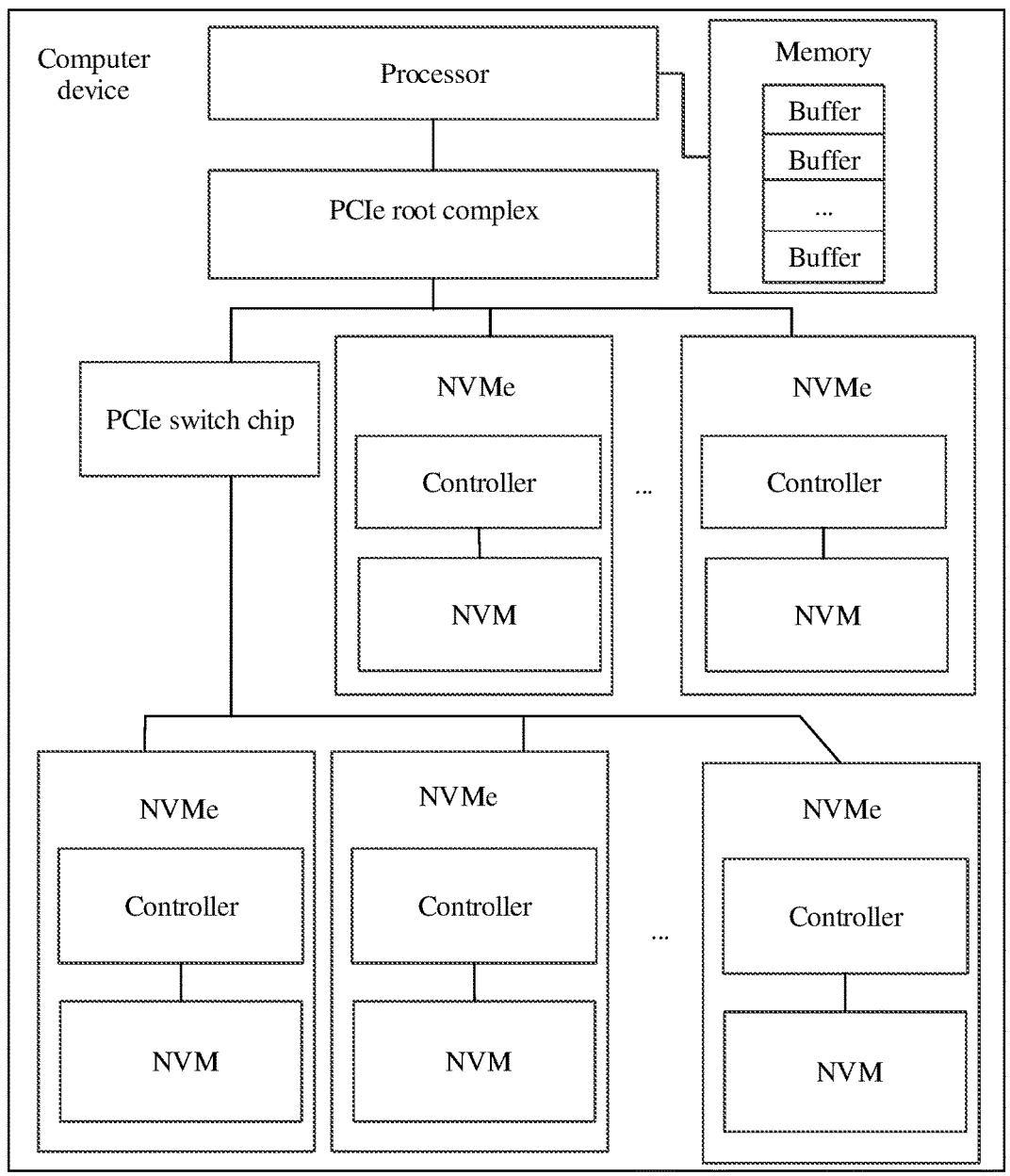
FIG. 1A is a schematic architecture diagram for an NVMe scenario according to an embodiment of the present disclosure.
Figure 1B:
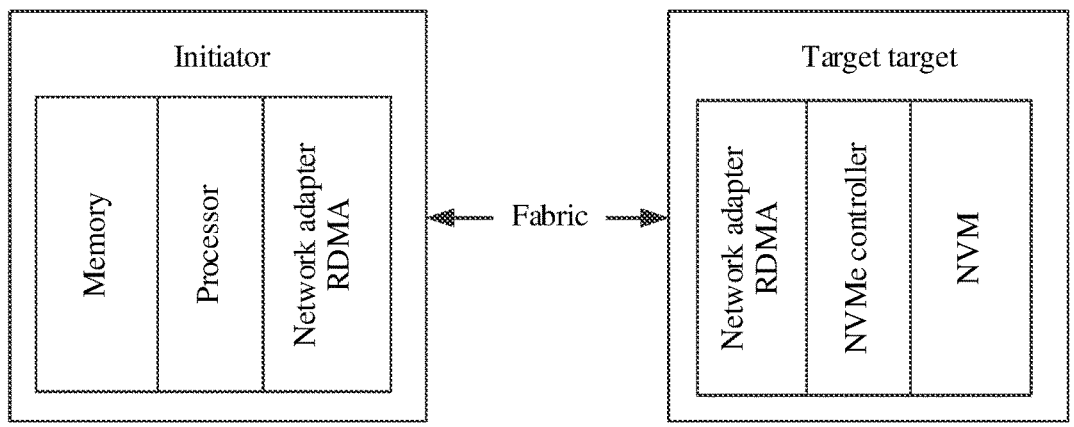
FIG. 1B and FIG. 1C are schematic architecture diagrams for an NoF scenario according to an embodiment of the present disclosure.
Figure 1C:
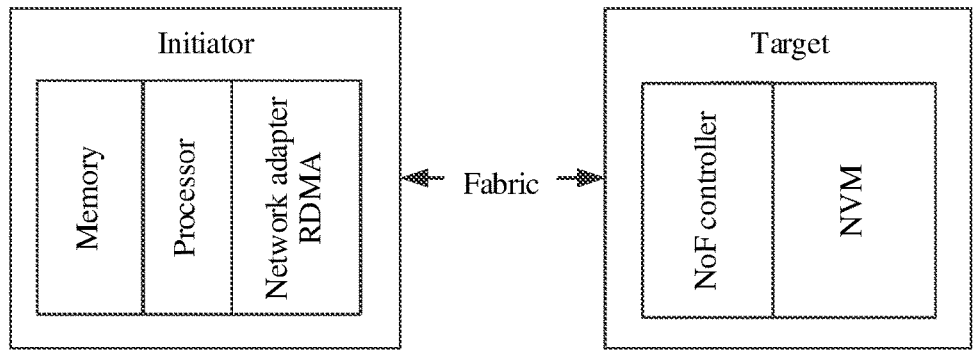

Referring to FIG. 1A, FIG. 1B, and FIG. 1C, some technical solutions in the embodiments of the present disclosure may be implemented based on a system architecture or a transformed architecture of a system architecture shown in FIG. 1A, FIG. 1B, or FIG. 1C. An architecture of a computer device shown in FIG. 1A is mainly used for an NVMe scenario. The computer device shown in FIG. 1A mainly includes a processor, a memory, and an NVMe. The NVMe includes internal devices such as an NVMe controller (the NVMe controller of the NVMe is referred to as a controller) and an NVM. The processor may be considered as a storage service requesting device, and the NVMe may be considered as a storage service provision device. The processor and the NVMe belong to one computer device (for example, a desktop personal computer, a notebook personal computer, a workstation, a server, or a computer device of another type). The processor and the NVMe may be connected using a bus (for example, a PCIe bus).

Architectures shown in FIG. 1B and FIG. 1C are mainly used for an NoF scenario. Devices such as an initiator and a target are mainly involved in the NoF scenario. FIG. 1B and FIG. 1C further show some internal devices that may be included in the initiator and the target. For example, the target may include internal devices such as a network adapter (the network adapter of the target may be, for example, a network adapter that supports remote DMA (RDMA)) and an NVMe (including an NVMe controller and an NVM). The network adapter and the NVMe controller of the target may be integrated into one device (the integrated device may be referred to as, for example, an NoF controller), or the network adapter and the NVMe controller of the target may be collectively referred to as an NoF controller. The NoF controller may be responsible for main functions of the target. For another example, the initiator may include internal devices such as a network adapter, a processor, and a memory. Internal devices of the initiator and the target are not limited to examples in FIG. 1B and FIG. 1C.

The initiator and the target are different computer devices. In some cases, if a storage service provision device and a storage service requesting device are connected using a network (fabric), the storage service provision device is a target, and the storage service requesting device is an initiator. In other cases, if a storage service provision device and a storage service requesting device are connected using a bus or in another manner, but the storage service provision device and the storage service requesting device are not in one subrack, the storage service provision device is a target, and the storage service requesting device is an initiator.

The initiator and the target may have various actual product forms. For example, the target may be a storage service provision device such as a storage server or a storage array. The initiator may be, for example, a storage service requesting device such as a personal computer, a workstation, an application server, or a site server.

Generally, for example, in the NVMe scenario, the storage service requesting device is a processor, and the storage service provision device is an NVMe. For example, in the NoF scenario, the storage service requesting device is an initiator, and the storage service provision device is a target.

Figure 2:
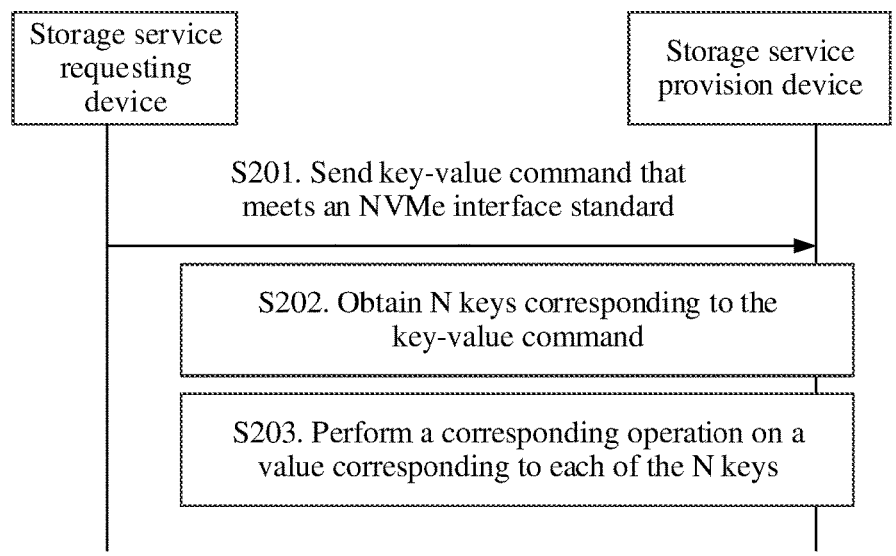
FIG. 2 is a schematic flowchart of a data access method according to an embodiment of the present disclosure.

Referring to FIG. 2, FIG. 2 is a schematic flowchart of a data access method according to an embodiment of the present disclosure. As shown in FIG. 2, the data access method provided in this embodiment of the present disclosure may include the following steps.

Step S201: A storage service requesting device sends, to a storage service provision device, a first key-value command whose format meets an NVMe interface standard.

The first key-value command carries a first operation manner indicator and a first operation object type indicator, and an operation object type indicated by the first operation object type indicator includes a value. Certainly, the operation object type indicated by the first operation object type indicator may further include a key and/or metadata of a value and the like.

The operation object type involved in this embodiment of this application may include a key, a value, metadata of a value, and the like.

Step S202: The storage service provision device receives, from the storage service requesting device, the first key-value command whose format meets the NVMe interface standard, and the storage service provision device obtains N keys corresponding to the key-value command.

N is an integer greater than or equal to 1.

For example, N may be 1, 2, 3, 4, 5, 6, 7, 9, 10, 15, 51, 80, 97, 100, or another value.

Step S203: The storage service provision device performs, on a value corresponding to each of the N keys, a corresponding operation indicated by the first operation manner indicator, where the operation indicated by the first operation manner indicator may be, for example, an operation such as an obtain (that is, read) operation, a write operation, or a delete operation.

The first key-value command whose format meets the NVMe interface standard is, for example, any one of a key-value command for requesting to obtain a value and/or metadata (for example, the operation indicated by the first operation manner indicator is an obtain operation), a key-value command for requesting to write a key, a value, and/or metadata (for example, the operation indicated by the first operation manner indicator is a write operation), or a key-value command for requesting to delete a key, a value, and/or metadata (for example, the operation indicated by the first operation manner indicator is a delete operation).

The key-value command for requesting to obtain a value and/or metadata may be, for example, a key-value command (which may be referred to as, for example, a Kget command or another name) for requesting to obtain values and/or metadata by batch or a key-value command (which may be referred to as, for example, a Kmget command or another name) for requesting to obtain a value and/or metadata one by one. The key-value command for requesting to obtain values and/or metadata by batch is used to request to obtain multiple values and/or multiple pieces of metadata at a time. The key-value command for requesting to obtain a value and/or metadata one by one is used to request to obtain one value and/or one piece of metadata at a time.

The key-value command for requesting to write a key, a value, and/or metadata may be, for example, a key-value command (which may be referred to as, for example, a Kput command or another name) for requesting to write keys, values, and/or metadata by batch or a key-value command (which may be referred to as, for example, a Kmput command or another name) for requesting to write a key, a value, and/or metadata one by one. The key-value command for requesting to write keys, values, and/or metadata by batch is used to request to write multiple keys, multiple values, and/or multiple pieces of metadata at a time. The key-value command for requesting to write a key, a value, and/or metadata one by one is used to request to write one key, one value, and/or one piece of metadata at a time.

The key-value command for requesting to delete a key, a value, and/or metadata may be, for example, a key-value command (which may be referred to as, for example, a Kdel command or another name) for requesting to delete keys, values, and/or metadata by batch or a key-value command (which may be referred to as, for example, a Kmdel command or another name) for requesting to delete a key, a value, and/or metadata one by one. The key-value command for requesting to delete keys, values, and/or metadata by batch is used to request to delete multiple keys, multiple values, and/or multiple pieces of metadata at a time. The key-value command for requesting to delete a key, a value, and/or metadata one by one is used to request to delete one key, one value, and/or one piece of metadata at a time.

Referring to FIG. 3A and FIG. 3B, a table shown in FIG. 3A shows brief descriptions of some commands (including the key-value command obtained by means of expansion in this embodiment of this application) whose formats meet the NVMe interface standard. It may be understood that key-value commands whose formats meet the NVMe interface standard are not limited to the foregoing examples.

FIG. 3B shows a general format of a command whose format meets the NVMe interface standard. A characteristic of the format of the command whose format meets the NVMe interface standard includes a length of the command that is fixed at 64 bytes (the 64 bytes do not include in-capsule data), that is, 16 DWs (one DW represents 4 bytes). A DW0 in the command is used to identify a key characteristic of the command. It is specified in the NVMe interface standard that other fields (for example, the DW0 to a DW15) may be user-defined according to a requirement.

For example, the DW0 may include an operation code (opcode) field that may be used to represent a command purpose. The DW0 may further include a command identifier (command ID) field that may be used to uniquely identify the command. The DW0 may further include a packed data structure processor (PDSP) (physical region page (PRP) or scatter gather list (SGL) for data transfer, i.e., data transfer format selection) field used to indicate a data format, and the DW0 may further include a fused operation (fuse) field that may be used to indicate whether the command and another command can be combined into one batch processing command.

For example, the opcode field may be located on the $0^{th}$ bit to the seventh bit (a bit 0 to a bit 7), the opcode field may carry, for example, information such as an operation manner indicator, and an operation indicated by the operation manner indicator may be, for example, an operation such as an obtain operation, a write operation, or a delete operation.

For example, the fuse field may be located on the eighth bit and the ninth bit (that is, a bit 8 and a bit 9).

For example, the command ID field may be located on the $16^{th}$ bit to the $31^{st}$ bit (that is, a bit 16 to a bit 31).

For example, the PDSP field may be located on the $14^{th}$ bit and the $15^{th}$ bit (that is, a bit 14 and a bit 15). The data format indicated by the PDSP field is, for example, an SGL, a page list, or the like. For example, when the data format indicated by the PDSP is an SGL, a data format carried in the DW6 to the DW9 in the command is an SGL, and so on.

For detailed content of the NVMe interface standard, refer to related standard documents. Details are not listed herein.

The following provides some examples of descriptions for some NVMe scenarios and NoF scenarios.

For example, in an NVMe scenario (that is, the storage service requesting device is a processor, and the storage service provision device is an NVMe), in some possible implementation manners of the present disclosure, the first key-value command further carries the N keys, and obtaining N keys corresponding to the first key-value command includes obtaining, by parsing the first key-value command, the N keys carried in the key-value command. Alternatively, the first key-value command further carries N key pointers, and obtaining N keys corresponding to the first key-value command includes obtaining the N keys corresponding to the first key-value command from buffers to which the N key pointers point.

For example, in an NoF scenario (that is, the storage service requesting device is an initiator, and the storage service provision device is a target), in some possible implementation manners of the present disclosure, the first key-value command may further carry the N keys or N key pointers or pointers that point to N key pointers.

Further, for example, when the first key-value command further carries the pointers that point to the N key pointers, obtaining N keys corresponding to the first key-value command includes obtaining the N key pointers from buffers of the initiator or in-capsule data of the first key-value command based on the pointers that point to the N key pointers and that are carried in the first key-value command, and obtaining the N keys corresponding to the first key-value command from buffers that are of the initiator and to which the N key pointers point, or obtaining N keys corresponding to the first key-value command when the first key-value command carries the N key pointers includes obtaining, by parsing the first key-value command, the N key pointers carried in the first key-value command, and obtaining the N keys corresponding to the first key-value command from buffers that are of the initiator and to which the N key pointers point, or obtaining N keys corresponding to the first key-value command when the first key-value command carries the N keys includes obtaining, by parsing the first key-value command, the N keys carried in the first key-value command.

It may be understood that a pointer that points to a buffer of an initiator and a pointer that points to in-capsule data of a key-value command generally have different formats and/or lengths. Therefore, for example, it may be determined, based on a length of a pointer, whether the pointer points to a buffer of an initiator or points to in-capsule data of a key-value command.

The following provides examples of descriptions for key-value commands with different functions.

For example, in the NVMe scenario, it is assumed that the first key-value command further carries N value pointers, and the operation indicated by the first operation manner indicator is an obtain operation. Performing, on a value corresponding to each of the N keys, an operation indicated by a first operation manner indicator may include obtaining N values corresponding to the N keys from an NVM of the NVMe, and writing all of the obtained N values into buffers to which different value pointers in the N value pointers point. A value in the N values corresponding to a key-i is written into a buffer to which a value pointer in the N value pointers corresponding to the key-i points, and the key-i is any one of the N keys.

The foregoing example provides some possible implementation manners of performing an operation of obtaining a value in the NVMe scenario.

In the NVMe scenario, in some possible implementation manners, before the first key-value command is received, the method further includes receiving, by the NVMe, a second key-value command whose format meets the NVMe interface standard, where the second key-value carries a second operation manner indicator and a second operation object type indicator, an operation indicated by the second operation manner indicator is an obtain operation, an operation object type indicated by the second operation object type indicator includes metadata of a value, and the second key-value command further carries N metadata pointers, obtaining N keys from buffers to which the N key pointers point when the second key-value command further carries N key pointers, or obtaining, by parsing the second key-value command, the N keys carried in the second key-value command when the second key-value command further carries N keys, searching the NVM of the NVMe for metadata of N values corresponding to the N keys, and writing the metadata of all of the N values into buffers to which different metadata pointers in the N metadata pointers point, where metadata that is of a value corresponding to a key-i and that is in the metadata of the N values is written into a buffer to which a metadata pointer in the N metadata pointers corresponding to the key-i points, and the metadata of the value corresponding to the key-i includes length information of the value corresponding to the key-i.

The foregoing example provides some possible implementation manners of obtaining metadata of a value in the NoF scenario. Accordingly, the processor may allocate, based on the length information of the value corresponding to the key-i, a buffer that matches a length of the value to the value corresponding to the key-i. The same is true of a value corresponding to another key.

In the NoF scenario, in some possible implementation manners, it is assumed that the operation indicated by the first operation manner indicator is an obtain operation, and the first key-value command further carries N value pointers or pointers that point to N value pointers.

The method may further include obtaining, by the target by parsing the first key-value command, the N value pointers carried in the first key-value command when the first key-value command further carries the N value pointers, or obtaining, by the target, the N value pointers from buffers of the initiator or the in-capsule data of the first key-value command based on the pointers that point to the N value pointers and that are carried in the first key-value command when the first key-value command further carries the pointers that point to the N value pointers.

Performing, on a value corresponding to each of the N keys, an operation indicated by the first operation manner indicator includes obtaining N values corresponding to the N keys from an NVM of the target, and writing all of the obtained N values into buffers that are of the initiator and to which different value pointers in the N value pointers point. A value in the N values corresponding to a key-i is written into a buffer that is of the initiator and to which a value pointer in the N value pointers corresponding to the key-i points, and the key-i is any one of the N keys.

The foregoing example provides some possible implementation manners of obtaining a value in the NoF scenario.

In the NoF scenario, in some possible implementation manners, before the first key-value command is received, the method further includes receiving, by the target, a fourth key-value command whose format meets the NVMe interface standard, where the fourth key-value command carries a fourth operation manner indicator and a fourth operation object type indicator, an operation indicated by the fourth operation manner indicator is an obtain operation, and an operation object type indicated by the fourth operation object type indicator includes metadata of a value, obtaining, by parsing the fourth key-value command, the N keys carried in the fourth key-value command when the fourth key-value command further carries N keys, obtaining, by parsing the fourth key-value command, the N key pointers carried in the fourth key-value command, and obtaining the N keys from buffers that are of the initiator and to which the N key pointers point when the fourth key-value command further carries N key pointers, or obtaining the N key pointers from buffers of the initiator or in-capsule data of the fourth key-value command based on the pointers that point to the N key pointers and that are carried in the fourth key-value command, and obtaining the N keys from buffers that are of the initiator and to which the N key pointers point when the fourth key-value command carries pointers that point to N key pointers, obtaining, by parsing the fourth key-value command, the N metadata pointers carried in the fourth key-value command when the fourth key-value command further carries N metadata pointers, or obtaining the N metadata pointers from buffers of the initiator or the in-capsule data of the fourth key-value command based on the pointers that point to the N metadata pointers and that are carried in the fourth key-value command when the fourth key-value command further carries pointers that point to N metadata pointers, and searching the NVM of the target for metadata of N values corresponding to the N keys, and writing the metadata of all of the N values into buffers that are of the initiator and to which different metadata pointers in the N metadata pointers point, where metadata that is of a value corresponding to a key-i and that is in the metadata of the N values is written into a buffer that is of the initiator and to which a metadata pointer in the N metadata pointers corresponding to the key-i points, and the metadata of the value corresponding to the key-i includes length information of the value corresponding to the key-i.

The foregoing example provides some possible implementation manners of obtaining metadata of a value in the NoF scenario. Accordingly, the initiator may allocate, based on the length information of the value corresponding to the key-i, a buffer that matches a length of the value to the value corresponding to the key-i. The same is true of a value corresponding to another key.

For another example, in the NVMe scenario, it is assumed that the operation indicated by the first operation manner indicator is a delete operation. Performing, on a value corresponding to each of the N keys, an operation indicated by the first operation manner indicator includes deleting values corresponding to the N keys from an NVM of the NVMe.

The foregoing example provides some possible implementation manners of deleting a value in the NVMe scenario.

For another example, in the NoF scenario, it is assumed that the operation indicated by the first operation manner indicator is a delete operation. Performing, on a value corresponding to each of the N keys, an operation indicated by the first operation manner indicator may include deleting values corresponding to the N keys from an NVM of the target.

The foregoing example provides some possible implementation manners of deleting a value in the NoF scenario.

For another example, in the NVMe scenario, it is assumed that the operation indicated by the first operation manner indicator is a write operation, and the first key-value command further carries N value pointers or N values.

When the first key-value command further carries the N value pointers, performing, on a value corresponding to each of the N keys, an operation indicated by the first operation manner indicator includes obtaining N values corresponding to the N keys from buffers to which the N value pointers carried in the first key-value command point, and writing the N values into an NVM of the NVMe, or performing, on a value corresponding to each of the N keys, an operation indicated by the first operation manner indicator when the first key-value command further carries the N values includes obtaining, by parsing the first key-value command, the N values carried in the first key-value command, and writing the N values into an NVM of the NVMe.

The foregoing example provides some possible implementation manners of writing a value in the NVMe scenario.

For another example, in the NoF scenario, it is assumed that the operation indicated by the first operation manner indicator is a write operation, and the first key-value command further carries N values or N value pointers or pointers that point to N value pointers.

Performing, on a value corresponding to each of the N keys, an operation indicated by the first operation manner indicator when the first key-value command carries the N values includes obtaining, by parsing the first key-value command, the N values carried in the first key-value command, and writing the N values into an NVM of the target, performing, on a value corresponding to each of the N keys, an operation indicated by the first operation manner indicator when the first key-value command further carries the N value pointers includes obtaining, by parsing the first key-value command, the N value pointers carried in the first key-value command, and obtaining N values corresponding to the N keys from buffers that are of the initiator and to which the N value pointers point, and writing the N values into an NVM of the target, or performing, on a value corresponding to each of the N keys, an operation indicated by the first operation manner indicator when the first key-value command further carries the pointers that point to the N value pointers includes obtaining the N value pointers from buffers of the initiator or the in-capsule data of the first key-value command based on the pointers that point to the N value pointers and that are carried in the first key-value command, and obtaining N values corresponding to the N keys from buffers that are of the initiator and to which the N value pointers point, and writing the N values into an NVM of the target.

The foregoing example provides some possible implementation manners of writing a value in the NoF scenario.

In the NVMe scenario, in some possible implementation manners, before the first key-value command is received, the method further includes receiving, by the NVMe, a third command whose format meets the NVMe interface standard, where the third command carries a third operation manner indicator and a third operation object type indicator, an operation indicated by the third operation manner indicator is an obtain operation, an operation object type indicated by the third operation object indicator includes a key, and the third command further carries a key set pointer, obtaining a key set traversal rule from a buffer to which the rule pointer points when the third command further carries a rule pointer, or obtaining, by parsing the third command, the key set traversal rule carried in the third command when the third command further carries a key set traversal rule, obtaining a key set from the NVM of the NVMe based on the key set traversal rule, and writing the obtained key set into a buffer to which the key set pointer points.

The foregoing example provides some possible implementation manners of obtaining a key in the NVMe scenario.

In the NoF scenario, in some possible implementation manners, before the first key-value command is received, the method may further include receiving, by the target, a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, when the fifth command further carries a pointer that points to a rule pointer and a pointer that points to a key set pointer, obtaining the rule pointer from a buffer of the initiator or in-capsule data of the fifth command based on the pointer that points to the rule pointer and that is carried in the fifth command, obtaining the key set pointer from a buffer of the initiator or the in-capsule data of the fifth command based on the pointer that points to the key set pointer and that is carried in the fifth command, obtaining a key set traversal rule from a buffer that is of the initiator and to which the rule pointer points, obtaining a key set from the NVM of the target based on the key set traversal rule, and writing the obtained key set into a buffer that is of the initiator and to which the key set pointer points, or receiving, by the target, a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtaining a key set traversal rule from a buffer that is of the initiator and to which the rule pointer points when the fifth command further carries a rule pointer and a key set pointer, obtaining a key set from the NVM of the target based on the key set traversal rule, and writing the obtained key set into a buffer that is of the initiator and to which the key set pointer points, or receiving, by the target, a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtaining, by parsing the fifth command, the key set traversal rule carried in the fifth command when the fifth command further carries a key set traversal rule and carries a key set pointer, obtaining a key set from the NVM of the target based on the key set traversal rule, and writing the obtained key set into a buffer that is of the initiator and to which the key set pointer points.

The foregoing example provides some possible implementation manners of obtaining a key in the NoF scenario.

Some or all of the N keys may be, for example, some or all keys in the key set.

A "pointer" mentioned in each embodiment of this application may be referred to as a "pointer descriptor." For example, a "Value pointer" may be referred to as a "Value pointer descriptor." For example, a "metadata pointer" may be referred to as a "metadata pointer descriptor." For example, a "Key pointer" may be referred to as a "Key pointer descriptor." The same is true of another case. It may be understood that a key pointer represents a pointer that points to a key, a value pointer represents a pointer that points to a value, a metadata pointer represents a pointer that points to metadata of a value, and so on.

In each embodiment of this application, a buffer allocated to a key may be referred to as a "key buffer," a buffer allocated to metadata may be referred to as a "metadata buffer," a buffer allocated to a value may be referred to as a "Value buffer," and so on.

It may be learned that in the technical solution in this embodiment, a key-value command whose format meets an NVMe interface standard is innovatively introduced, that is, the key-value command and the NVMe interface standard are organically integrated such that it is possible that a target (or an NVMe) that can support the NVMe interface standard identifies and executes the key-value command. When receiving the key-value command whose format meets the NVMe interface standard, the target (or the NVMe) obtains N keys corresponding to the key-value command, and performs, on a value corresponding to each of the N keys, an operation corresponding to the key-value command. The new access mechanism expands an access manner supporting capability of an NoF technology (an NVMe technology) such that the NoF technology (the NVMe technology) can support a key-value access manner in addition to a conventional block-based access manner, further, an application scope of the NoF technology (the NVMe technology) is expanded, and further, new requirements such as a big data application and cloud storage are better met.

For better understanding of the foregoing technical solution, the following provides detailed examples of descriptions with reference to some specific application scenarios.

Figure 4A:
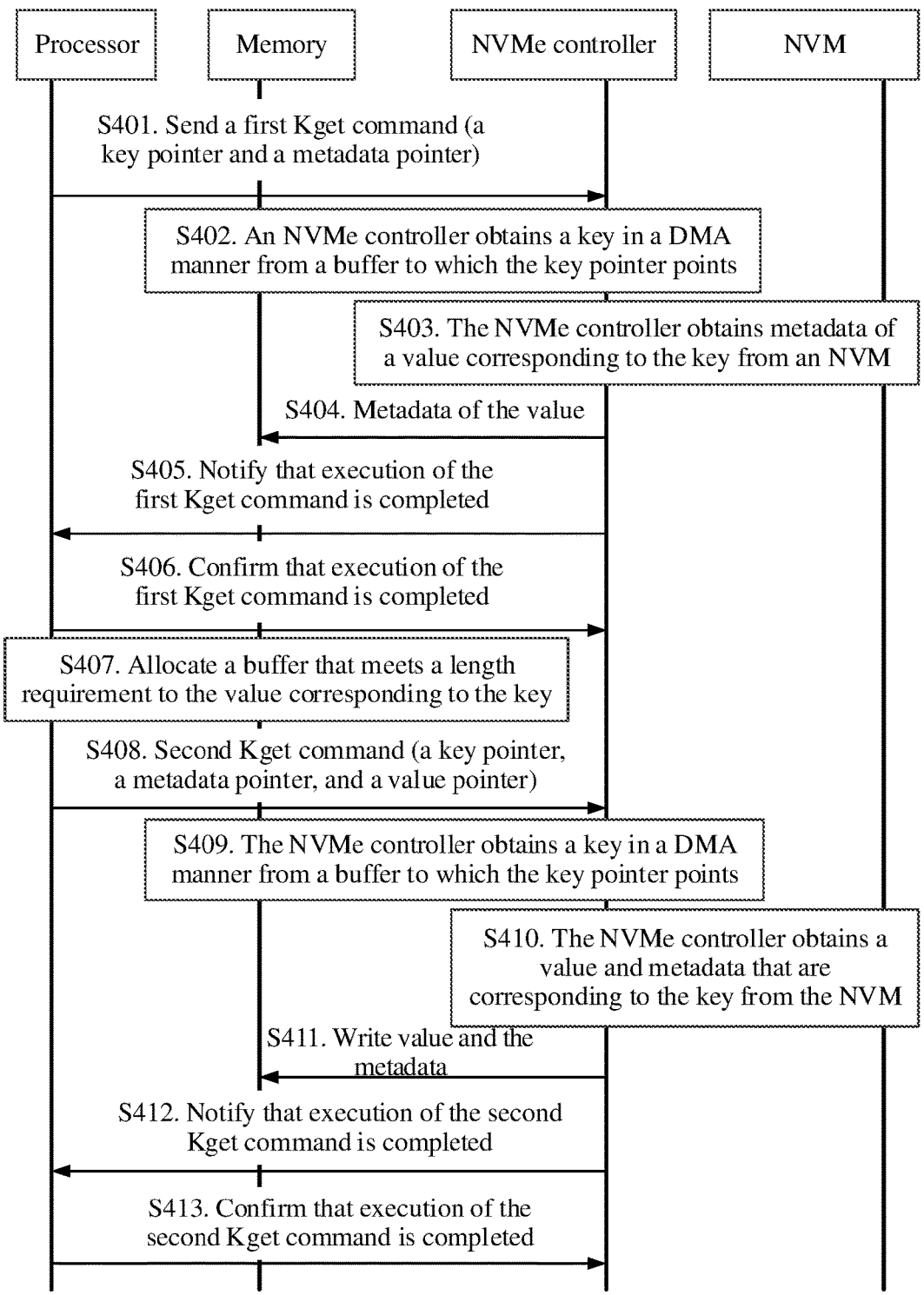
FIG. 4A is a schematic flowchart of another data access method according to an embodiment of the present disclosure.

Referring to FIG. 4A, FIG. 4A is a schematic flowchart of a data access method in an NVMe scenario corresponding to a Kget command according to another embodiment of the present disclosure. As shown in FIG. 4A, the data access method provided in the other embodiment of the present disclosure may include the following steps.

Step S401: A processor sends a first Kget command (a key pointer and a metadata pointer) to an NVMe controller.

Figure 4B:
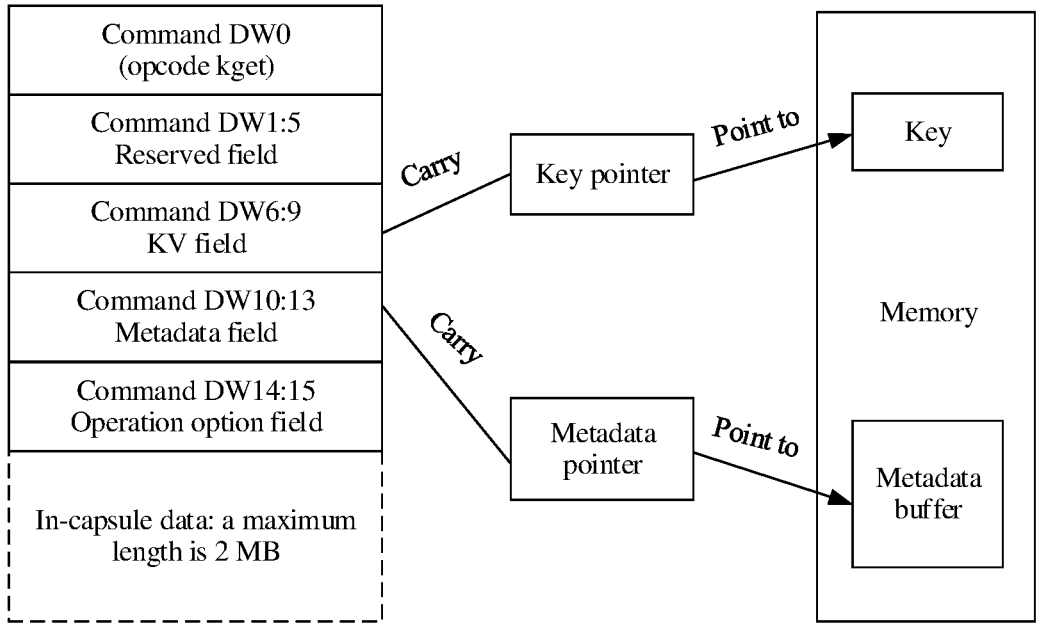
FIG. 4B and FIG. 4C are schematic diagrams of formats of several Kget commands and pointer mapping relationships according to an embodiment of the present disclosure.

It is assumed that a format of the first Kget command is shown in FIG. 4B. The first Kget command includes a metadata field, a key field, a value field, and the like. The key field and the value field may be collectively referred to as a KV field (DW6:9). The metadata field (DW10:13) in the first Kget command carries a metadata pointer, and the metadata pointer points to a metadata buffer that is allocated by the processor to metadata. The key field in the first Kget command carries a key pointer. Herein, it is assumed that the value field in the first Kget command is empty, that is, the value field does not carry any value pointer that points to a buffer (herein, it is assumed that because the processor does not learn lengths of values respectively corresponding to N keys corresponding to the first Kget command, the processor cannot purposefully allocate buffers that meet length requirements to the values. Therefore, the value field is temporarily empty). An operation option field (DW14:15) in the first Kget command indicates that the first Kget command is a command used to request to obtain metadata of a value.

For example, an operation object type indicated by an operation object type indicator carried in the operation option field in the first Kget command includes (or is) metadata of a value. For example, an operation indicated by an operation manner indicator carried in an opcode field in the first Kget command is an obtain operation.

It should be noted that in each embodiment of this application, when a field (for example, a metadata field, a key field, or a value field) in a command carries multiple pieces of content (for example, multiple pointers), the multiple pieces of content may be arranged in any sequence, and the sequence is not particularly limited. The multiple pieces of content may be organized in various forms. For example, if the multiple pieces of content are multiple pointers, these pointers may be organized in, for example, an SGL form or another form.

Step S402: The NVMe controller obtains, by parsing the first Kget command, a key pointer carried in a key field in the first Kget command, and the NVMe controller obtains a key in a DMA manner from a buffer to which the key pointer points.

Step S403: The NVMe controller obtains, from an NVM based on the obtained key, metadata of a value corresponding to the key, and the metadata of the value includes length information of the value corresponding to the key (and may further include a value version number and the like).

Step S404: The NVMe controller writes, in a DMA manner, the metadata of the value corresponding to the key into a buffer in the memory, to which a metadata pointer recorded in a metadata field in the first Kget command points.

Step S405: The NVMe controller notifies the processor that execution of the first Kget command is completed.

Step S406: The processor confirms that execution of the first Kget command is completed to the NVMe controller.

Step S407: The processor learns, according to the metadata that is of the value corresponding to the key and that is written into the buffer, a length of the value corresponding to the key, and then allocates, according to the length of the value corresponding to the key, a buffer that meets a length requirement to the value corresponding to the key.

Step S408: The processor sends a second Kget command (including a key pointer, a metadata pointer, and a value pointer) to the NVMe controller.

Figure 4C:
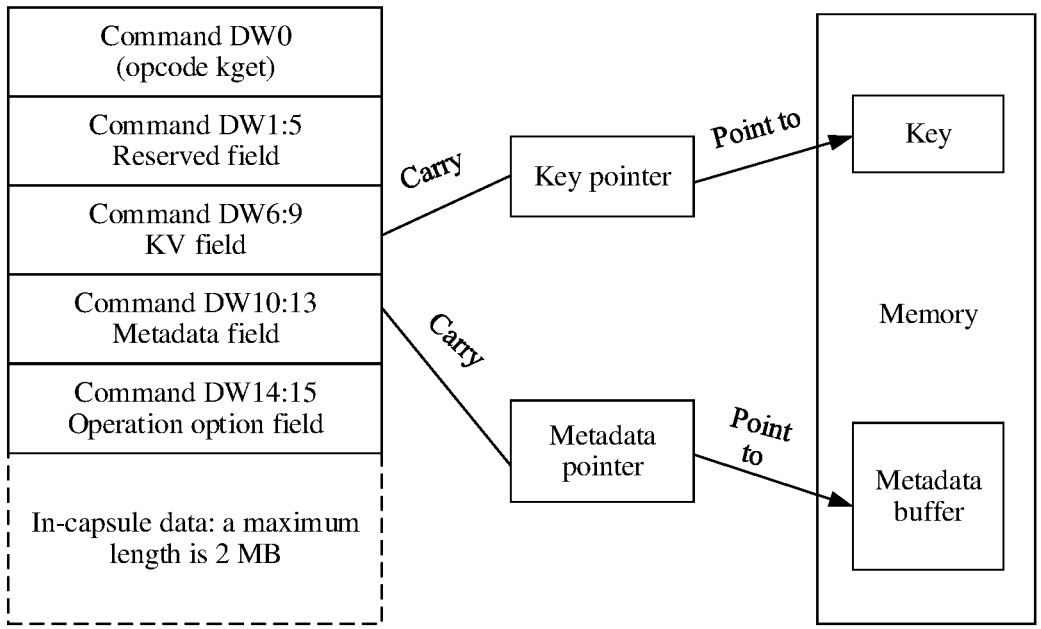

It is assumed that a format of the second Kget command is shown in FIG. 4C. The second Kget command includes a metadata field, a key field, a value field, and the like. The key field and the value field may be collectively referred to as a KV field (DW6:9).

The metadata field (DW10:13) in the second Kget command carries a metadata pointer, and the metadata pointer points to a metadata buffer that is allocated by the processor to metadata (the buffer to which the metadata pointer carried in the metadata field in the second Kget command points may be the same as or different from the buffer to which the metadata pointer carried in the metadata field in the first Kget command points). The key field in the second Kget command carries a key pointer. The value field in the second Kget command carries a value pointer (not shown). The value pointer points to the buffer that is allocated, in step S407, by the processor to the value corresponding to the key.

An operation option field (DW14:15) in the second Kget command indicates that the second Kget command is a command for obtaining a value.

For example, an operation object type indicated by an operation object type indicator carried in the operation option field in the second Kget command includes a value (and may further include metadata). For example, an operation indicated by an operation manner indicator carried in an opcode field in the second Kget command is an obtain operation.

Step S409: The NVMe controller obtains, by parsing the second Kget command, a key pointer carried in a key field in the second Kget command, and the NVMe controller further obtains a key in a DMA manner from a buffer to which the key pointer points.

Step S410: The NVMe controller obtains, based on the obtained key, a value corresponding to the key and metadata of the value corresponding to the key from the NVM.

Step S411: The NVMe controller writes, in a DMA manner, the metadata of the value corresponding to the obtained key into a buffer to which a metadata pointer carried in a metadata field (DW10:13) in the second Kget command points, and the NVMe controller writes, in a DMA manner, the value corresponding to the obtained key into a buffer to which a value pointer carried in a value field in the second Kget command points.

Step S412: The NVMe controller notifies the processor that execution of the second Kget command is completed.

Step S413: The processor confirms that execution of the second Kget command is completed to the NVMe controller.

It may be learned that the foregoing example provides some possible implementation manners of efficiently obtaining a value in the NVMe scenario.

Figure 5A:
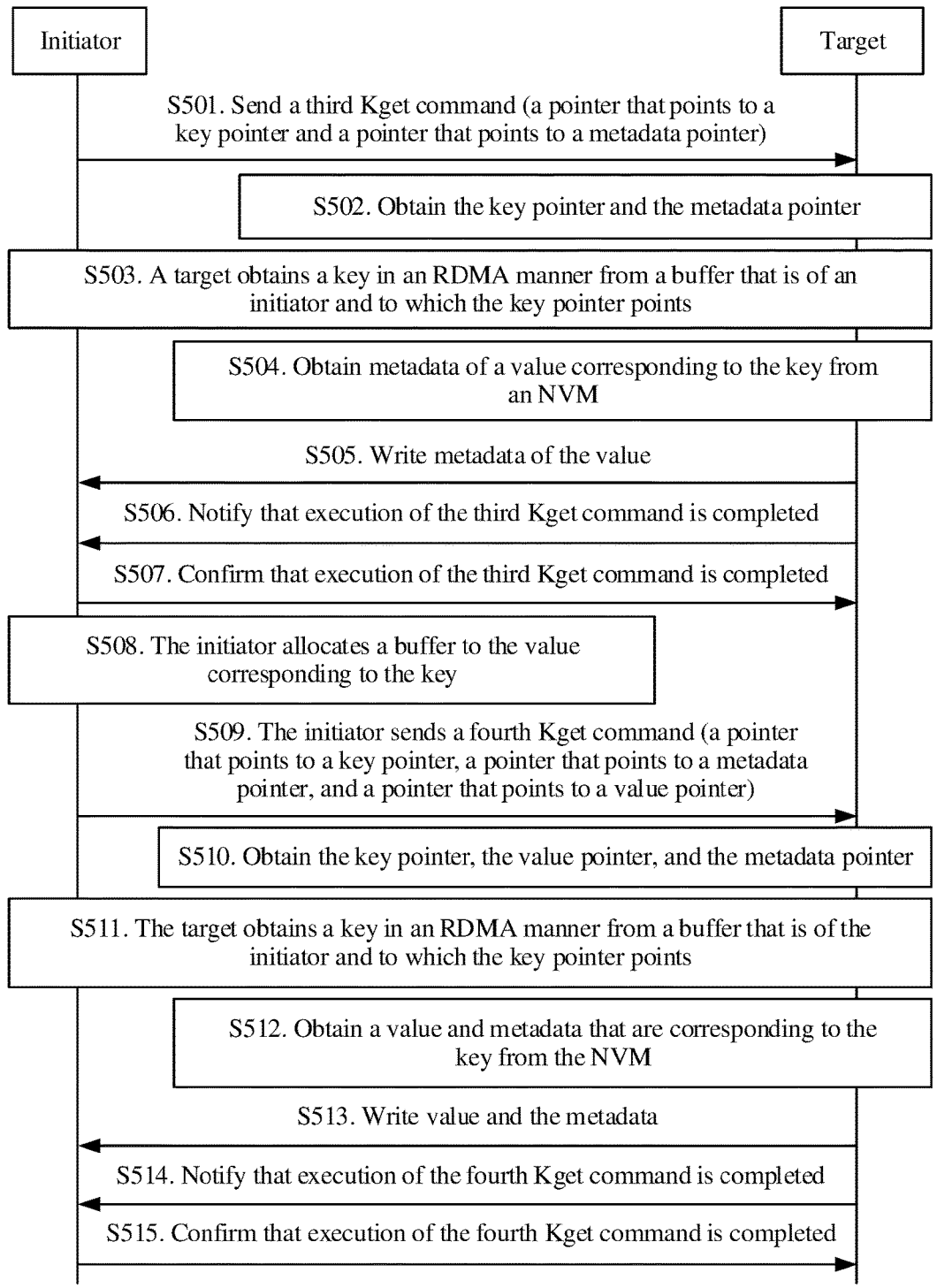
FIG. 5A is a schematic flowchart of another data access method according to an embodiment of the present disclosure.

Referring to FIG. 5A, FIG. 5A is a schematic flowchart of a data access method in an NoF scenario corresponding to a Kget command according to another embodiment of the present disclosure. As shown in FIG. 5A, the data access method provided in the other embodiment of the present disclosure may include the following steps.

Step S501: An initiator sends a third Kget command (a pointer that points to a key pointer and a pointer that points to a metadata pointer) to a target.

Figure 5B:
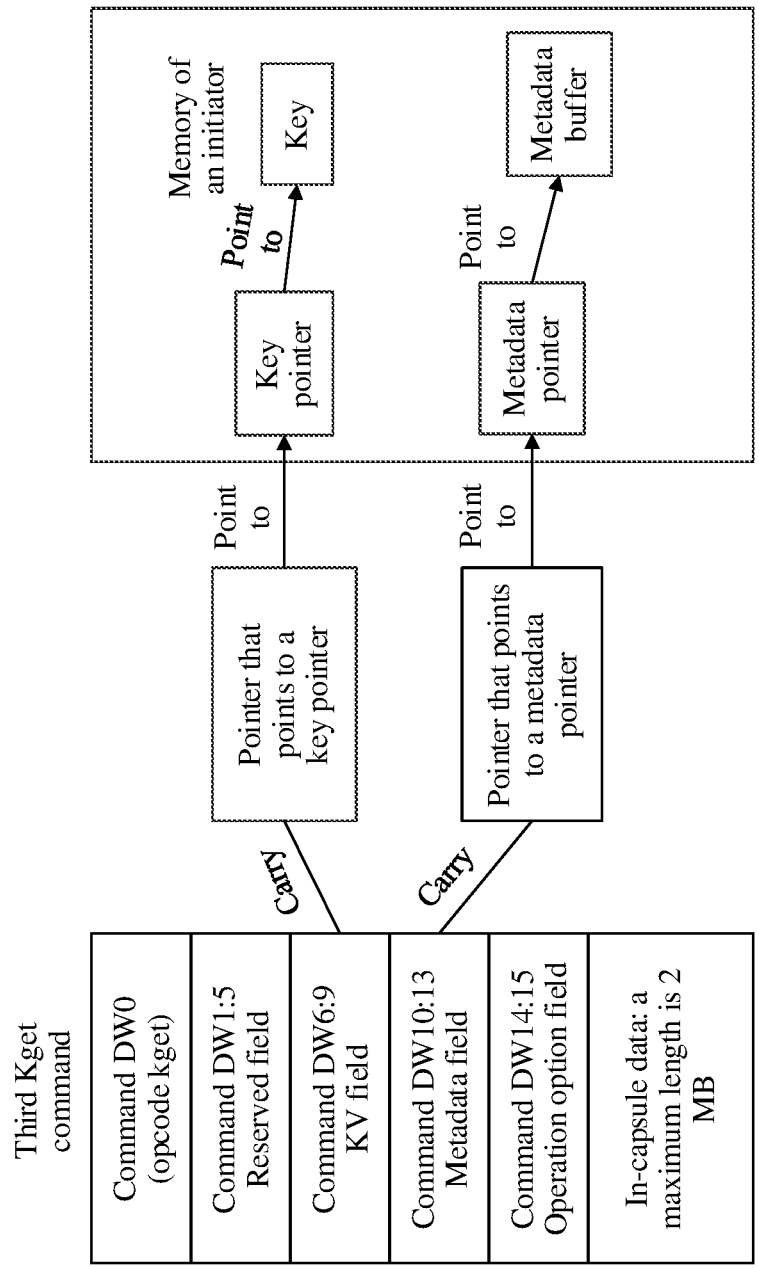
FIG. 5B to FIG. 5E are schematic diagrams of formats of several Kget commands and pointer mapping relationships according to an embodiment of the present disclosure.

It is assumed that a format of the third Kget command is shown in FIG. 5B. The third Kget command includes a metadata field, a key field, and a value field. The key field and the value field may be collectively referred to as a KV field (DW6:9). The value field in the third Kget command is empty. Herein, it is assumed that because the initiator does not learn a length of a value corresponding to a key corresponding to the third Kget command, the initiator cannot purposefully allocate a buffer that meets a length requirement to the value. Therefore, the value field is temporarily empty. The metadata field (DW10:13) in the third Kget command carries a pointer that points to a metadata pointer, and the metadata pointer points to a metadata buffer that is allocated by the initiator to metadata. The key field in the third Kget command carries a pointer that points to a key pointer, and the key pointer points to a key. An operation option field (DW14:15) in the third Kget command indicates that the third Kget command is a command used to request to obtain metadata of a value.

For example, an operation object type indicated by an operation object type indicator carried in the operation option field in the third Kget command includes or is metadata of a value. For example, an operation indicated by an operation manner indicator carried in an opcode field in the third Kget command is an obtain operation.

Step S502: The target obtains, by parsing the third Kget command, a pointer that points to a key pointer and that is carried in a key field in the third Kget command and a pointer that points to a metadata pointer and that is carried in a metadata field in the third Kget command.

If the pointer that points to the key pointer and that is carried in the key field in the third Kget command points to a buffer of the initiator (for example, as shown in FIG. 5B), the target may obtain the key pointer from the buffer of the initiator in an RDMA manner based on the pointer that points to the key pointer and that is carried in the key field in the third Kget command. In addition, if the pointer that points to the metadata pointer and that is carried in the metadata field in the third Kget command further points to a buffer of the initiator, the target may obtain the metadata pointer from the buffer of the initiator in an RDMA manner based on the pointer that points to the metadata pointer and that is carried in the metadata field in the third Kget command.

Figure 5C:
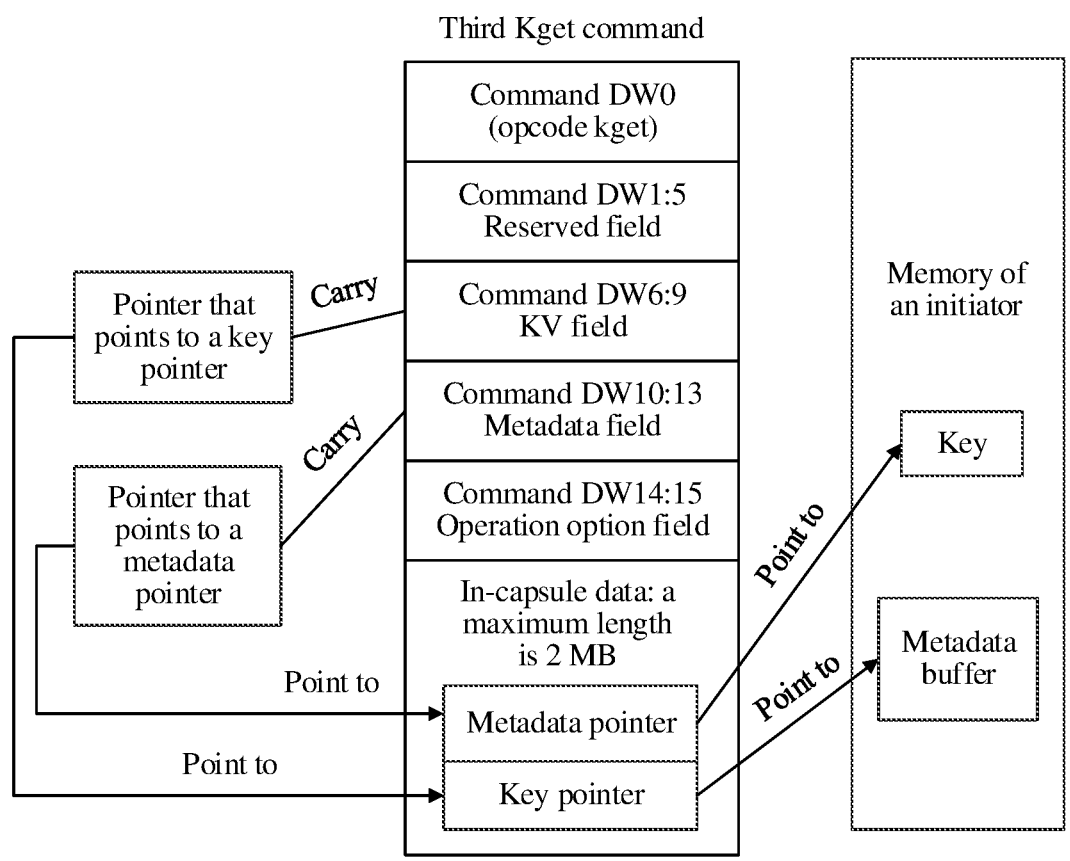

Alternatively, if the pointer that points to the key pointer and that is carried in the key field in the third Kget command points to in-capsule data of the third Kget command (as shown in FIG. 5C), the target may obtain the key pointer from the in-capsule data of the third Kget command based on the pointer that points to the key pointer and that is carried in the key field in the third Kget command. In addition, if the pointer that points to the metadata pointer and that is carried in the metadata field in the third Kget command further points to the in-capsule data of the third Kget command, the target may obtain the metadata pointer from the in-capsule data of the third Kget command based on the pointer that points to the metadata pointer and that is carried in the metadata field in the third Kget command.

Step S503: The target obtains, from a buffer of the initiator in an RDMA manner based on the obtained key pointer, a key to which the key pointer points.

Step S504: The target obtains metadata of a value corresponding to the key from an NVM, and the metadata of the value includes length information of the value corresponding to the key (the metadata of the value may further include a value version number and the like).

Step S505: The target writes, in an RDMA manner, the metadata of the value corresponding to the key into a buffer that is of the initiator and to which the metadata pointer points.

Step S506: The target may further notify the initiator that execution of the third Kget command is completed.

Step S507: The initiator confirms that execution of the third Kget command is completed.

Step S508: The initiator learns, according to the metadata that is of the value corresponding to the key and that is written into the buffer, a length of the value corresponding to the key, and then allocates, according to the length of the value corresponding to the key, a buffer that is of the initiator and that meets a length requirement to the value corresponding to the key.

Step S509: The initiator sends a fourth Kget command (a pointer that points to a key pointer, a pointer that points to a metadata pointer, and a pointer that points to a value pointer) to the target.

Figure 5D:
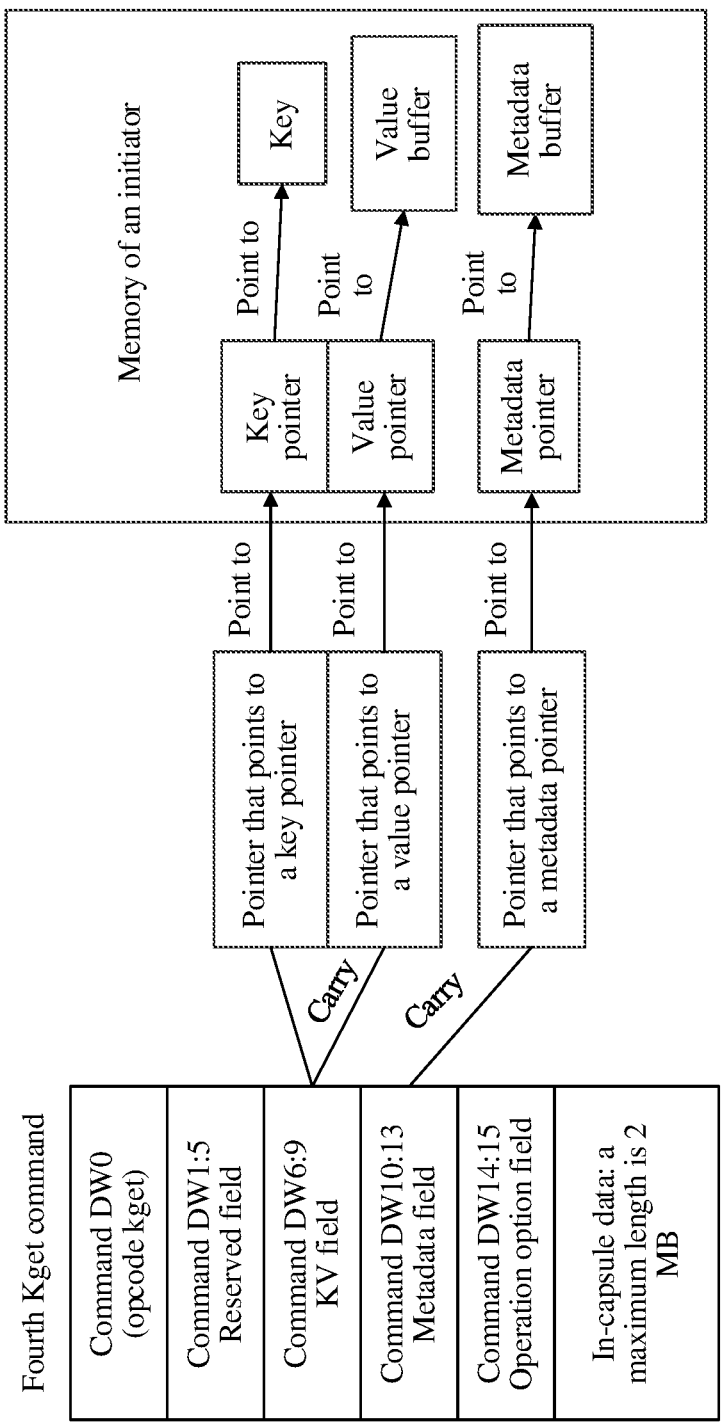

It is assumed that a format of the fourth Kget command is shown in FIG. 5D. The fourth Kget command includes a metadata field, a key field, and a value field. The key field and the value field may be collectively referred to as a KV field (DW6:9).

The value field in the fourth Kget command carries a pointer that points to a value pointer (the value pointer points to the value buffer that is of the initiator and that is allocated, in step S508, by the initiator to the value corresponding to the key). The metadata field (DW10:13) in the fourth Kget command carries a pointer that points to a metadata pointer, and the metadata pointer points to a metadata buffer that is of the initiator and that is allocated by the initiator to metadata. The key field in the fourth Kget command carries a pointer that points to a key pointer. An operation option field (DW14:15) in the fourth Kget command indicates that the fourth Kget command is a command used to request to obtain a value. The buffer to which the metadata pointer (that is, the metadata pointer to which the pointer carried in the metadata field (DW10:13) in the fourth Kget command points) corresponding to the fourth Kget command points may be the same as or different from the buffer to which the metadata pointer (that is, the metadata pointer to which the pointer carried in the metadata field (DW10:13) in the third Kget command points) corresponding to the third Kget command points.

For example, an operation object type indicated by an operation object type indicator carried in the operation option field in the fourth Kget command includes a value (and may further include metadata). For example, an operation indicated by an operation manner indicator carried in an opcode field in the fourth Kget command is an obtain operation.

Step S510: The target receives the fourth Kget command, and the target obtains, by parsing the fourth Kget command, a pointer that points to a key pointer and that is carried in a key field in the fourth Kget command, a pointer that points to a value pointer and that is carried in a value field in the fourth Kget command, and a pointer that points to a metadata pointer and that is carried in a metadata field in the fourth Kget command.

If the pointer that points to the key pointer and that is carried in the key field in the fourth Kget command further points to a buffer of the initiator (for example, as shown in FIG. 5D), the target may obtain the key pointer from the buffer of the initiator in an RDMA manner based on the pointer that points to the key pointer and that is carried in the key field in the fourth Kget command. In addition, if the pointer that points to the metadata pointer and that is carried in the metadata field in the fourth Kget command further points to a buffer of the initiator, the target obtains the metadata pointer from the buffer of the initiator in an RDMA manner based on the pointer that points to the metadata pointer and that is carried in the metadata field in the fourth Kget command. In addition, if the pointer that points to the value pointer and that is carried in the value field in the fourth Kget command further points to a buffer of the initiator, the target may obtain the value pointer from the buffer of the initiator in an RDMA manner based on the pointer that points to the value pointer and that is carried in the value field in the fourth Kget command.

Figure 5E:
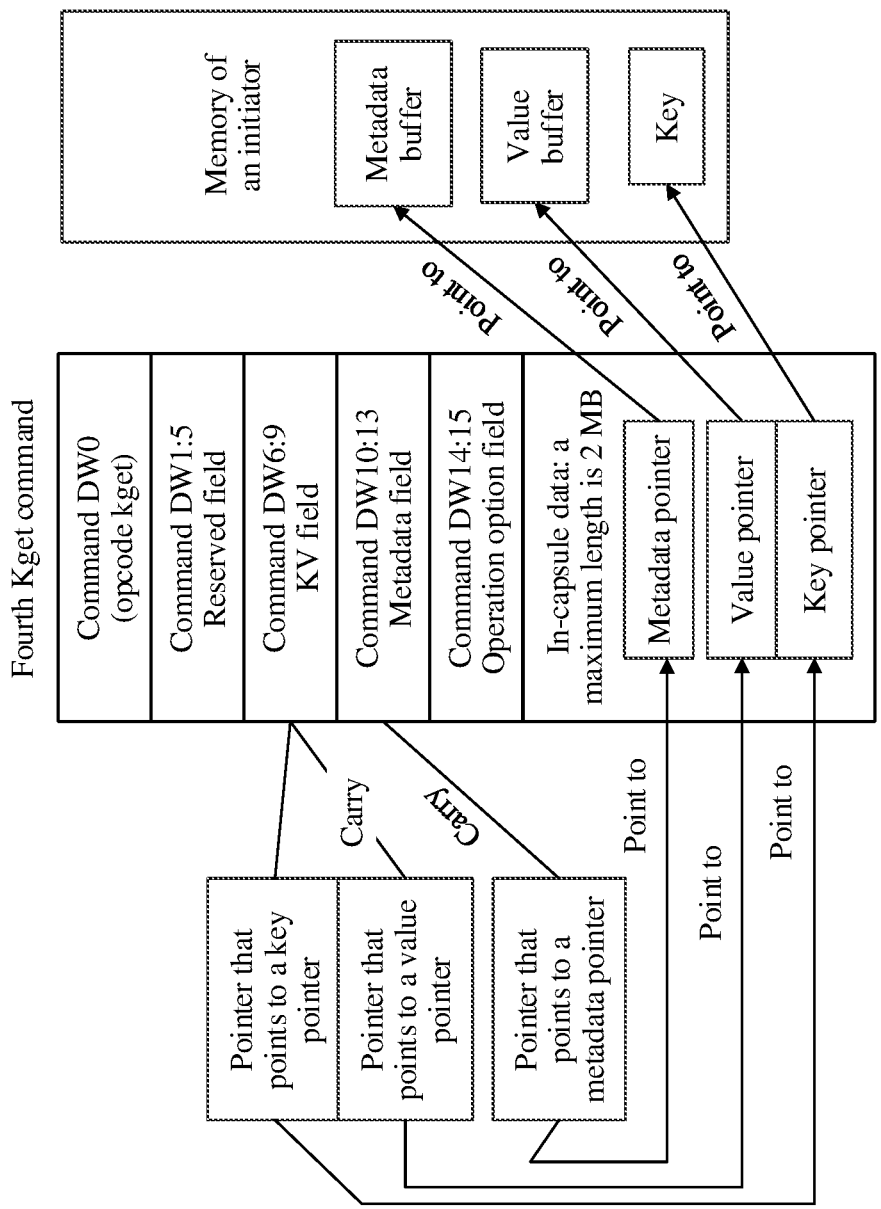

Alternatively, if the pointer that points to the key pointer and that is carried in the key field in the fourth Kget command further points to in-capsule data of the fourth Kget command (for example, as shown in FIG. 5E), the target obtains the key pointer from the in-capsule data of the fourth Kget command based on the pointer that points to the key pointer and that is carried in the key field in the fourth Kget command. In addition, if the pointer that points to the metadata pointer and that is carried in the metadata field in the fourth Kget command further points to the in-capsule data of the fourth Kget command, the target obtains the metadata pointer from the in-capsule data of the fourth Kget command based on the pointer that points to the metadata pointer and that is carried in the metadata field in the fourth Kget command. In addition, if the pointer that points to the value pointer and that is carried in the value field in the fourth Kget command further points to the in-capsule data of the fourth Kget command, the target obtains the value pointer from the in-capsule data of the fourth Kget command based on the pointer that points to the value pointer and that is carried in the value field in the fourth Kget command.

Step S511: The target obtains, from a buffer of the initiator in an RDMA manner based on the obtained key pointer, a key to which the key pointer points.

Step S512: The target obtains a value corresponding to the key and metadata of the value corresponding to the key from the NVM.

Step S513: The target writes, in a RDMA manner, the value corresponding to the key into a buffer to which the value pointer corresponding to the fourth Kget command points, and the target writes, in a DMA manner, the metadata of the value corresponding to the key into a buffer to which the metadata pointer corresponding to the fourth Kget command points.

Step S514: The target may further notify the initiator that execution of the fourth Kget command is completed.

Step S515: The initiator confirms that execution of the fourth Kget command is completed.

It may be learned that the foregoing example provides some possible implementation manners of efficiently obtaining a value in the NoF scenario.

Figure 6A:
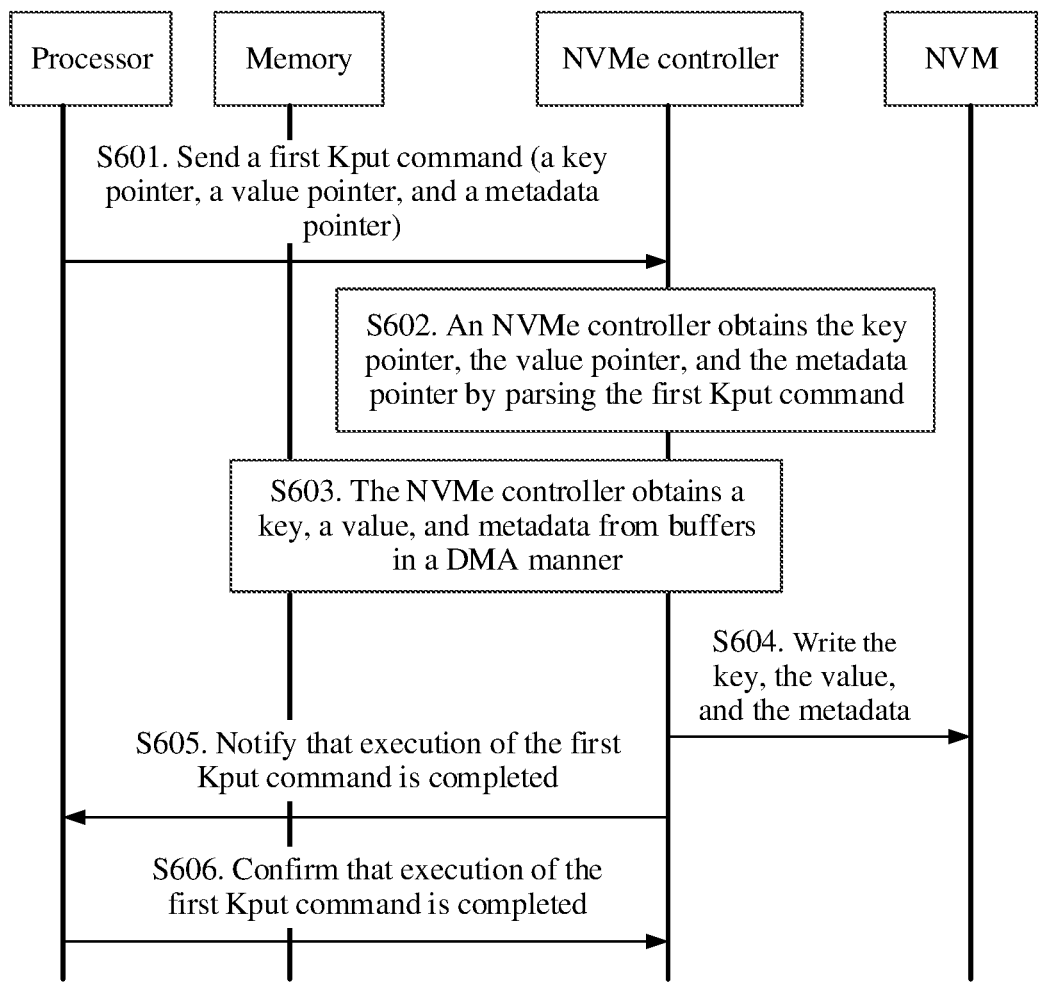
FIG. 6A is a schematic flowchart of another data access method according to an embodiment of the present disclosure.

Referring to FIG. 6A, FIG. 6A is a schematic flowchart of a data access method in an NVMe scenario corresponding to a Kput command according to another embodiment of the present disclosure. As shown in FIG. 6A, the data access method provided in another embodiment of the present disclosure may include the following steps.

Step S601: A processor sends a first Kput command (including a key pointer, a value pointer, and a metadata pointer) to an NVMe controller.

Figure 6B:
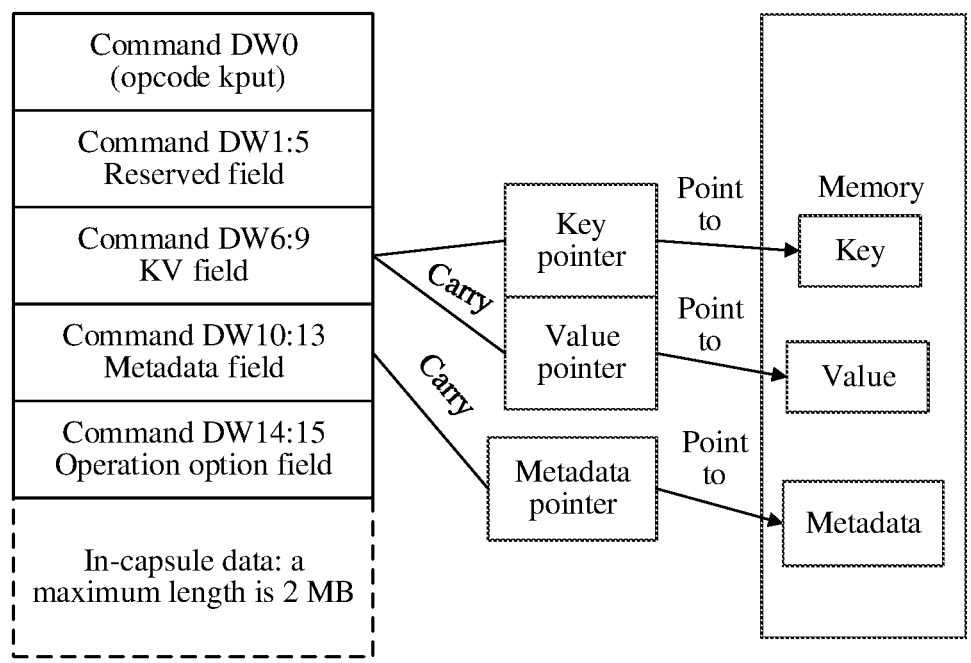
FIG. 6B is a schematic diagram of a format of a Kput command and a pointer mapping relationship according to an embodiment of the present disclosure.

It is assumed that a format of the first Kput command is shown in FIG. 6B. The first Kput command includes a metadata field, a key field, and a value field. The key field and the value field may be collectively referred to as a KV field (DW6:9).

The key field in the first Kput command carries a key pointer, and the key pointer points to (through a buffer that is allocated by the processor to) a key. The value field in the first Kput command carries a value pointer, and the value pointer points to (through a buffer that is allocated by the processor to) a value corresponding to the key. The metadata field (DW10:13) in the first Kput command carries a metadata pointer, and the metadata pointer points to (through a buffer that is allocated by the processor to) metadata of the value. An operation option field (DW14:15) in the first Kput command indicates that the first Kput command is a command used to request to write a value.

For example, an operation object type indicated by an operation object type indicator carried in the operation option field in the first Kput command includes a value (and may further include a key and/or metadata). For example, an operation indicated by an operation manner indicator carried in an opcode field in the first Kput command is a write operation.

Step S602: An NVMe controller receives the first Kput command, and the NVMe controller obtains, by parsing the first Kput command, a key pointer carried in a key field in the first Kput command, a metadata pointer carried in a metadata field, and a value pointer carried in a value field.

Step S603: The NVMe controller may obtain a key in a DMA manner from a buffer to which the key pointer points, the NVMe controller obtains, in a DMA manner, a value corresponding to the key from a buffer to which the value pointer points, and the NVMe controller obtains metadata of the value in a DMA manner from a buffer to which the metadata pointer points.

Step S604: The NVMe controller writes the obtained key, the obtained value corresponding to the key, and the obtained metadata of the value into an NVM.

Step S605: The NVMe controller notifies the processor that execution of the first Kput command is completed.

Step S606: The processor may further confirm that execution of the first Kput command is completed.

It may be learned that the foregoing example provides some possible implementation manners of efficiently writing a value in the NVMe scenario.

Figure 7A:
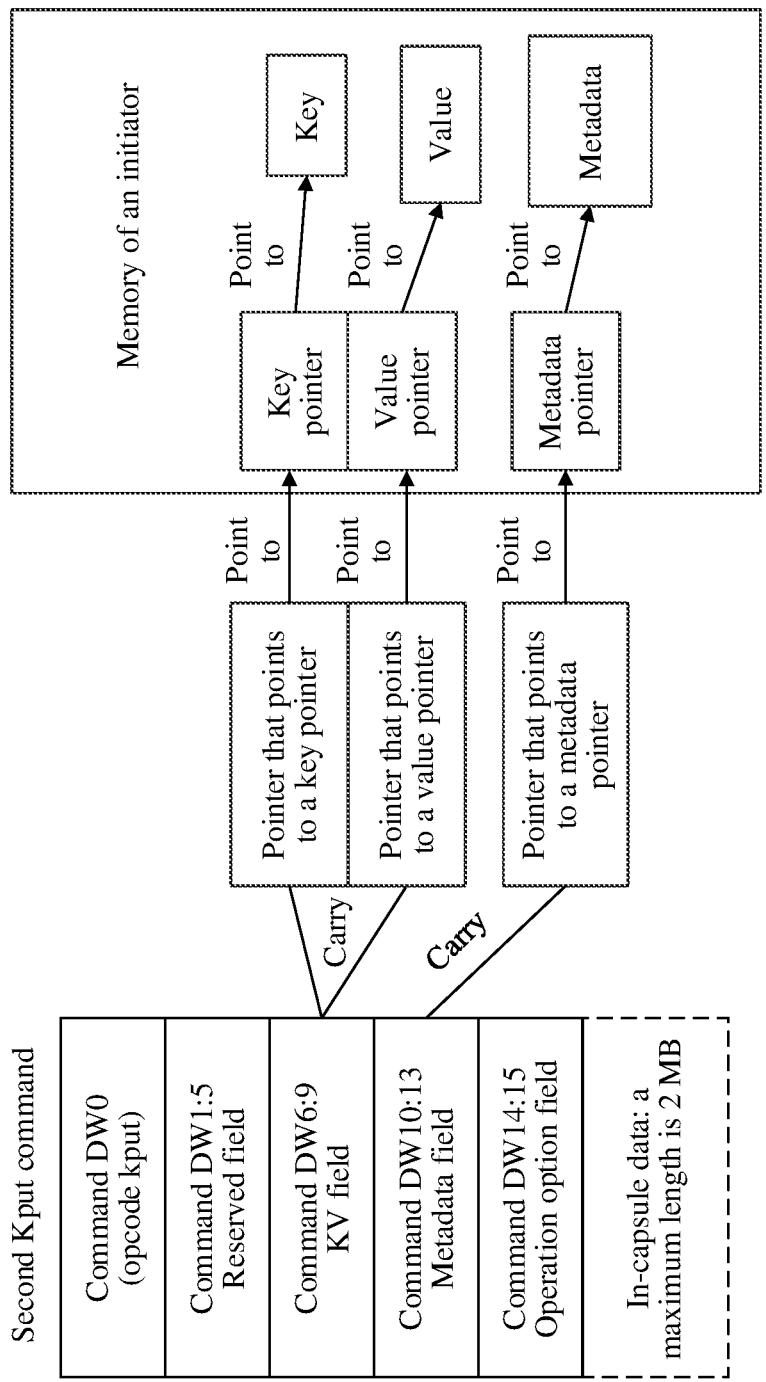
FIG. 7A and FIG. 7B are schematic diagrams of formats of several Kput commands and pointer mapping relationships according to an embodiment of the present disclosure.
Figure 7B:
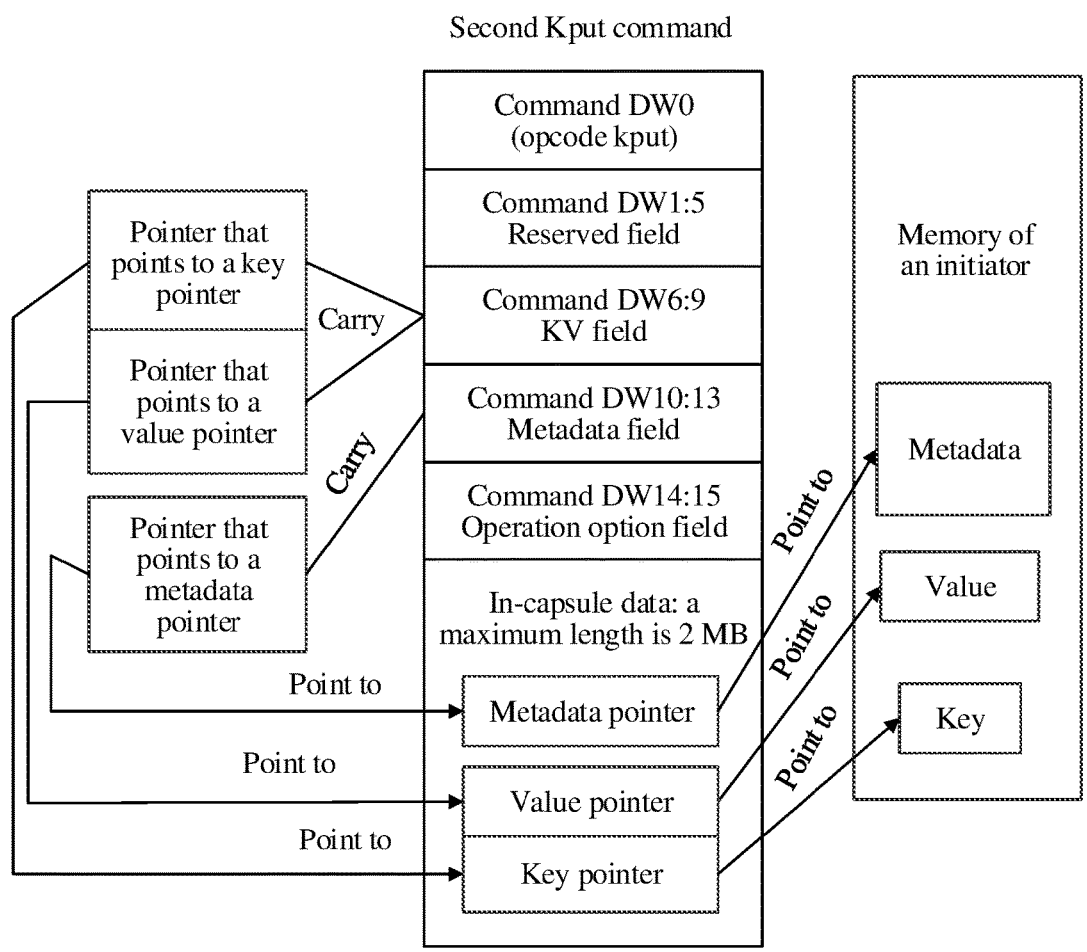
Figure 7C:
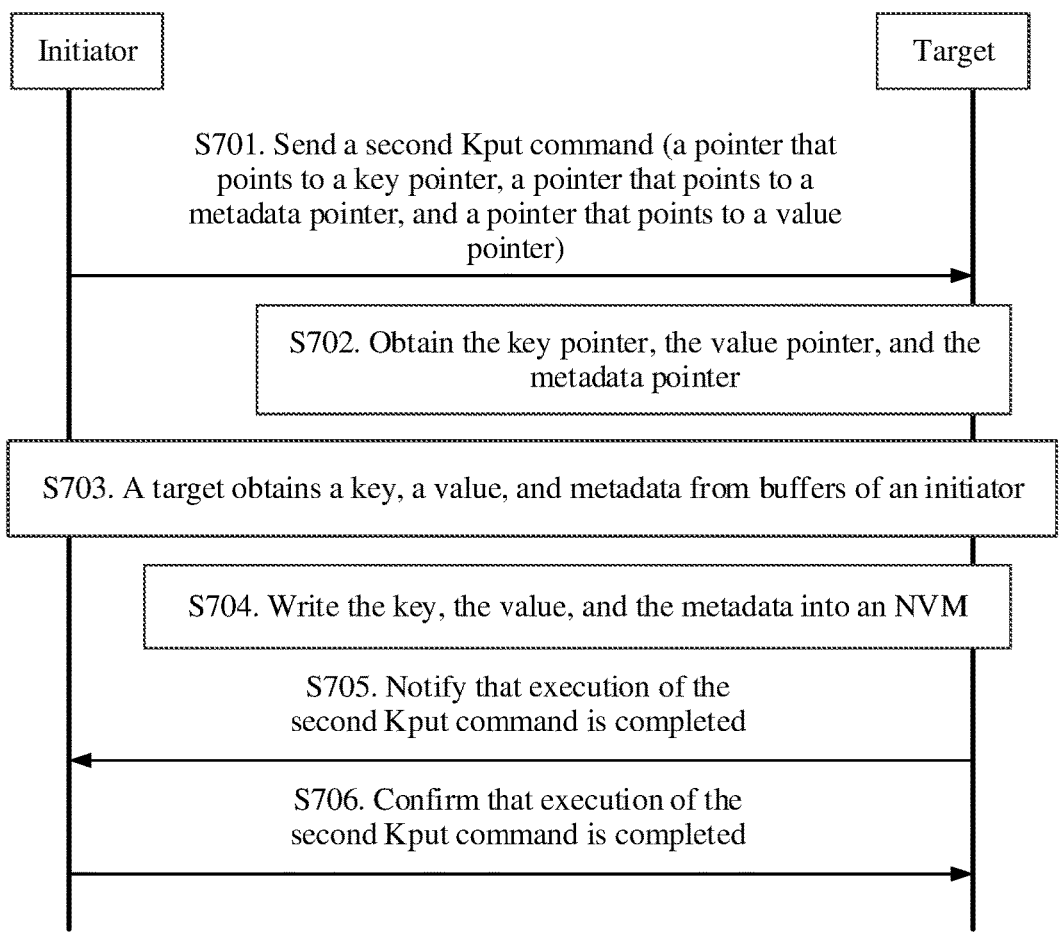
FIG. 7C is a schematic flowchart of another data access method according to an embodiment of the present disclosure.

Referring to FIG. 7C, FIG. 7C is a schematic flowchart of a data access method in an NoF scenario corresponding to a Kput command according to another embodiment of the present disclosure. As shown in FIG. 7C, the data access method provided in the other embodiment of the present disclosure may include the following steps.

Step S701: An initiator sends a second Kput command (including a pointer that points to a key pointer, a pointer that points to a metadata pointer, and a pointer that points to a value pointer) to a target.

It is assumed that a format of the second Kput command is shown in FIG. 7A. The second Kput command includes a metadata field, a key field, and a value field. The key field and the value field may be collectively referred to as a KV field (DW6:9).

The key field in the second Kput command carries a pointer that points to a key pointer, and the key pointer points to (through a buffer that is allocated by the initiator to)

a key. The value field in the second Kput command carries a pointer that points to a value pointer, and the value pointer points to (through a buffer that is allocated by the processor to) a value corresponding to the key. The metadata field (DW10:13) in the second Kput command carries a pointer that points to a metadata pointer, and the metadata pointer points to (through a buffer that is allocated by the processor to) metadata of the value. An operation option field (DW14:15) in the second Kput command indicates that the second Kput command is a command used to request to write a value.

For example, an operation object type indicated by an operation object type indicator carried in the operation option field in the second Kput command includes a value (and may further include a key, metadata, and the like). For example, an operation indicated by an operation manner indicator carried in an opcode field in the second Kput command is a write operation.

Step S702: The target receives the second Kput command, and the target obtains, by parsing the second Kput command, a pointer that points to a key pointer and that is carried in a key field in the second Kput command, a pointer that points to a metadata pointer and that is carried in a metadata field, and a pointer that points to a value pointer and that is carried in a value field.

If the pointer that points to the key pointer and that is carried in the key field in the second Kput command further points to a buffer of the initiator (as shown in FIG. 7A), the target obtains the key pointer from the buffer of the initiator in an RDMA manner based on the pointer that points to the key pointer and that is carried in the key field in the second Kput command. In addition, if the pointer that points to the metadata pointer and that is carried in the metadata field in the second Kput command further points to a buffer of the initiator, the target obtains the metadata pointer from the buffer of the initiator in an RDMA manner based on the pointer that points to the metadata pointer and that is carried in the metadata field in the second Kput command. In addition, if the pointer that points to the value pointer and that is carried in the value field in the second Kput command further points to a buffer of the initiator, the target obtains the value pointer from the buffer of the initiator in an RDMA manner based on the pointer that points to the value pointer and that is carried in the value field in the second Kput command.

Alternatively, if the pointer that points to the key pointer and that is carried in the key field in the second Kput command further points to in-capsule data of the second Kput command (as shown in FIG. 7B), the target obtains the key pointer from the in-capsule data of the second Kput command based on the pointer that points to the key pointer and that is carried in the key field in the second Kput command. In addition, if the pointer that points to the metadata pointer and that is carried in the metadata field in the second Kput command further points to the in-capsule data of the second Kput command, the target obtains the metadata pointer from the in-capsule data of the second Kput command based on the pointer that points to the metadata pointer and that is carried in the metadata field in the second Kput command. In addition, if the pointer that points to the value pointer and that is carried in the value field in the second Kput command further points to the in-capsule data of the second Kput command, the target obtains the value pointer from the in-capsule data of the second Kput command based on the pointer that points to the value pointer and that is carried in the value field in the second Kput command.

Step S703: The target obtains a key in an RDMA manner from a buffer that is of the initiator and to which the key pointer points, the target obtains, in an RDMA manner, a value corresponding to the key from a buffer that is of the initiator and to which the value pointer points, and the target obtains metadata of the value in an RDMA manner from a buffer that is of the initiator and to which the metadata pointer points.

Step S704: The target writes the obtained key, the obtained value corresponding to the key, and the obtained metadata of the value into an NVM.

Step S705: The target notifies the initiator that execution of the second Kput command is completed.

Step S706: The initiator may further confirm that execution of the second Kput command is completed.

It may be learned that the foregoing example provides some possible implementation manners of efficiently writing a value in the NoF scenario.

Figure 8A:
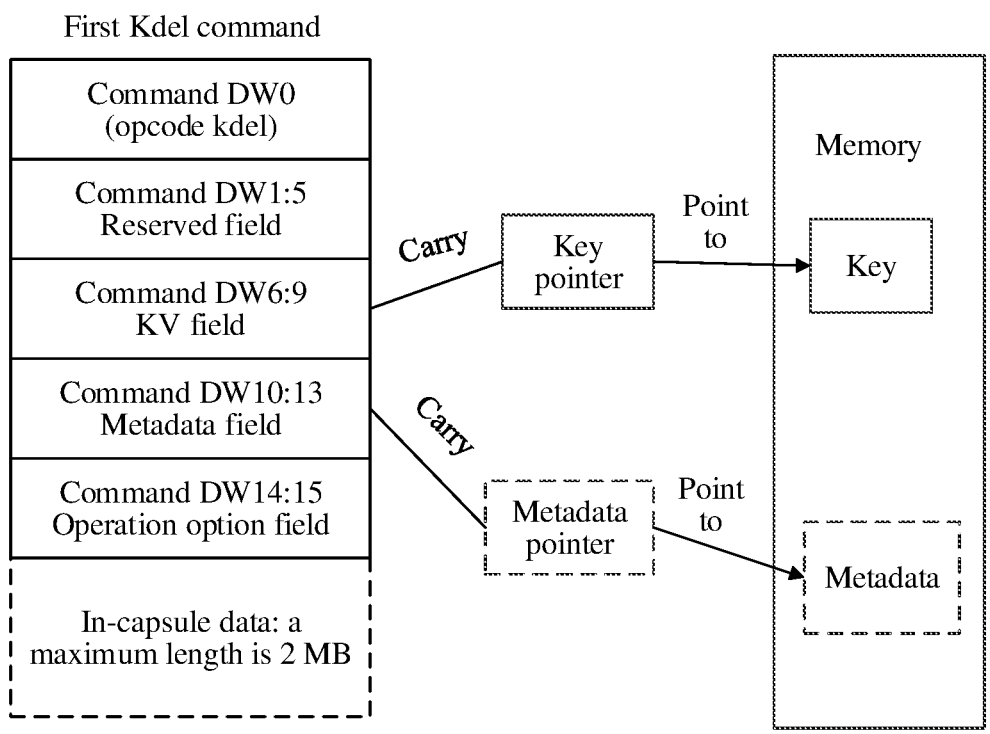
FIG. 8A is a schematic diagram of a format of a Kdel command and a pointer mapping relationship according to an embodiment of the present disclosure.
Figure 8B:
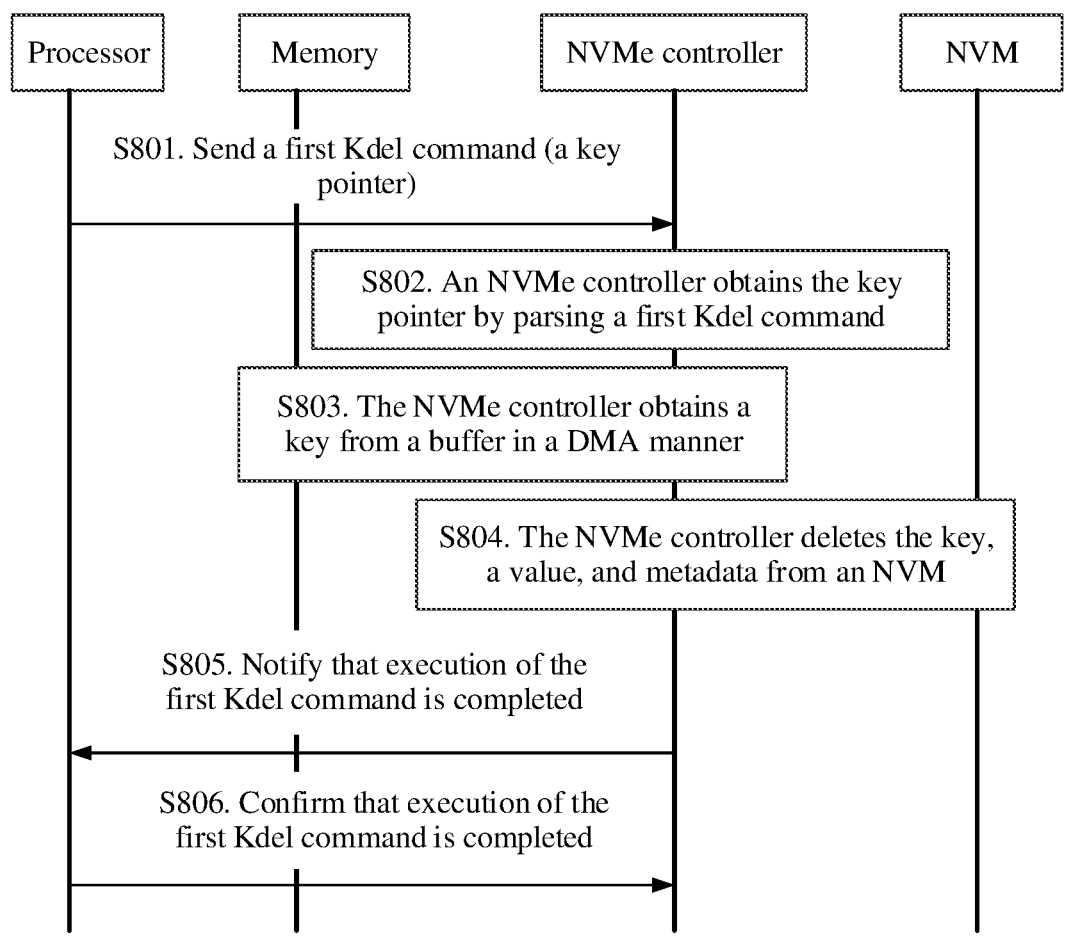
FIG. 8B is a schematic flowchart of another data access method according to an embodiment of the present disclosure.

Referring to FIG. 8B, FIG. 8B is a schematic flowchart of a data access method in an NVMe scenario corresponding to a Kdel command according to another embodiment of the present disclosure. As shown in FIG. 8B, the data access method provided in the other embodiment of the present disclosure may include the following steps.

Step S801: A processor sends a first Kdel command (including a key pointer).

It is assumed that a format of the first Kdel command is shown in FIG. 8A. The first Kdel command includes a metadata field (optional), a key field, and a value field (optional). The key field and the value field may be collectively referred to as a KV SGL field (DW6:9).

The key field in the first Kdel command carries a key pointer, and the key pointer points to a buffer that is allocated by the processor to a key. The metadata field (DW10:13) in the first Kdel command carries a metadata pointer, and the metadata pointer points to a buffer that is allocated by the processor to metadata. An operation option field (DW14:15) in the first Kdel command indicates that the first Kdel command is a command used to request to delete a value.

For example, an operation object type indicated by an operation object type indicator carried in the operation option field in the first Kdel command includes a value (and may further include a key, metadata, and the like). For example, an operation indicated by an operation manner indicator carried in an opcode field in the first Kdel command is a delete operation.

Step S802: An NVMe controller receives the first Kdel command, the NVMe controller obtains, by parsing the first Kdel command, a key pointer carried in a key field in the first Kdel command, and if a metadata field in the first Kdel command carries a metadata pointer, the NVMe controller may further obtain, by parsing the first Kdel command, the metadata pointer carried in the metadata field in the first Kdel command.

Step S803: The NVMe controller may obtain a key in a DMA manner from a buffer to which the key pointer points.

In addition, if the metadata field in the first Kdel command carries the metadata pointer, the NVMe controller may obtain, in a DMA manner, metadata (the metadata includes a value version number) of a value corresponding to the key from the buffer to which the metadata pointer points.

Step S804: The NVMe controller searches an NVM for a value corresponding to the key, and deletes the value corresponding to the key.

If the metadata field in the first Kdel command does not carry the metadata pointer, the NVMe controller deletes, from the NVM, values that are of all versions and that are corresponding to the key. In addition, if the metadata field in the first Kdel command carries the metadata pointer, and the NVMe controller obtains, in a DMA manner, the metadata (the metadata includes the value version number) of the value corresponding to the key from the buffer to which the metadata pointer points, the NVMe controller deletes, from the NVM, a value corresponding to the value version number included in the metadata and that is in the values that are of all the versions and that are corresponding to the key, but may reserve a value of another version.

Step S805: The NVMe controller notifies the processor that execution of the first Kdel command is completed.

Step S806: The processor may further confirm that execution of the first Kdel command is completed.

It may be learned that the foregoing example provides some possible implementation manners of efficiently deleting a value in the NVMe scenario.

Figure 9A:
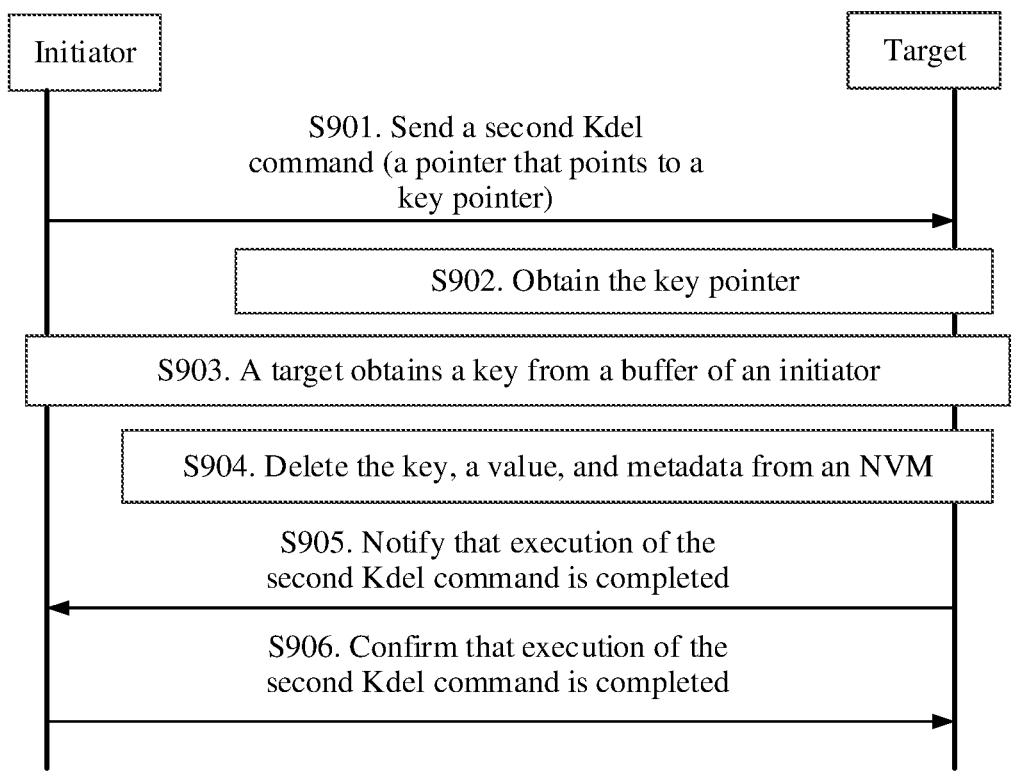
FIG. 9A is a schematic flowchart of another data access method according to an embodiment of the present disclosure.

Referring to FIG. 9A, FIG. 9A is a schematic flowchart of a data access method in an NoF scenario corresponding to a Kdel command according to another embodiment of the present disclosure. As shown in FIG. 9A, the data access method provided in another embodiment of the present disclosure may include the following steps.

Step S901: An initiator sends a second Kdel command (including a pointer that points to a key pointer) to a target.

Figure 9B:
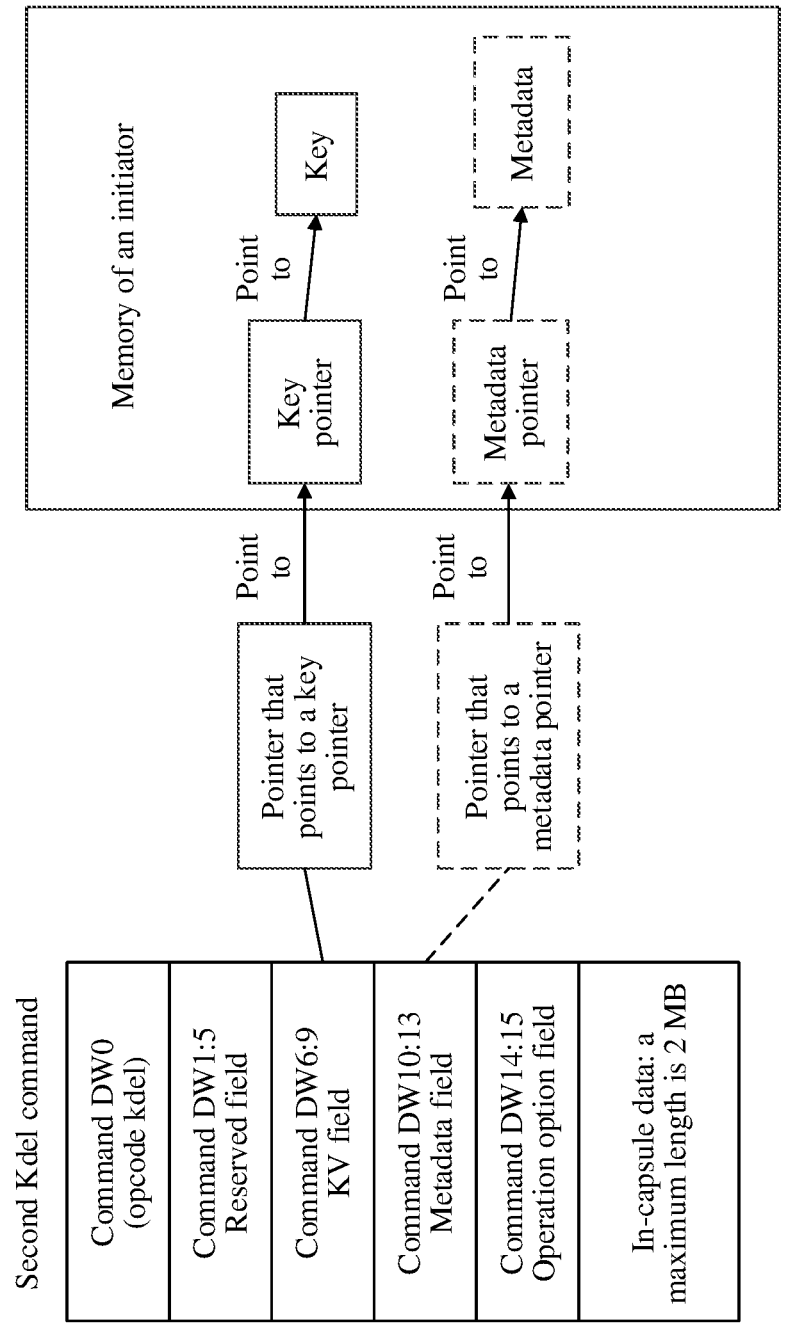
FIG. 9B and FIG. 9C are schematic diagrams of formats of several Kdel commands and pointer mapping relationships according to an embodiment of the present disclosure.

It is assumed that a format of the second Kdel command is shown in FIG. 9B. The second Kdel command may include a metadata field (optional), a key field, and a value field (optional). The key field and the value field may be collectively referred to as a KV field (DW6:9).

The key field in the second Kdel command carries a pointer that points to a key pointer, and the key pointer points to a buffer that is allocated by the initiator to a key. The metadata field (DW10:13) in the second Kdel command carries a pointer that points to a metadata pointer, and the metadata pointer points to a buffer that is allocated by the initiator to metadata. An operation option field (DW14:15) in the second Kdel command indicates that the second Kdel command is a command used to request to delete a value.

For example, an operation object type indicated by an operation object type indicator carried in the operation option field in the second Kdel command includes a value (and may further include a key, metadata, and the like). For example, an operation indicated by an operation manner indicator carried in an opcode field in the second Kdel command is a delete operation.

Step S902: The target receives the second Kdel command, the target obtains, by parsing the second Kdel command, a pointer that points to a key pointer and that is carried in a key field in the second Kdel command, and in addition, if a metadata field in the second Kdel command carries a pointer that points to a metadata pointer, the target may further obtain, by parsing the second Kdel command, the pointer that points to the metadata pointer and that is carried in the metadata field in the second Kdel command.

If the pointer that points to the key pointer and that is carried in the key field in the second Kdel command further points to a buffer of the initiator (as shown in FIG. 9B), the target may obtain the key pointer from the buffer of the initiator in an RDMA manner based on the pointer that points to the key pointer and that is carried in the key field in the second Kdel command. In addition, if the pointer that points to the metadata pointer and that is carried in the metadata field in the second Kdel command further points to a buffer of the initiator, the target may obtain the metadata pointer from the buffer of the initiator in an RDMA manner based on the pointer that points to the metadata pointer and that is carried in the metadata field in the second Kdel command.

Figure 9C:
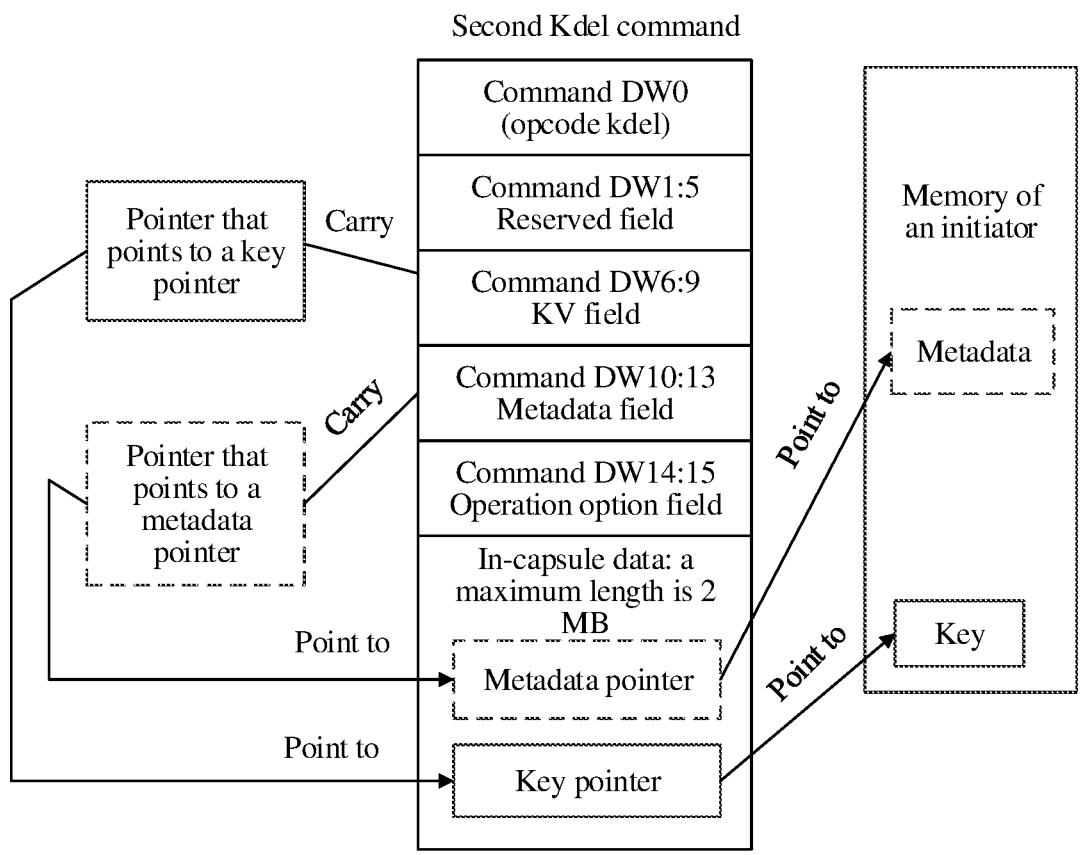

Alternatively, if the pointer that points to the key pointer and that is carried in the key field in the second Kdel command further points to in-capsule data of the second Kdel command (as shown in FIG. 9C), the target obtains the key pointer from the in-capsule data of the second Kdel command based on the pointer that points to the key pointer and that is carried in the key field in the second Kdel command. In addition, if the pointer that points to the metadata pointer and that is carried in the metadata field in the second Kdel command further points to the in-capsule data of the second Kdel command, the target obtains the metadata pointer from the in-capsule data of the second Kdel command based on the pointer that points to the metadata pointer and that is carried in the metadata field in the second Kdel command.

Step S903: The target may obtain a key in an RDMA manner from a buffer that is of the initiator and to which the key pointer points, and in addition, if the metadata field in the second Kdel command carries the pointer that points to the metadata pointer, the target may obtain, in a RDMA manner, metadata (the metadata includes a value version number) of a value corresponding to the key from a buffer that is of the initiator and to which the metadata pointer points.

Step S904: The target searches an NVM for the value corresponding to the key, and deletes the key, the value corresponding to the key, and metadata from the NVM.

If the metadata field in the second Kdel command does not carry the pointer that points to the metadata pointer, the target deletes, from the NVM, values that are of all versions and that are corresponding to the key. In addition, if the metadata field in the second Kdel command carries the pointer that points to the metadata pointer, and the target obtains, in an RDMA manner, the metadata (the metadata includes the value version number) of the value corresponding to the key from the buffer to which the metadata pointer points, the target may delete, from the NVM, a value corresponding to the value version number included in the metadata and that is in the values that are of all the versions and that are corresponding to the key, but may reserve a value that is of another version and corresponding to the key.

Step S905: The target notifies the initiator that execution of the second Kdel command is completed.

Step S906: The initiator may further confirm that execution of the second Kdel command is completed.

It may be learned that the foregoing example provides some possible implementation manners of efficiently deleting a value in the NoF scenario.

Figure 10A:
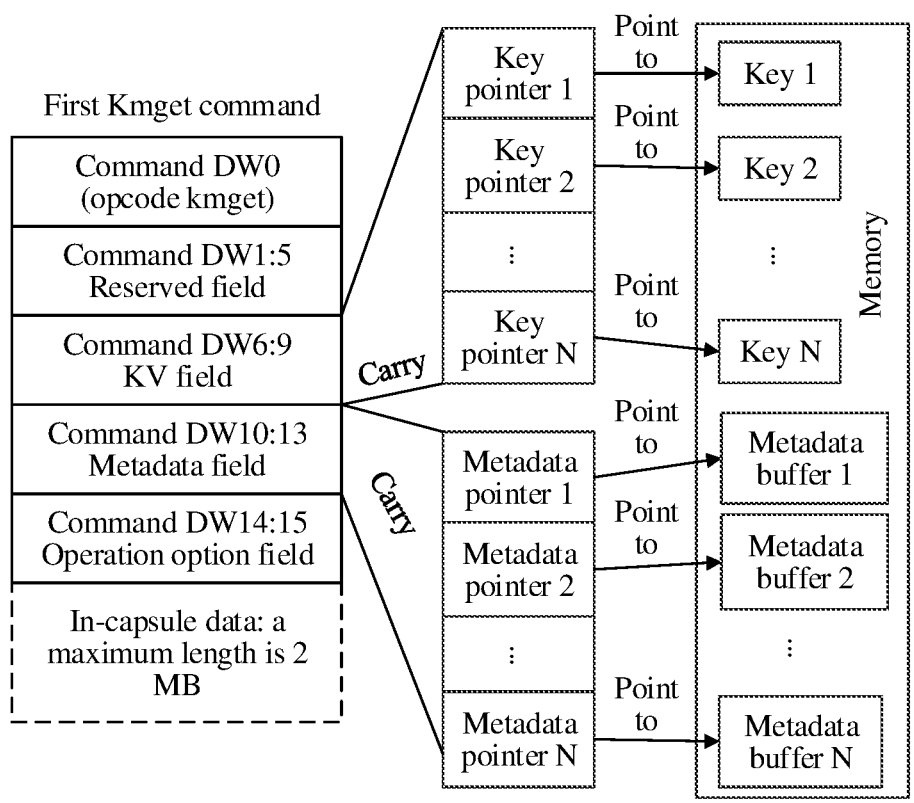
FIG. 10A and FIG. 10C are schematic diagrams of formats of several Kmget commands and pointer mapping relationships according to an embodiment of the present disclosure.
Figure 10B:
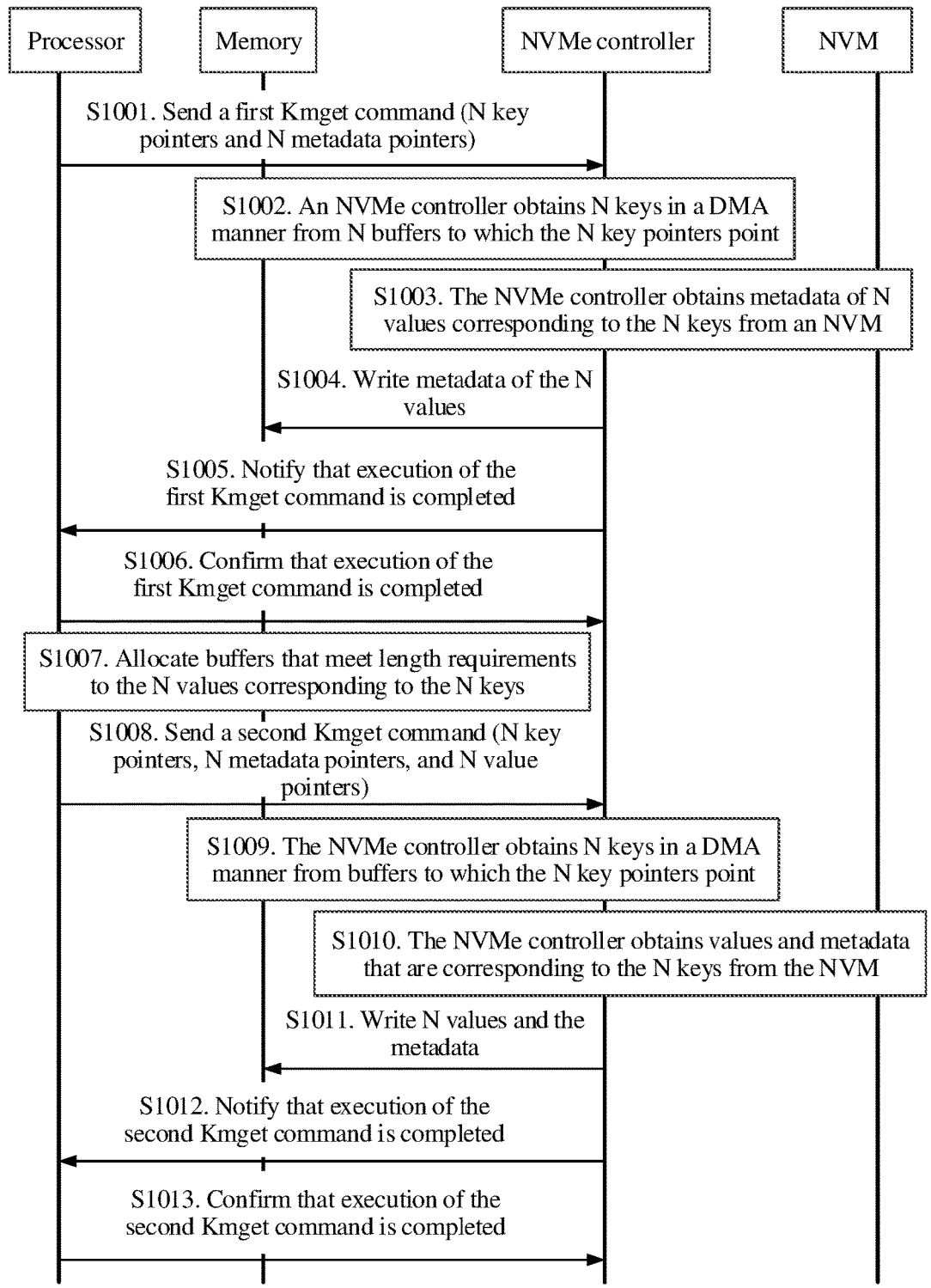
FIG. 10B is a schematic flowchart of another data access method according to an embodiment of the present disclosure.

Referring to FIG. 10B, FIG. 10B is a schematic flowchart of a data access method in an NVMe scenario corresponding to a Kmget command according to another embodiment of the present disclosure. As shown in FIG. 10B, the data access method provided in the other embodiment of the present disclosure may include the following steps.

Step S1001: A processor sends a first Kmget command (including N key pointers and N metadata pointers).

It is assumed that a format of the first Kmget command is shown in FIG. 10A. The first Kmget command includes a metadata field, a key field, and a value field. The key field and the value field may be collectively referred to as a KV field (DW6:9). The metadata field (DW10:13) in the first Kmget command carries N metadata pointers, and the N metadata pointers respectively point to N buffers that are allocated by the processor to metadata. The key field in the first Kmget command carries N key pointers. There is a one-to-one correspondence between the N key pointers and the N metadata pointers. Herein, it is assumed that the value field in the first Kmget command is empty, that is, the value field does not carry a value pointer that points to any buffer (herein, it is assumed that because the processor does not learn lengths of values respectively corresponding to N keys corresponding to the first Kmget command, the processor cannot purposefully allocate buffers that meet length requirements to the values. Therefore, the value field is temporarily empty).

In this embodiment, N is an integer greater than 1.

An operation option field (DW14:15) in the first Kmget command indicates that the first Kmget command is a command for obtaining metadata of a value, the operation option field may further carry quantity information (N) of the key pointers carried in the key field in the first Kmget command, and the operation option field may further carry total length information of the N key pointers carried in the key field in the first Kmget command.

For example, an operation object type indicated by an operation object type indicator carried in the operation option field in the first Kmget command includes (or is) metadata of a value. For example, an operation indicated by an operation manner indicator carried in an opcode field in the first Kmget command is an obtain operation.

Step S1002: An NVMe controller receives the first Kmget command, the NVMe controller obtains, by parsing the first Kmget command, N key pointers carried in a key field in the first Kmget command, and the NVMe controller may obtain N keys in a DMA manner from N buffers to which the N key pointers respectively point.

Step S1003: The NVMe controller obtains, from an NVM based on the obtained N keys, metadata of N values respectively corresponding to the N keys (metadata of totally N values), and there is a one-to-one correspondence between the metadata of the N values and the N keys, and metadata of any value includes length information of the corresponding value (and may further include a value version number and the like).

Step S1004: The NVMe controller writes, in a DMA manner, the metadata of the N values corresponding to the N keys into buffers to which N metadata pointers recorded in a metadata field in the first Kmget command point, and metadata that is of a value corresponding to a key-i (the key-i is any one of the N keys) and that is in the metadata of the N values is written into a buffer to which a metadata pointer in the N metadata pointers corresponding to the key-i points, and the metadata of the value corresponding to the key-i includes length information of the value corresponding to the key-i.

Step S1005: The NVMe controller notifies the processor that execution of the first Kmget command is completed.

Step S1006: The processor confirms that execution of the first Kmget command is completed.

Step S1007: The processor may learn, according to the metadata of the N values corresponding to the N keys that is written into the corresponding buffers, lengths of the N values corresponding to the N keys, and then allocate, according to the lengths of the N values corresponding to the N keys, N buffers that meet length requirements to the values corresponding to the N keys.

Step S1008: The processor sends a second Kmget command (including N key pointers, N metadata pointers and N value pointers).

Figure 10C:
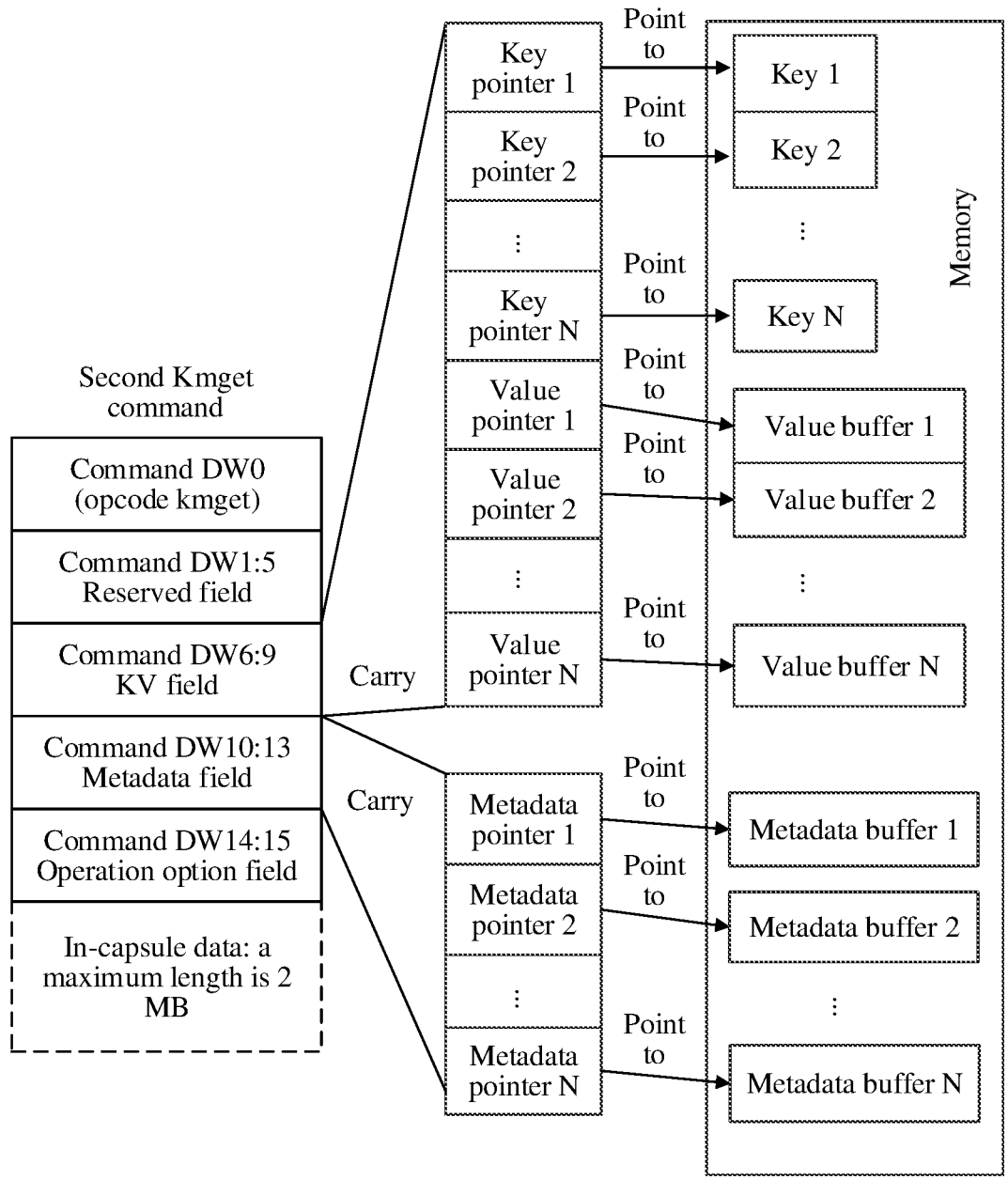

It is assumed that a format of the second Kmget command is shown in FIG. 10C. The second Kmget command includes a metadata field, a key field, and a value field. The key field and the value field may be collectively referred to as a KV field (DW6:9). The metadata field (DW10:13) in the second Kmget command carries N metadata pointers, and the N metadata pointers respectively point to N buffers that are allocated by the processor to metadata. The key field in the second Kmget command carries N key pointers. The value field in the second Kmget command carries N value pointers. There is a one-to-one correspondence between the N key pointers and the N metadata pointers, and there is a one-to-one correspondence between the N value pointers and the N metadata pointers. Therefore, there is a one-to-one correspondence between the N key pointers and the N value pointers. The buffers to which the N metadata pointers carried in the metadata field in the second Kmget command point may be completely the same as or partially the same as or completely different from the buffers to which the N metadata pointers carried in the metadata field in the first Kmget command point. The N value pointers point to the N buffers that are allocated, in step S1007, by the processor to the values corresponding to the N keys.

An operation option field (DW14:15) in the second Kmget command indicates that the second Kmget command is a command used to request to obtain a value, the operation option field may further carry quantity information (N) of the key pointers carried in the key field in the second Kmget command, and the operation option field may further carry total length information of the N key pointers carried in the key field in the second Kmget command.

For example, an operation object type indicated by an operation object type indicator carried in the operation option field in the second Kmget command includes a value (and may further include metadata and the like). For example, an operation indicated by an operation manner indicator carried in an opcode field in the second Kmget command is an obtain operation.

Step S1009: The NVMe controller receives the second Kmget command, the NVMe controller obtains, by parsing the second Kmget command, N key pointers carried in a key field in the second Kmget command, and the NVMe controller obtains N keys in a DMA manner from buffers to which the N key pointers carried in the key field in the second Kmget command point.

Step S1010: The NVMe controller obtains, based on the obtained N keys, values corresponding to the N keys and metadata of the values corresponding to the N keys.

Step S1011: The NVMe controller writes, in a DMA manner, the metadata of the N values corresponding to the obtained N keys into buffers to which N metadata pointers carried in a metadata field in the second Kmget command point, and the NVMe controller writes, in a DMA manner, the values corresponding to the obtained N keys into buffers to which N value pointers carried in a value field in the second Kmget command point.

Metadata that is of a value corresponding to a key-i (the key-i is any one of the N keys) and that is in the metadata of the N values is written into a buffer to which a metadata pointer in the N metadata pointers corresponding to the key-i points.

Step S1012: The NVMe controller notifies the processor that execution of the second Kmget command is completed.

Step S1013: The processor may further confirm that execution of the second Kmget command is completed.

It may be learned that the foregoing example provides some possible implementation manners of efficiently obtaining a value in the NVMe scenario.

Figure 11A:
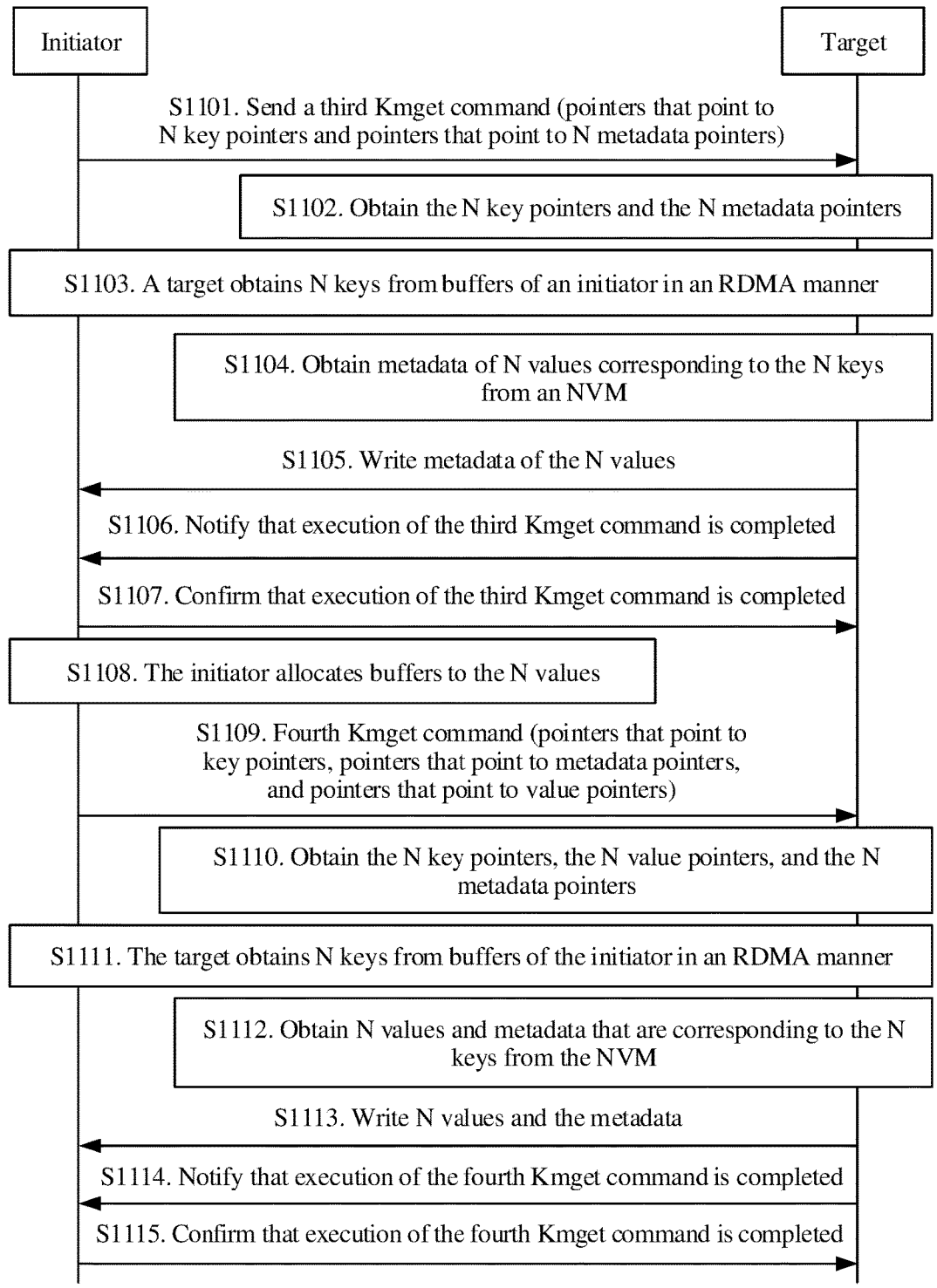
FIG. 11A is a schematic flowchart of another data access method according to an embodiment of the present disclosure.

Referring to FIG. 11A, FIG. 11A is a schematic flowchart of a data access method in an NoF scenario corresponding to a Kmget command according to another embodiment of the present disclosure. As shown in FIG. 11A, the data access method provided in the other embodiment of the present disclosure may include the following steps.

Step S1101: An initiator sends a third Kmget command (pointers that point to N key pointers and pointers that point to N metadata pointers) to a target.

Figure 11B:
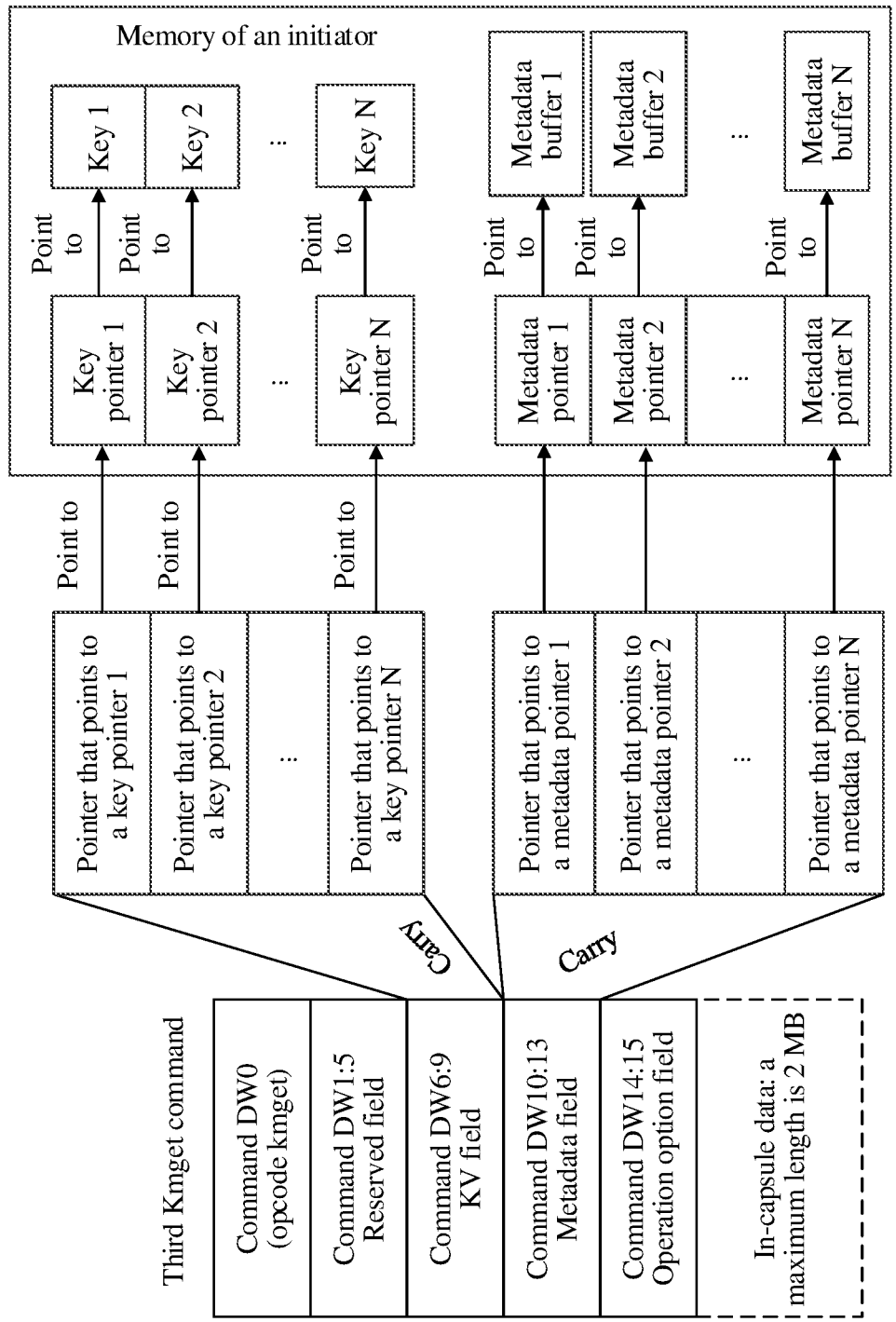
FIG. 11B to FIG. 11E are schematic diagrams of formats of several Kmget commands and pointer mapping relationships according to an embodiment of the present disclosure.

It is assumed that a format of the third Kmget command is shown in FIG. 11B. The third Kmget command includes a metadata field, a key field, and a value field. The key field and the value field may be collectively referred to as a KV field (DW6:9).

The metadata field (DW10:13) in the third Kmget command carries pointers that point to N metadata pointers, and the N metadata pointers respectively point to N buffers that are allocated by the initiator to metadata. It may be understood that the N metadata pointers are metadata pointers corresponding to the third Kmget command.

The key field in the third Kmget command carries pointers that point to N key pointers, and the N key pointers respectively point to N buffers that are allocated by the initiator to keys. It may be understood that the N key pointers are key pointers corresponding to the third Kmget command.

There is a one-to-one correspondence between the N key pointers and the N metadata pointers.

Herein, it is assumed that the value field in the third Kmget command is empty. Herein, it is assumed that because the initiator does not learn lengths of values respectively corresponding to N keys corresponding to the third Kmget command, the initiator cannot purposefully allocate buffers that meet length requirements to the values. Therefore, the value field is temporarily empty.

In this embodiment, N is an integer greater than 1.

An operation option field (DW14:15) in the third Kmget command indicates that the third Kmget command is a command for obtaining metadata of a value, the operation option field may further carry quantity information (N) of the key pointers corresponding to the key field in the third Kmget command, and the operation option field may further carry total length information of the N key pointers corresponding to the key field in the third Kmget command.

For example, an operation object type indicated by an operation object type indicator carried in the operation option field in the third Kmget command includes or is metadata of a value. For example, an operation indicated by an operation manner indicator carried in an opcode field in the third Kmget command is an obtain operation.

Step S1102: The target receives the third Kmget command, the target obtains, by parsing the third Kmget command, pointers that point to N key pointers and that are carried in a key field in the third Kmget command, and the target obtains, by parsing the third Kmget command, pointers that point to N metadata pointers and that are carried in a metadata field in the third Kmget command.

If the pointers that point to the N key pointers and that are carried in the key field in the third Kmget command point to buffers of the initiator (as shown in FIG. 11B), the target may obtain the N key pointers from the buffers of the initiator in an RDMA manner based on the pointers that point to the N key pointers and that are carried in the key field in the third Kmget command. In addition, if the pointers that point to the N metadata pointers and that are carried in the metadata field in the third Kmget command point to buffers of the initiator, the target may obtain the N metadata pointers from the buffers of the initiator in an RDMA manner based on the pointers that point to the N metadata pointers and that are carried in the metadata field in the third Kmget command.

Figure 11C:
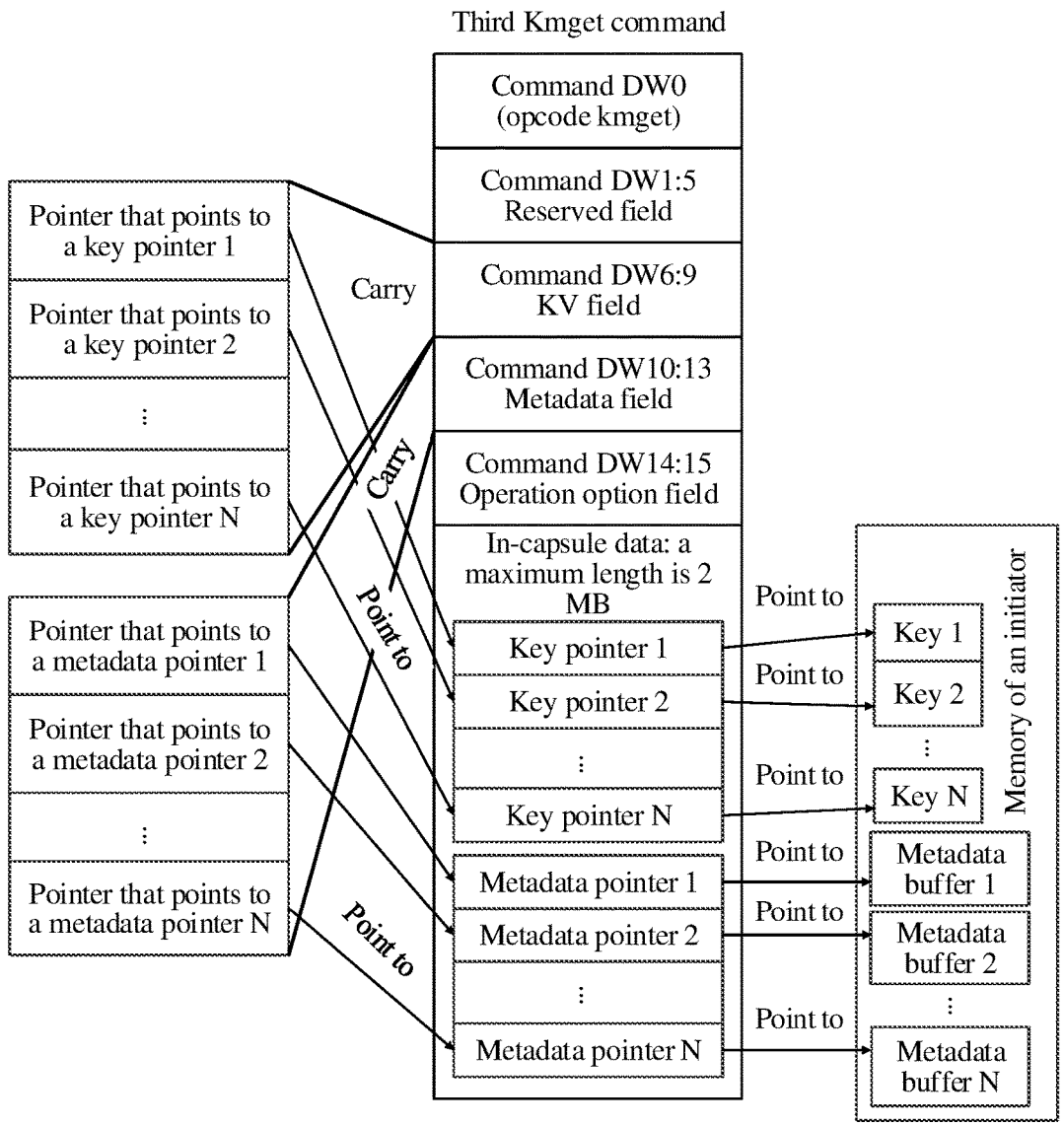

Alternatively, if the pointers that point to the N key pointers and that are carried in the key field in the third Kmget command point to in-capsule data of the third Kmget command (as shown in FIG. 11C), the target may obtain the N key pointers from the in-capsule data of the third Kmget command based on the pointers that point to the N key pointers and that are carried in the key field in the third Kmget command. In addition, if the pointers that point to the N metadata pointers and that are carried in the metadata field in the third Kmget command point to the in-capsule data of the third Kmget command, the target may obtain the N metadata pointers from the in-capsule data of the third Kmget command based on the pointers that point to the N metadata pointers and that are carried in the metadata field in the third Kmget command.

Step S1103: The target obtains, from buffers of the initiator in an RDMA manner based on the obtained N key pointers, N keys to which the N key pointers point.

Step S1104: The target obtains, from an NVM based on the obtained N keys, metadata of N values respectively corresponding to the N keys (metadata of totally N values), and there is a one-to-one correspondence between the metadata of the N values and the N keys, and metadata of any value includes length information of the corresponding value (and may further include a value version number and the like).

Step S1105. The target writes, in an RDMA manner, the metadata of the N values corresponding to the N keys into buffers that are of the initiator and to which the N metadata pointers corresponding to the third Kmget command point, and metadata that is of a value corresponding to a key-i (the key-i is any one of the N keys) and that is in the metadata of the N values is written into a buffer to which a metadata pointer in the N metadata pointers corresponding to the key-i points, and the metadata of the value corresponding to the key-i includes length information of the value corresponding to the key-i.

Step S1106: The target may further notify the initiator that execution of the third Kmget command is completed.

Step S1107: The initiator confirms that execution of the third Kmget command is completed.

Step S1108: The initiator may learn, according to the metadata of the values corresponding to the N keys that is written into the corresponding buffers, lengths of the values corresponding to the N keys, and then allocate, according to the lengths of the values corresponding to the N keys, N buffers that meet length requirements to the N values corresponding to the N keys.

Step S1109: The initiator sends a fourth Kmget command (pointers that point to key pointers, pointers that point to metadata pointers, and pointers that point to value pointers) to the target.

Figure 11D:
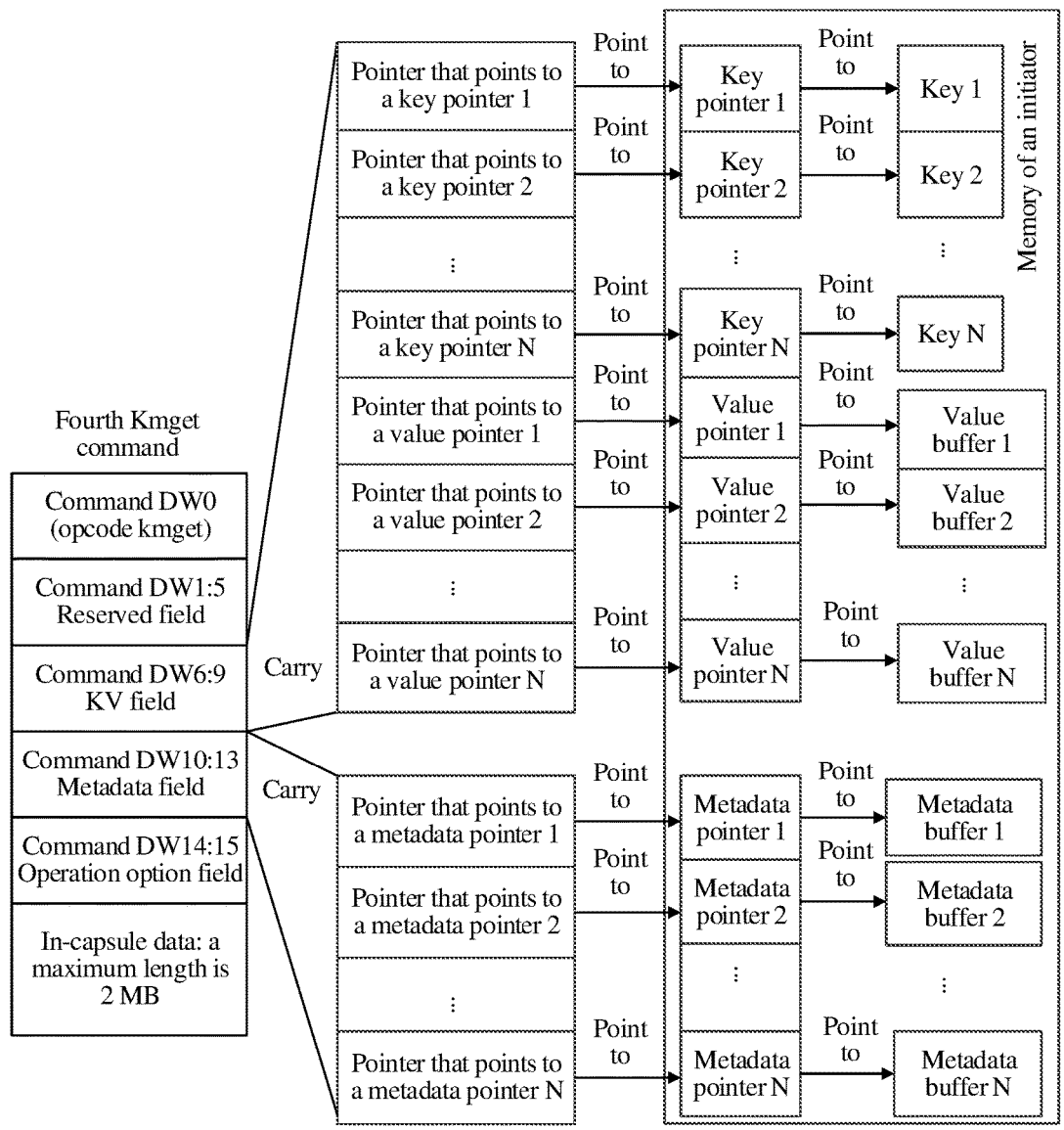

It is assumed that a format of the fourth Kmget command is shown in FIG. 11D. The fourth Kmget command includes a metadata field, a key field, and a value field. The key field and the value field may be collectively referred to as a KV field (DW6:9).

The metadata field (DW10:13) in the fourth Kmget command carries pointers that point to N metadata pointers, and the N metadata pointers respectively point to N buffers that are allocated by the initiator to metadata. It may be understood that the N metadata pointers are metadata pointers corresponding to the fourth Kmget command.

The key field in the fourth Kmget command carries pointers that point to N key pointers, and the N key pointers respectively point to N buffers that are allocated by the initiator to keys. It may be understood that the N key pointers are key pointers corresponding to the fourth Kmget command.

The value field in the fourth Kmget command carries pointers that point to N value pointers, and the N value pointers respectively point to N buffers that are allocated by the initiator to values. It may be understood that the N value pointers are value pointers corresponding to the fourth Kmget command.

There is a one-to-one correspondence between the N key pointers and the N metadata pointers, and there is a one-to-one correspondence between the N value pointers and the N metadata pointers. Therefore, there is a one-to-one correspondence between the N key pointers and the N value pointers. The buffers to which the N metadata pointers corresponding to the fourth Kmget command point may be completely the same as or partially the same as or completely different from the buffers to which the N metadata pointers corresponding to the third Kmget command point. The N value pointers point to the N buffers that are allocated, in step S1108, by the initiator to the values corresponding to the N keys.

An operation option field (DW14:15) in the fourth Kmget command indicates that the fourth Kmget command is a command for obtaining metadata of a value, the operation option field may further carry quantity information (N) of the key pointers corresponding to the fourth Kmget command, and the operation option field may further carry total length information of the N key pointers corresponding to the fourth Kmget command.

For example, an operation object type indicated by an operation object type indicator carried in the operation option field in the fourth Kmget command includes a value (and may further include metadata and the like). For example, an operation indicated by an operation manner indicator carried in an opcode field in the fourth Kmget command is an obtain operation.

Step S1110: The target receives the fourth Kmget command, the target obtains, by parsing the fourth Kmget command, pointers that point to N key pointers and that are carried in a key field in the fourth Kmget command, the target obtains, by parsing the fourth Kmget command, pointers that point to N metadata pointers and that are carried in the metadata field in the fourth Kmget command, and the target obtains, by parsing the fourth Kmget command, pointers that point to N value pointers and that are carried in a value field in the fourth Kmget command.

If the pointers that point to the N key pointers and that are carried in the key field in the fourth Kmget command point to buffers of the initiator (as shown in FIG. 11D), the target obtains the N key pointers from the buffers of the initiator in an RDMA manner based on the pointers that point to the N key pointers and that are carried in the key field in the fourth Kmget command. In addition, if the pointers that point to the N metadata pointers and that are carried in the metadata field in the fourth Kmget command point to buffers of the initiator, the target may obtain the N metadata pointers from the buffers of the initiator in an RDMA manner based on the pointers that point to the N metadata pointers and that are carried in the metadata field in the fourth Kmget command. In addition, if the pointers that point to the N value pointers and that are carried in the value field in the fourth Kmget command point to buffers of the initiator, the target may obtain the N value pointers from the buffers of the initiator in an RDMA manner based on the pointers that point to the N value pointers and that are carried in the value field in the fourth Kmget command.

Figure 11E:
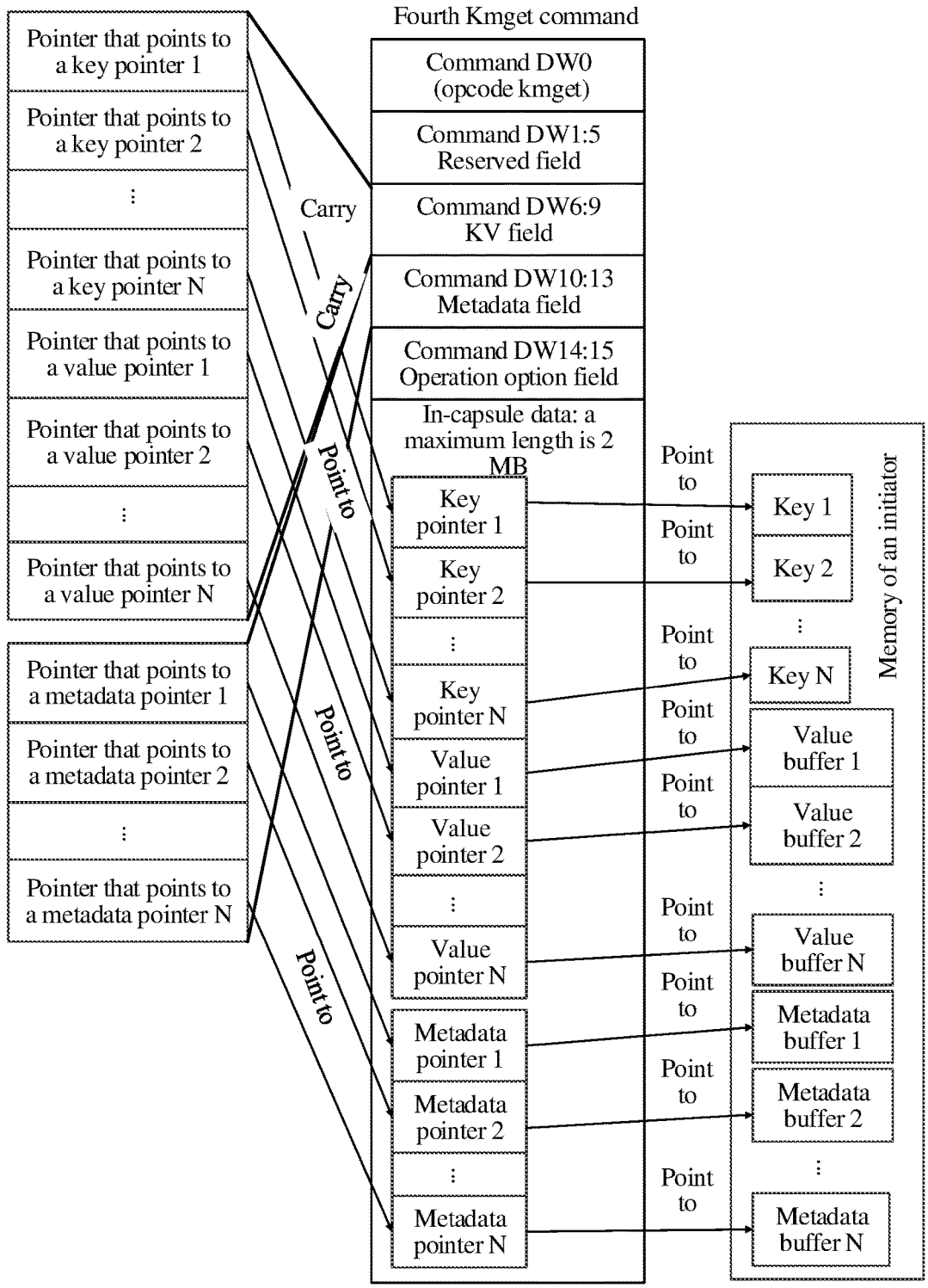

Alternatively, if the pointers that point to the N key pointers and that are carried in the key field in the fourth Kmget command point to in-capsule data of the fourth Kmget command (as shown in FIG. 11E), the target may obtain the N key pointers from the in-capsule data of the fourth Kmget command based on the pointers that point to the N key pointers and that are carried in the key field in the fourth Kmget command. In addition, if the pointers that point to the N metadata pointers and that are carried in the metadata field in the fourth Kmget command point to the in-capsule data of the fourth Kmget command, the target may obtain the N metadata pointers from the in-capsule data of the fourth Kmget command based on the pointers that point to the N metadata pointers and that are carried in the metadata field in the fourth Kmget command. In addition, if the pointers that point to the N value pointers and that are carried in the value field in the fourth Kmget command point to the in-capsule data of the fourth Kmget command, the target may obtain the N value pointers from the in-capsule data of the fourth Kmget command based on the pointers that point to the N value pointers and that are carried in the value field in the fourth Kmget command.

Step S1111: The target obtains N keys in an RDMA manner from buffers that are of the initiator and to which the obtained N key pointers point.

Step S1112: The target obtains, from the NVM based on the obtained N keys, N values corresponding to the N keys and metadata of the N values corresponding to the N keys, and there is a one-to-one correspondence between the metadata of the N values and the N keys, and metadata of any value includes length information of the corresponding value (and may further include a value version number and the like).

Step S1113: The target writes, in an RDMA manner, the N values and the metadata of the N values corresponding to the N keys into buffers that are of the initiator and to which the N metadata pointers corresponding to the fourth Kmget command point, and metadata that is of a value corresponding to a key-i (the key-i is any one of the N keys) and that is in the metadata of the N values is written into a buffer to which a metadata pointer in the N metadata pointers corresponding to the key-i points, and the metadata of the value corresponding to the key-i includes length information of the value corresponding to the key-i.

The target writes, in an RDMA manner, the N values corresponding to the N keys into the buffers that are of the initiator and to which the N value pointers corresponding to the fourth Kmget command point. A value in the N values corresponding to a key-i (the key-i is any one of the N keys) is written into a buffer to which a value pointer in the N value pointers corresponding to the key-i points.

Step S1114: The target may further notify the initiator that execution of the fourth Kmget command is completed.

Step S1115: The initiator may further confirm that execution of the fourth Kmget command is completed.

It may be learned that the foregoing example provides some possible implementation manners of efficiently obtaining a value in the NoF scenario.

Figure 12A:
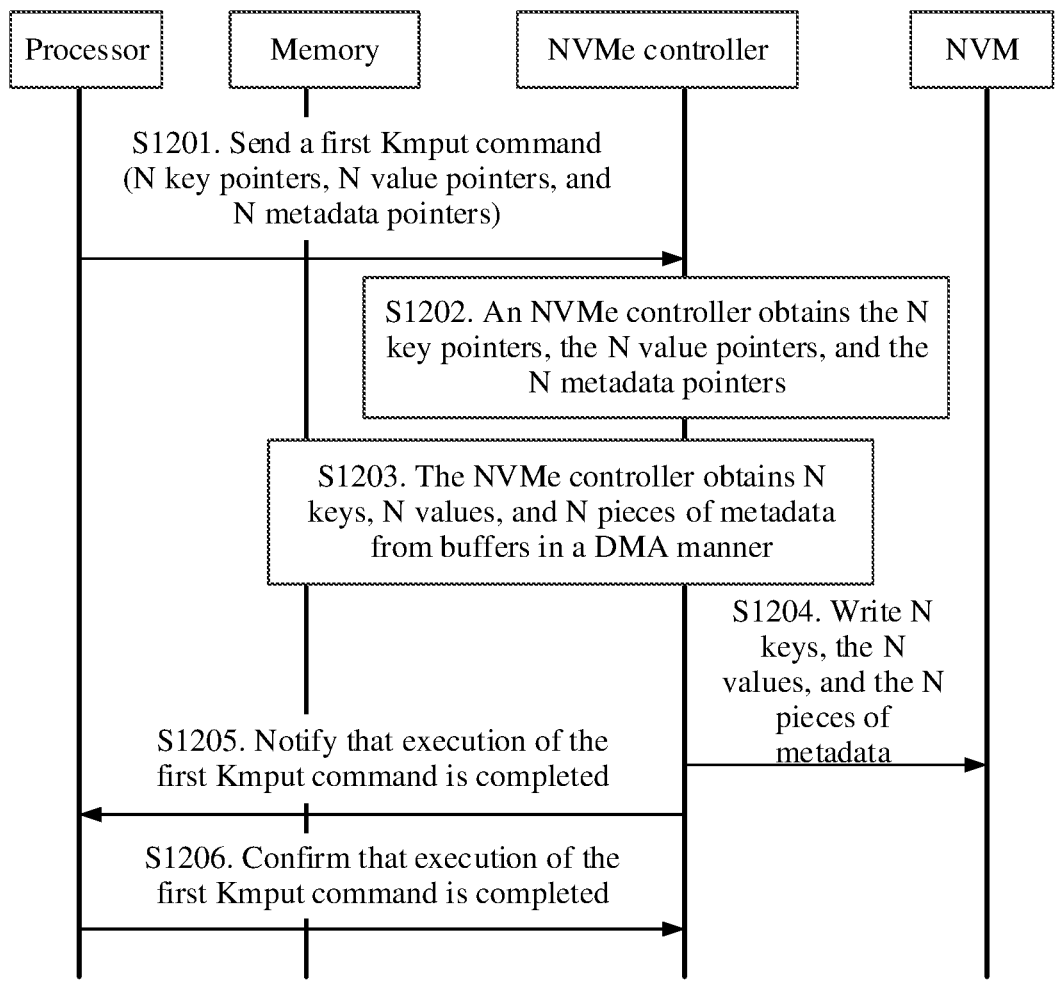
FIG. 12A is a schematic flowchart of another data access method according to an embodiment of the present disclosure.

Referring to FIG. 12A, FIG. 12A is a schematic flowchart of a data access method in an NVMe scenario corresponding to a Kmput command according to another embodiment of the present disclosure. As shown in FIG. 12A, the data access method provided in another embodiment of the present disclosure may include the following steps.

Step S1201: A processor sends a first Kmput command (N key pointers, N metadata pointers, and N value pointers) to an NVMe controller.

Figure 12B:
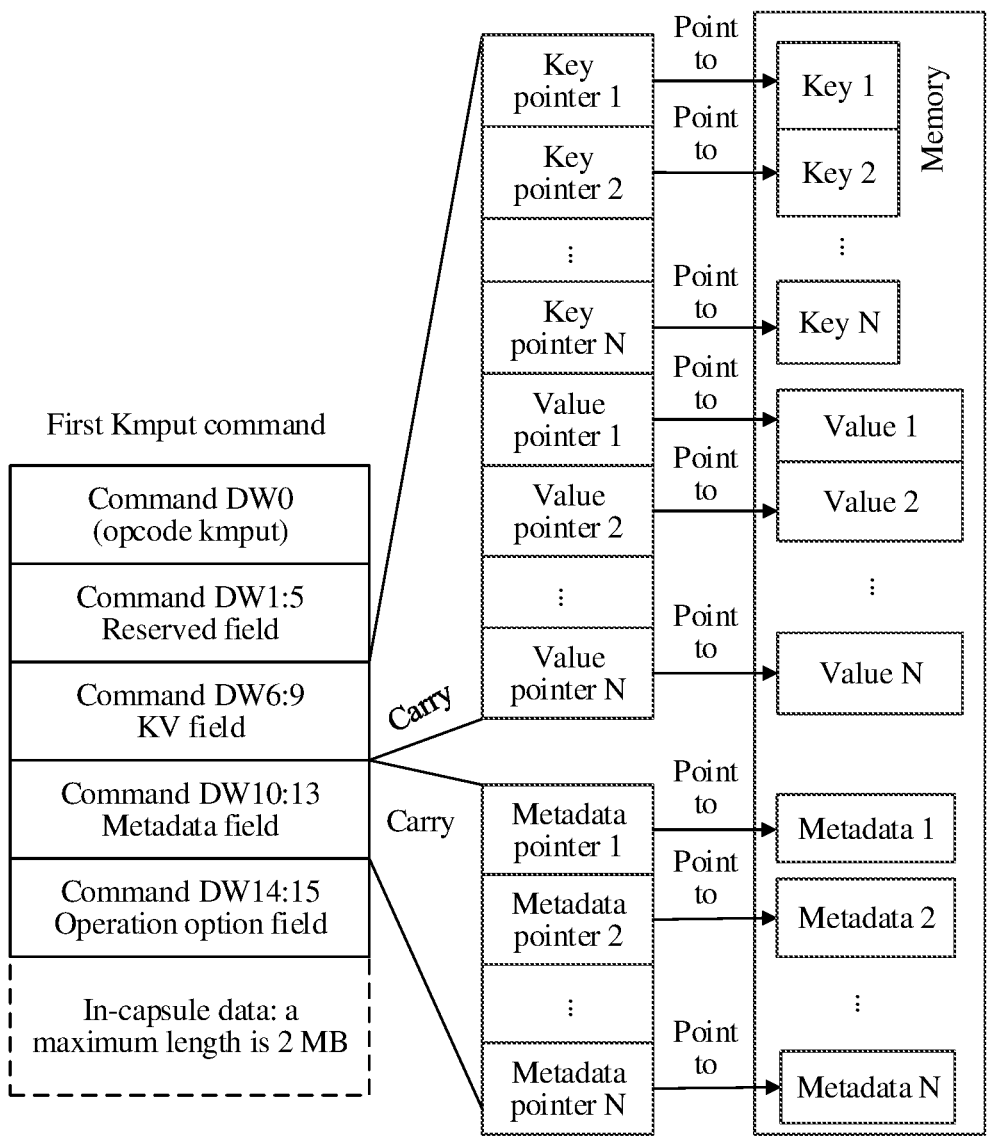
FIG. 12B is a schematic diagram of a format of a Kmput command and a pointer mapping relationship according to an embodiment of the present disclosure.

It is assumed that a format of the first Kmput command is shown in FIG. 12B. The first Kmput command includes a metadata field, a key field, and a value field. The key field and the value field may be collectively referred to as a KV field (DW6:9).

The key field in the first Kmput command carries N key pointers, and the N key pointers point to N buffers that are allocated by the processor to keys. The value field in the first Kmput command carries N value pointers, and the N value pointers point to N buffers that are allocated by the processor to values corresponding to the keys. The metadata field (DW10:13) in the first Kmput command carries N metadata pointers, and the N metadata pointers point to N buffers that are allocated by the processor to metadata of the values. An operation option field (DW14:15) in the first Kmput command indicates that the first Kmput command is a command used to request to write a value.

For example, an operation object type indicated by an operation object type indicator carried in the operation option field in the first Kmput command includes a value (and may further include a key and/or metadata and the like). For example, an operation indicated by an operation manner indicator carried in an opcode field in the first Kmput command is a write operation.

There is a one-to-one correspondence between the N key pointers and the N metadata pointers, and there is a one-to-one correspondence between the N value pointers and the N metadata pointers. Therefore, there is a one-to-one correspondence between the N key pointers and the N value pointers.

Step S1202: The NVMe controller receives the first Kmput command, and the NVMe controller obtains, by parsing the first Kmput command, N key pointers carried in a key field in the first Kmput command, N metadata pointers carried in a metadata field, and N value pointers carried in a value field.

Step S1203: The NVMe controller may obtain N keys in a DMA manner from buffers to which the N key pointers point, the NVMe controller obtains, in a DMA manner, N values corresponding to the N keys from buffers to which the N value pointers point, and the NVMe controller obtains, in a DMA manner, N pieces of metadata of the N values from buffers to which the N metadata pointers point.

Step S1204: The NVMe controller writes the obtained N keys, the obtained N values corresponding to the N keys, and the obtained N pieces of metadata of the N values into an NVM.

Step S1205: The NVMe controller notifies the processor that execution of the first Kmput command is completed.

Step S1206: The processor may further confirm that execution of the first Kmput command is completed.

It may be learned that the foregoing example provides some possible implementation manners of efficiently writing a value in the NVMe scenario.

Figure 13A:
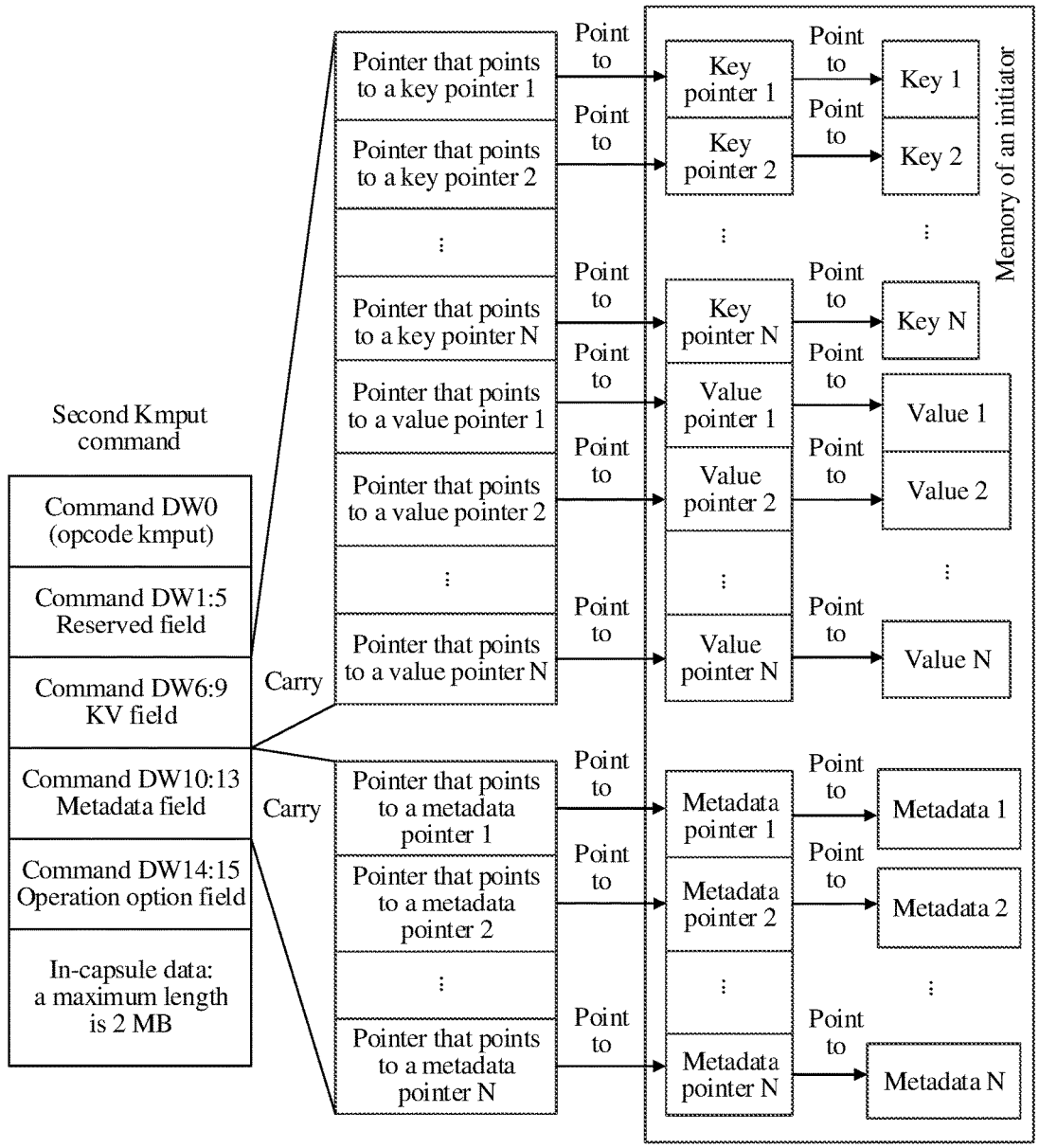
FIG. 13A and FIG. 13B are schematic diagrams of formats of several Kmput commands and pointer mapping relationships according to an embodiment of the present disclosure.
Figure 13B:
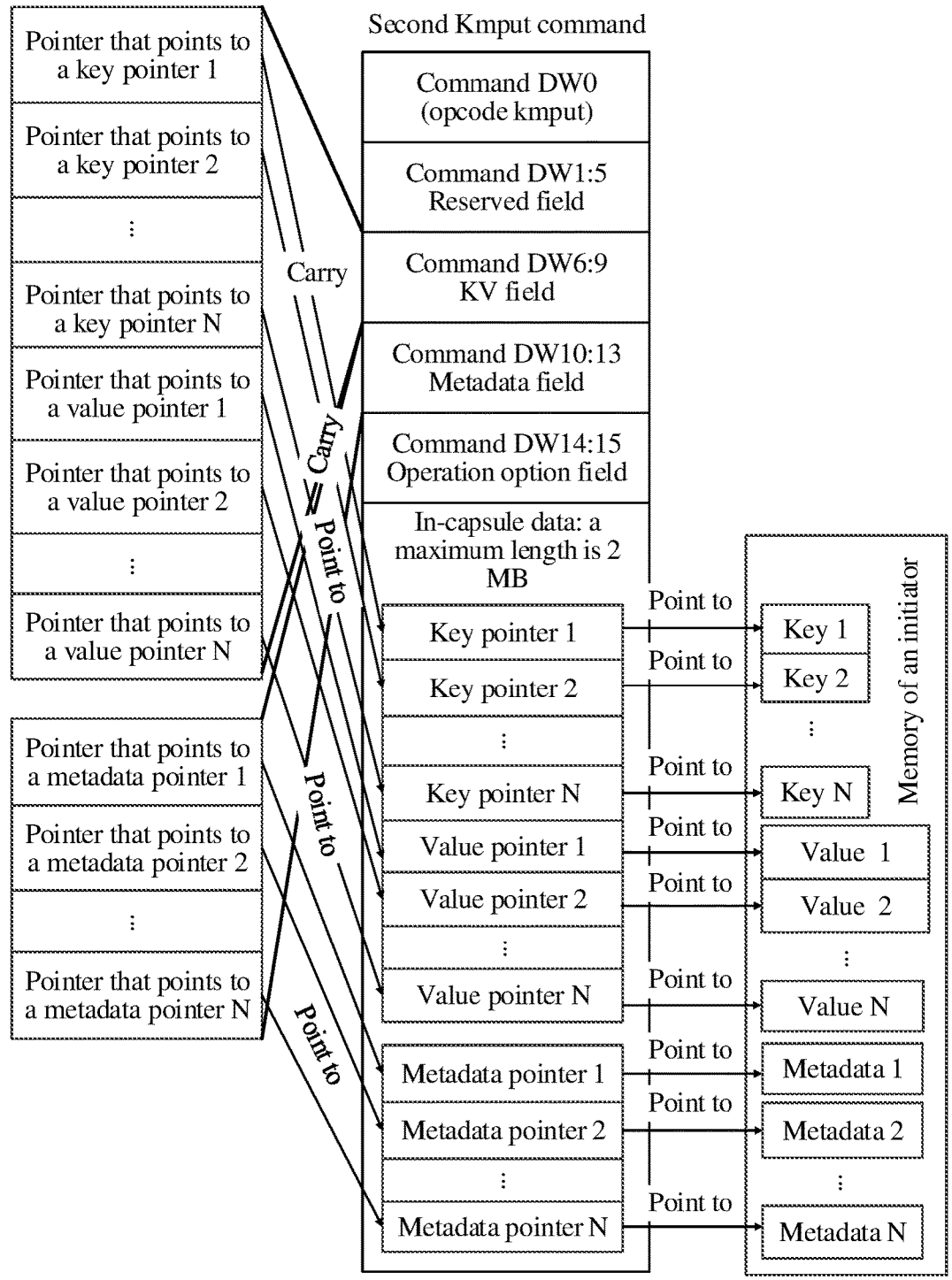
Figure 13C:
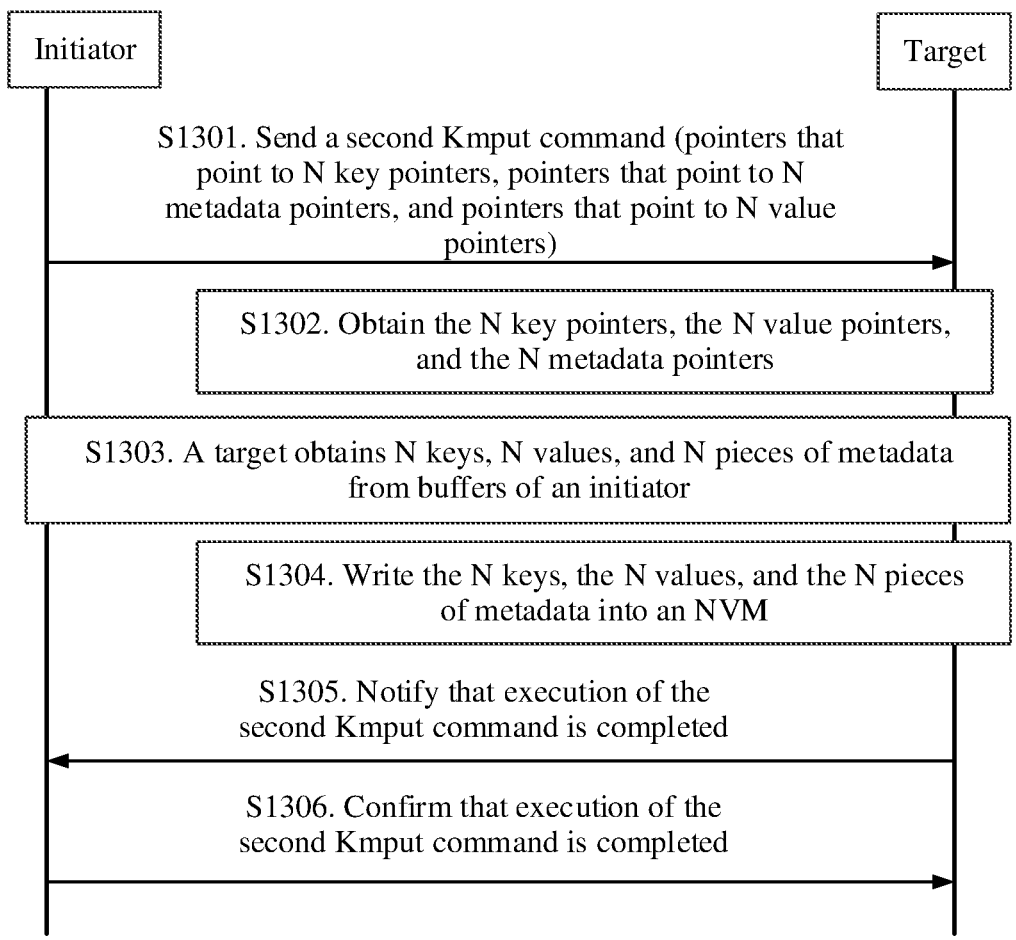
FIG. 13C is a schematic flowchart of another data access method according to an embodiment of the present disclosure.

Referring to FIG. 13C, FIG. 13C is a schematic flowchart of a data access method in an NoF scenario corresponding to a Kmput command according to another embodiment of the present disclosure. As shown in FIG. 13C, the data access method provided in another embodiment of the present disclosure may include the following steps.

Step S1301: An initiator sends a second Kmput command (pointers that point to N key pointers, pointers that point to N metadata pointers, and pointers that point to N value pointers) to a target.

It is assumed that a format of the second Kmput command is shown in FIG. 13A. The second Kmput command includes a metadata field, a key field, and a value field. The key field and the value field may be collectively referred to as a KV field (DW6:9).

The key field in the second Kmput command carries pointers that point to N key pointers, and the key pointers point to N buffers that are allocated by the initiator to N keys. The value field in the second Kmput command carries pointers that point to N value pointers, and the N value pointers point to N buffers that are allocated by the initiator to N values corresponding to the N keys. The metadata field (DW10:13) in the second Kmput command carries pointers that point to N metadata pointers, and the N metadata pointers point to N buffers that are allocated by the initiator to metadata of the N values. An operation option field (DW14:15) in the second Kmput command indicates that the second Kmput command is a command used to request to write a value.

For example, an operation object type indicated by an operation object type indicator carried in the operation option field in the second Kmput command includes a value (and may further include a key and/or metadata and the like). For example, an operation indicated by an operation manner indicator carried in an opcode field in the second Kmput command is a write operation.

Step S1302: The target receives the second Kmput command, and the target obtains, by parsing the second Kmput command, pointers that point to N key pointers and that are carried in a key field in the second Kmput command, pointers that point to N metadata pointers and that are carried in a metadata field, and pointers that point to N value pointers and that are carried in a value field.

If the pointers that point to the N key pointers and that are carried in the key field in the second Kmput command point to buffers of the initiator (as shown in FIG. 13A), the target obtains the N key pointers from the buffers of the initiator in an RDMA manner based on the pointers that point to the N key pointers and that are carried in the key field in the second Kmput command. In addition, if the pointers that point to the N metadata pointers and that are carried in the metadata field in the second Kmput command point to buffers of the initiator, the target obtains the N metadata pointers from the buffers of the initiator in an RDMA manner based on the pointers that point to the N metadata pointers and that are carried in the metadata field in the second Kmput command. In addition, if the pointers that point to the N value pointers and that are carried in the value field in the second Kmput command point to buffers of the initiator, the target obtains the N value pointers from the buffers of the initiator in an RDMA manner based on the pointers that point to the N value pointers and that are carried in the value field in the second Kmput command.

Alternatively, if the pointers that point to the N key pointers and that are carried in the key field in the second Kmput command point to in-capsule data of the second Kmput command (as shown in FIG. 13B), the target obtains the N key pointers from the in-capsule data of the second Kmput command based on the pointers that point to the N key pointers and that are carried in the key field in the second Kmput command. In addition, if the pointers that point to the N metadata pointers and that are carried in the metadata field in the second Kmput command point to the in-capsule data of the second Kmput command, the target obtains the N metadata pointers from the in-capsule data of the second Kmput command based on the pointers that point to the N metadata pointers and that are carried in the metadata field in the second Kmput command. In addition, if the pointers that point to the N value pointers and that are carried in the value field in the second Kmput command point to the in-capsule data of the second Kmput command, the target obtains the N value pointers from the in-capsule data of the second Kmput command based on the pointers that point to the N value pointers and that are carried in the value field in the second Kmput command.

Step S1303: The target obtains N keys in an RDMA manner from buffers that are of the initiator and to which the N key pointers point, the target obtains, in an RDMA manner, values corresponding to the N keys from buffers that are of the initiator and to which the N value pointers point, and the target obtains, in an RDMA manner, N pieces of metadata of the N values from buffers that are of the initiator and to which the N metadata pointers point.

Step S1304: The target writes the obtained N keys, the obtained N values corresponding to the N keys, and the obtained N pieces of metadata of the N values into an NVM.

Step S1305: The target notifies the initiator that execution of the second Kmput command is completed.

Step S1306: The initiator may further confirm that execution of the second Kmput command is completed.

It may be learned that the foregoing example provides some possible implementation manners of efficiently writing a value in the NoF scenario.

Figure 14A:
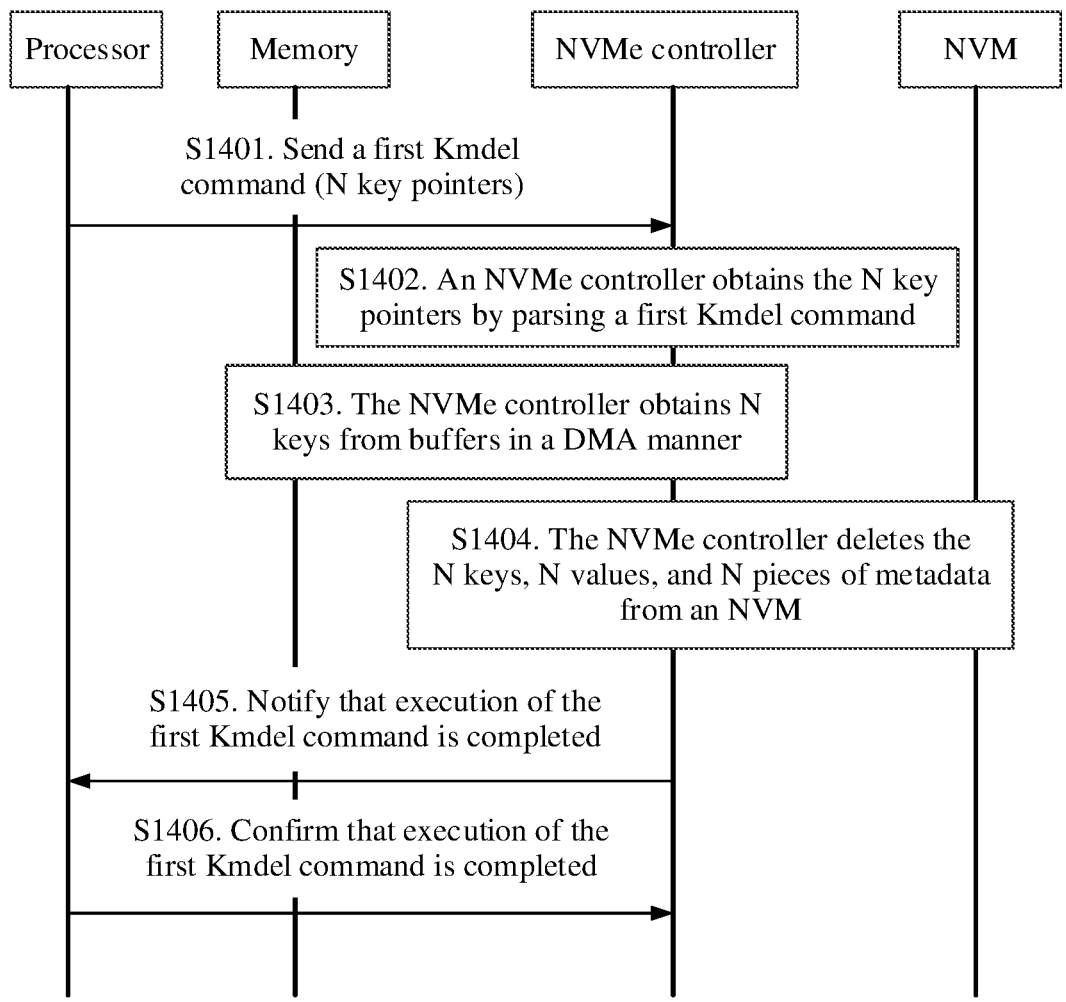
FIG. 14A is a schematic flowchart of another data access method according to an embodiment of the present disclosure.

Referring to FIG. 14A, FIG. 14A is a schematic flowchart of a data access method in an NVMe scenario corresponding to a Kmdel command according to another embodiment of the present disclosure. As shown in FIG. 14A, the data access method provided in another embodiment of the present disclosure may include the following steps.

Step S1401: A processor sends a first Kmdel command (N key pointers) to an NVMe controller.

Figure 14B:
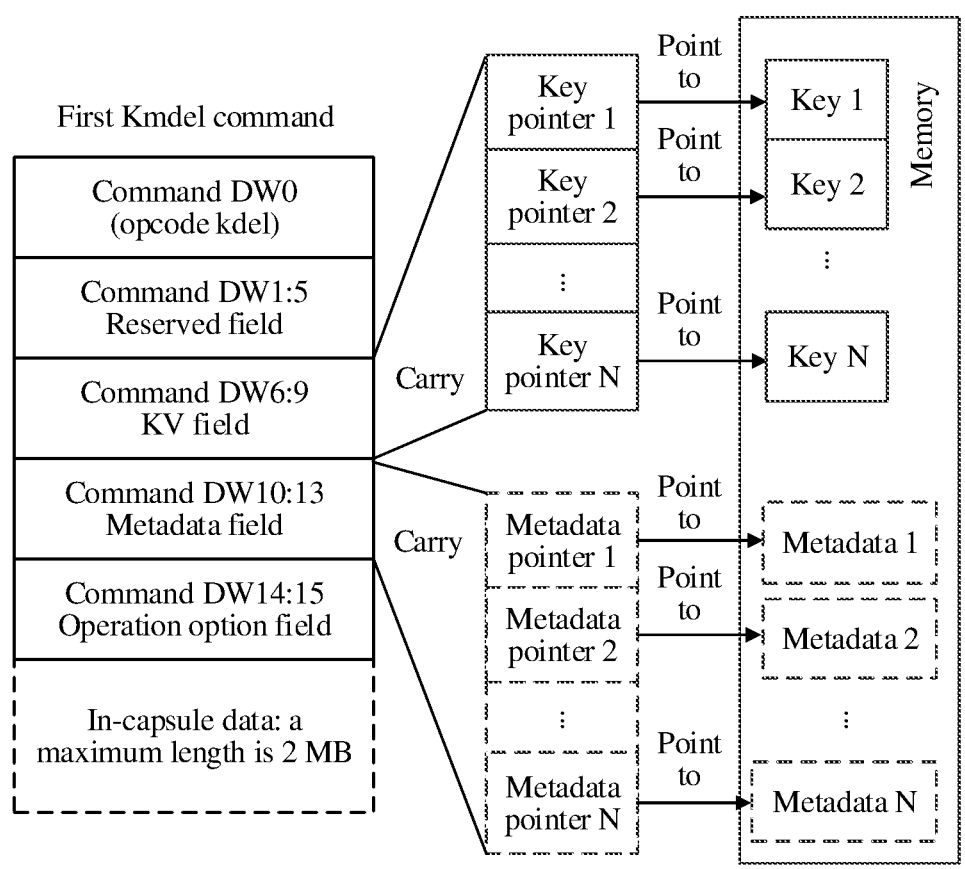
FIG. 14B is a schematic diagram of a format of a Kmdel command and a pointer mapping relationship according to an embodiment of the present disclosure.

It is assumed that a format of the first Kmdel command is shown in FIG. 14B. The first Kmdel command includes a metadata field (optional), a key field, and a value field (optional). The key field and the value field may be collectively referred to as a KV field (DW6:9).

The key field in the first Kmdel command carries N key pointers, and the N key pointers point to buffers that are allocated by the processor to N keys. The metadata field (DW10:13) in the first Kmdel command carries N metadata pointers, and the N metadata pointers point to buffers that are allocated by the processor to metadata of values. An operation option field (DW14:15) in the first Kmdel command indicates that the first Kmdel command is a command used to request to delete a value.

For example, an operation object type indicated by an operation object type indicator carried in the operation option field in the first Kmdel command includes a value (and may further include a key and/or metadata and the like). For example, an operation indicated by an operation manner indicator carried in an opcode field in the first Kmdel command is a delete operation.

Step S1402: An NVMe controller receives the first Kmdel command, the NVMe controller obtains, by parsing the first Kmdel command, N key pointers carried in a key field in the first Kmdel command, and if a metadata field in the first Kmdel command carries N metadata pointers, the NVMe controller may further obtain, by parsing the first Kmdel command, the N metadata pointers carried in the metadata field in the first Kmdel command.

Step S1403: The NVMe controller may obtain N keys in a DMA manner from buffers to which the N key pointers point.

In addition, if the metadata field in the first Kmdel command carries the N metadata pointers, the NVMe controller may obtain, in a DMA manner, metadata (the metadata includes value version numbers) of N values corresponding to the N keys from the buffers to which the metadata pointers point.

Step S1404: The NVMe controller searches an NVM for N values corresponding to the N keys, and deletes the N keys, the N values, and N pieces of metadata corresponding to the N keys from the NVM.

If the metadata field in the first Kmdel command does not carry the metadata pointers, the NVMe controller deletes, from the NVM, values that are of all versions and that are corresponding to the N keys.

In addition, if the metadata field in the first Kmdel command carries the metadata pointers, and the NVMe controller obtains, in a DMA manner, the metadata (the metadata includes the value version numbers) of the N values corresponding to the N keys from the buffers to which the N metadata pointers point, the NVMe controller deletes, from the NVM, a value corresponding to a value version number included in corresponding metadata and that is in values that are of all the versions and that are corresponding to each of the N keys, but may reserve a value of another version. For example, the NVMe controller may delete, from the NVM, a value corresponding to a value version number included in metadata of a value corresponding to a key-i (the key-i is any one of the N keys), but may reserve a value that is of another version, corresponding to the key-i, and that is in the NVM.

Step S1405: The NVMe controller notifies the processor that execution of the first Kmdel command is completed.

Step S1406: The processor may further confirm that execution of the first Kmdel command is completed.

It may be learned that the foregoing example provides some possible implementation manners of efficiently deleting a value in the NVMe scenario.

Figure 15A:
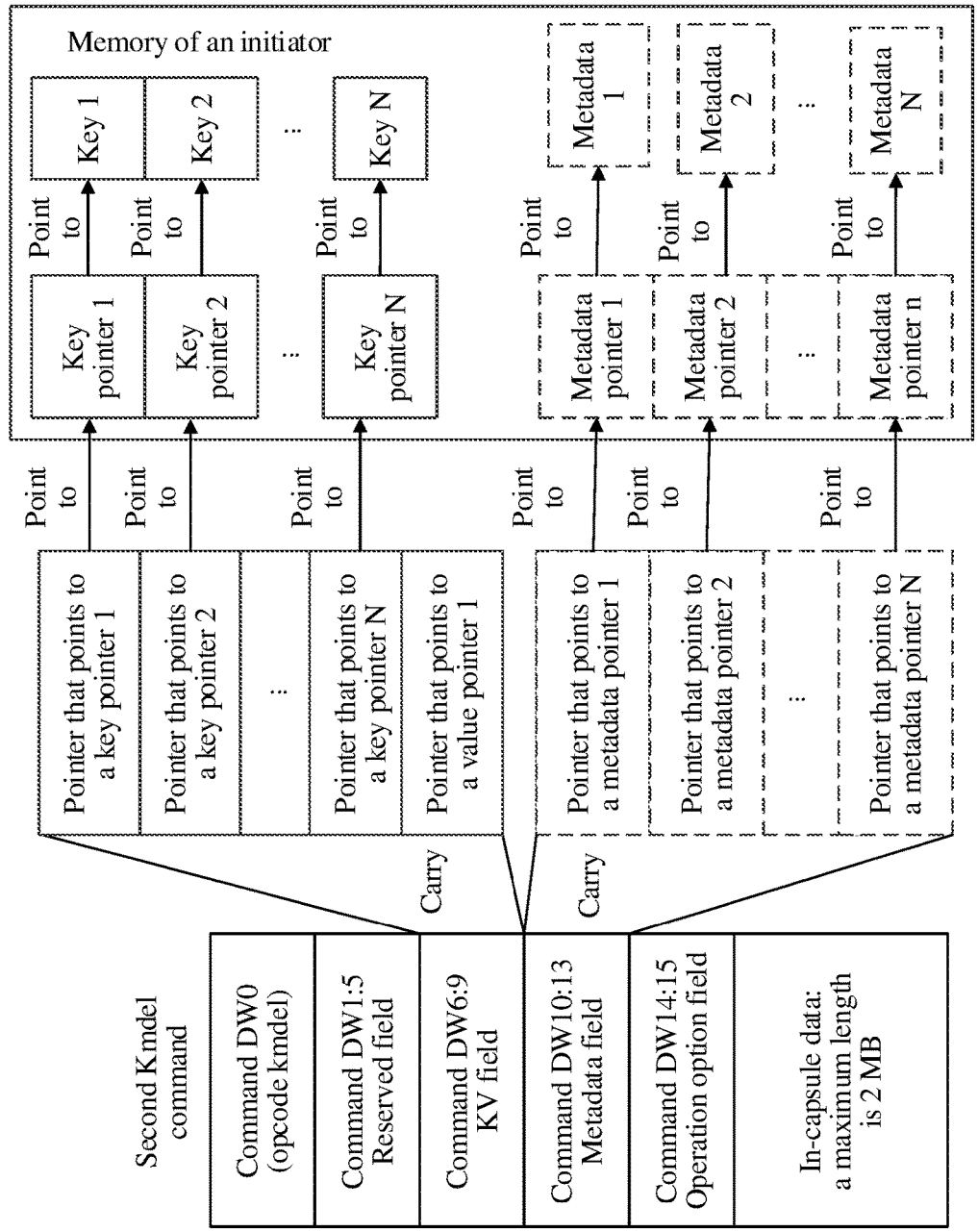
FIG. 15A and FIG. 15B are schematic diagrams of formats of several Kmdel commands and pointer mapping relationships according to an embodiment of the present disclosure.
Figure 15B:
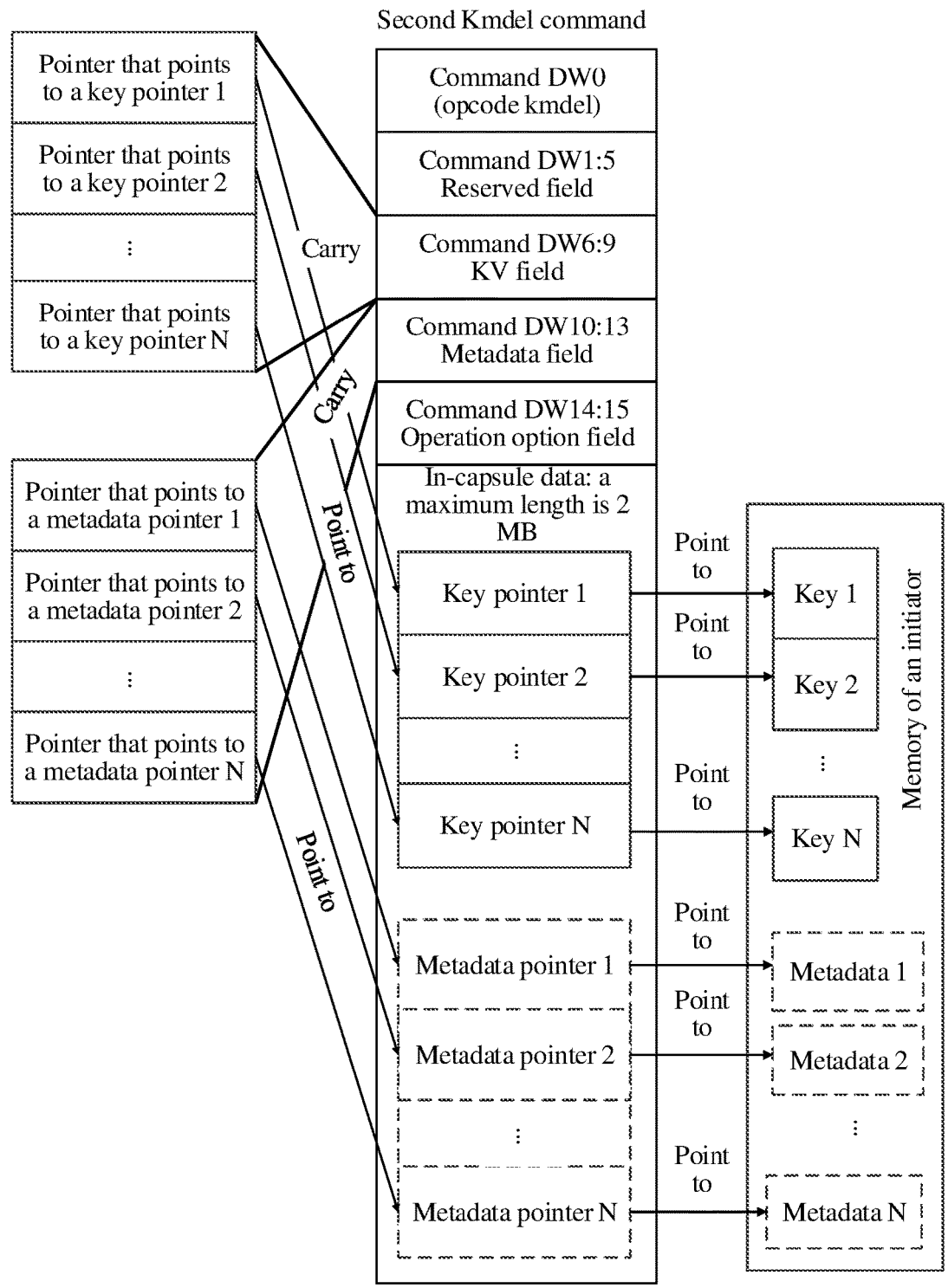
Figure 15C:
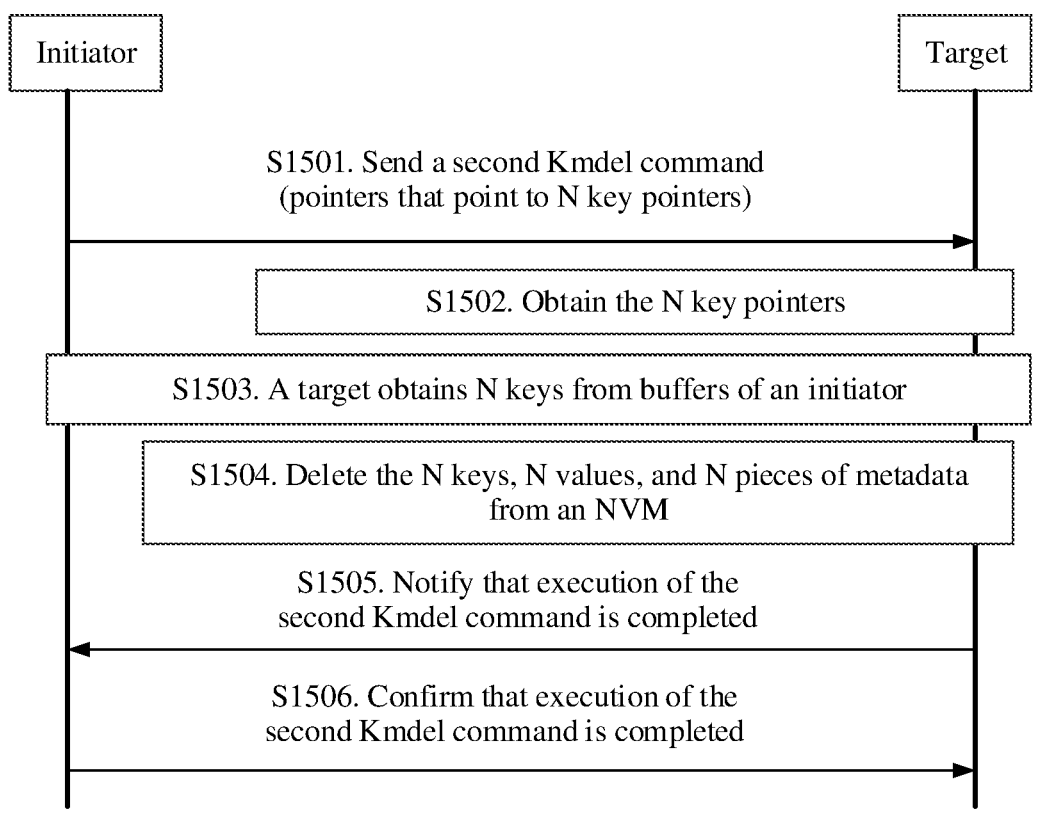
FIG. 15C is a schematic flowchart of another data access method according to an embodiment of the present disclosure.

Referring to FIG. 15C, FIG. 15C is a schematic flowchart of a data access method in an NoF scenario corresponding to a Kmdel command according to another embodiment of the present disclosure. As shown in FIG. 15C, the data access method provided in another embodiment of the present disclosure may include the following steps.

Step S1501: An initiator sends a second Kmdel command (pointers that point to N key pointers) to a target.

It is assumed that a format of the second Kmdel command is shown in FIG. 15A. The second Kmdel command may include a metadata field (optional), a value field (optional), and a key field. The key field and the value field may be collectively referred to as a KV field (DW6:9).

The key field in the second Kmdel command carries pointers that point to N key pointers, and the N key pointers point to buffers that are allocated by the initiator to N keys. The metadata field (DW10:13) in the second Kmdel command carries pointers that point to N metadata pointers, and the N metadata pointers point to buffers that are allocated by the initiator to metadata. An operation option field (DW14:15) in the second Kmdel command indicates that the second Kmdel command is a command used to request to delete a value.

For example, an operation object type indicated by an operation object type indicator carried in the operation option field in the second Kmdel command includes a value (and may further include a key and/or metadata and the like). For example, an operation indicated by an operation manner indicator carried in an opcode field in the second Kmdel command is a delete operation.

Step S1502: The target receives the second Kmdel command, and the target obtains, by parsing the second Kmdel command, pointers that point to N key pointers and that are carried in a key field in the second Kmdel command.

In addition, if the metadata field in the second Kmdel command carries the pointers that point to the N metadata pointers, the target may further obtain, by parsing the second Kmdel command, the pointers that point to the N metadata pointers and that are carried in the metadata field in the second Kmdel command.

If the pointers that point to the N key pointers and that are carried in the key field in the second Kmdel command point to buffers of the initiator (as shown in FIG. 15A), the target may obtain the N key pointers from the buffers of the initiator in an RDMA manner based on the pointers that point to the N key pointers and that are carried in the key field in the second Kmdel command. In addition, if the pointers that point to the N metadata pointers and that are carried in the metadata field in the second Kmdel command point to buffers of the initiator, the target may obtain the N metadata pointers from the buffers of the initiator in an RDMA manner based on the pointers that point to the N metadata pointers and that are carried in the metadata field in the second Kmdel command.

Alternatively, if the pointers that point to the N key pointers and that are carried in the key field in the second Kmdel command point to in-capsule data of the second Kmdel command (as shown in FIG. 15B), the target obtains the N key pointers from the in-capsule data of the second Kmdel command based on the pointers that point to the N key pointers and that are carried in the key field in the second Kmdel command. In addition, if the pointers that point to the N metadata pointers and that are carried in the metadata field in the second Kmdel command point to the in-capsule data of the second Kmdel command, the target obtains the N metadata pointers from the in-capsule data of the second Kmdel command based on the pointers that point to the N metadata pointers and that are carried in the metadata field in the second Kmdel command.

Step S1503: The target may obtain N keys in an RDMA manner from buffers that are of the initiator and to which the N key pointers point, and in addition, if a metadata field in the second Kmdel command carries pointers that point to metadata pointers, the target may obtain, in a RDMA manner, metadata (the metadata includes information such as value version numbers) of N values corresponding to the N keys from buffers that are of the initiator and to which the N metadata pointer point.

Step S1504: The target searches an NVM for the N values corresponding to the N keys, and deletes the N keys, the N values, and N pieces of metadata corresponding to the N keys from the NVM.

If the metadata field in the second Kmdel command does not carry the pointers that point to the metadata pointers, the target deletes, from the NVM, values that are of all versions and that are corresponding to the N keys.

Particularly, if the metadata field in the second Kmdel command carries the pointers that point to the N metadata pointers, and the target obtains, in an RDMA manner, the metadata of the N values corresponding to the N keys from the buffers that are of the initiator and to which the N metadata pointers point, the target may delete, from the NVM, a value corresponding to a value version number included in corresponding metadata and that is in values that are of all the versions and that are corresponding to each of the N keys, but may reserve a value of another version. For example, the target may delete, from the NVM, a value corresponding to a value version number included in metadata of a value corresponding to a key-i (the key-i is any one of the N keys), but may reserve a value that is of another version, corresponding to the key-i, and that is in the NVM.

Step S1505: The target notifies the initiator that execution of the second Kmdel command is completed.

Step S1506: The initiator may further confirm that execution of the second Kmdel command is completed.

It may be learned that the foregoing example provides some possible implementation manners of efficiently deleting a value in the NoF scenario.

Figure 16A:
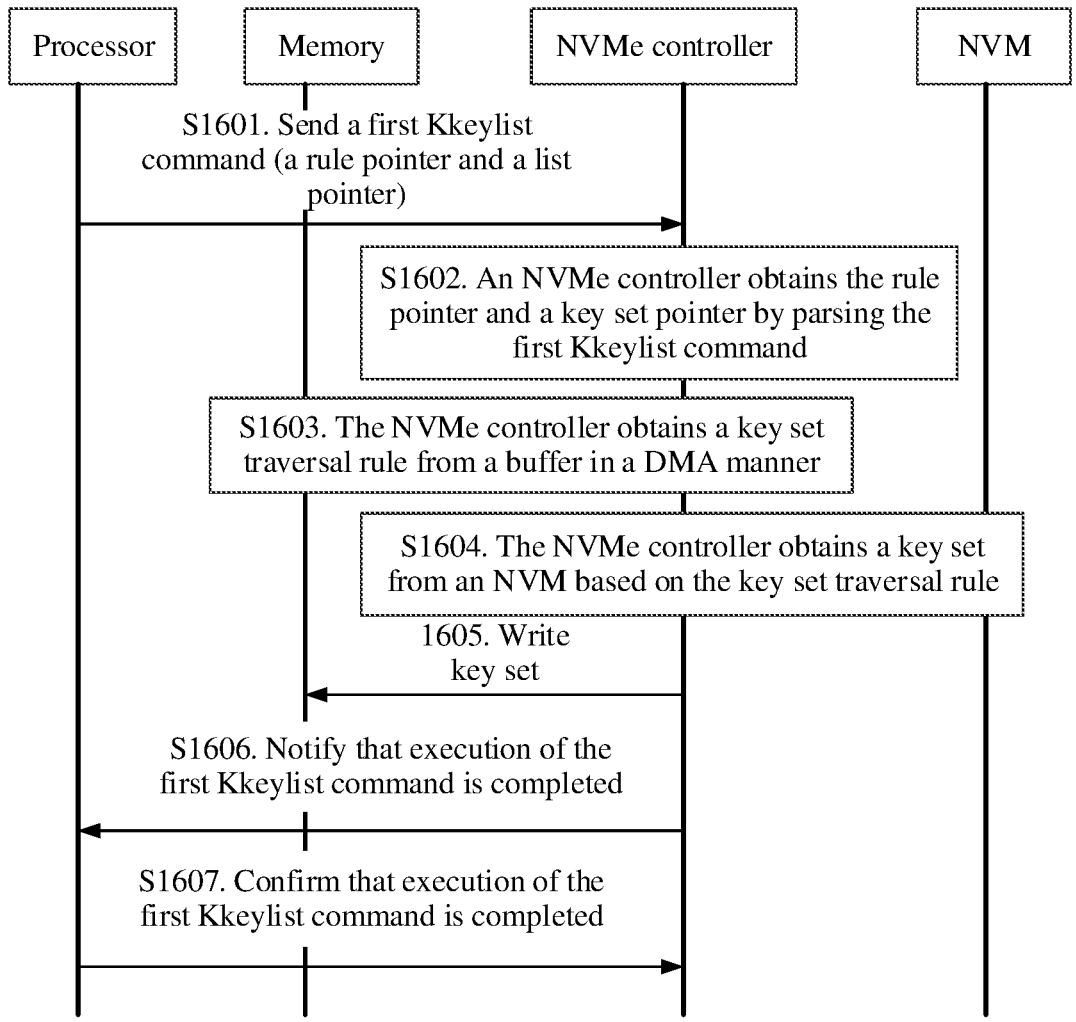
FIG. 16A is a schematic flowchart of another data access method according to an embodiment of the present disclosure.

Referring to FIG. 16A, FIG. 16A is a schematic flowchart of a data access method in an NVMe scenario corresponding to a Kkeylist command according to another embodiment of the present disclosure. As shown in FIG. 16A, the data access method provided in another embodiment of the present disclosure may include the following steps.

Step S1601: A processor sends a first Kkeylist command (a rule pointer and a list pointer) to an NVMe controller.

Figure 16B:
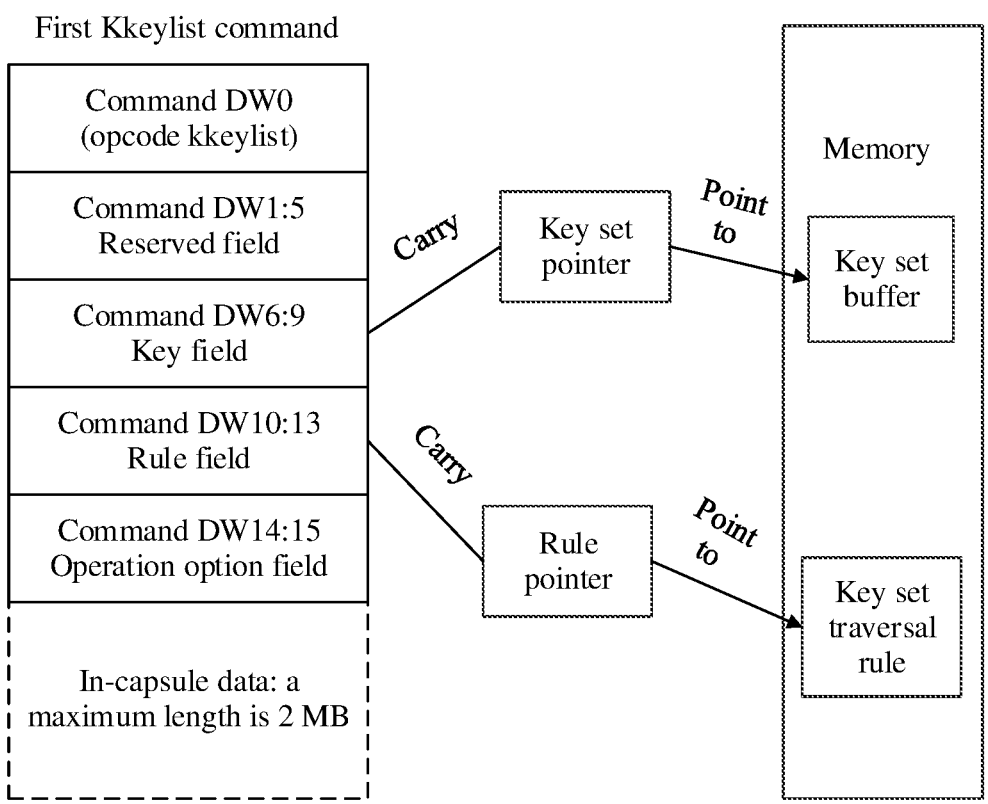
FIG. 16B is a schematic diagram of a format of a Kkeylist command and a pointer mapping relationship according to an embodiment of the present disclosure.

It is assumed that a format of the first Kkeylist command is shown in FIG. 16B. The first Kkeylist command includes a key field (DW6:9), a rule field (DW10:13), and the like.

The key field in the first Kkeylist command carries a key set pointer, and the key set pointer points to a buffer that is allocated by the processor to a key set. The rule field (DW10:13) in the first Kkeylist command carries a rule pointer, and the rule pointer points to a buffer that is allocated by the processor to a key set traversal rule. An operation option field (DW14:15) in the first Kkeylist command indicates that the first Kkeylist command is a command used to request to obtain a key set.

For example, an operation object type indicated by an operation object type indicator carried in the operation option field in the first Kkeylist command includes (or is) a key. For example, an operation indicated by an operation manner indicator carried in an opcode field in the first Kkeylist command is an obtain operation.

Step S1602: An NVMe controller receives the first Kkeylist command, the NVMe controller obtains, by parsing the first Kkeylist command, a key set pointer carried in a key field in the first Kkeylist command, and the NVMe controller obtains, by parsing the first Kkeylist command, a rule pointer carried in a rule field in the first Kkeylist command.

Step S1603: The NVMe controller may obtain a key set traversal rule in a DMA manner from a buffer to which the rule pointer points.

A key set match method and the like may be specified in the key set traversal rule, for example, a start key, all keys, or the like may be specified. If a specific key is specified, the key set traversal rule includes information about the specific key. The key set traversal rule may be a regular expression or another form.

Step S1604: The NVMe controller obtains, by searching an NVM based on the key set traversal rule, a key set (which may include one or more keys, and may not include any key in a special case) that meets the key set traversal rule.

Step S1605: The NVMe controller may write, in a DMA manner, the obtained key set into a memory (i.e., a buffer to which the key set pointer points).

Step S1606: The NVMe controller notifies the processor that execution of the first Kkeylist command is completed.

Step S1607: The processor may further confirm that execution of the first Kkeylist command is completed.

It may be learned that the foregoing example provides some possible implementation manners of efficiently obtaining a key in the NVMe scenario.

Figure 17A:
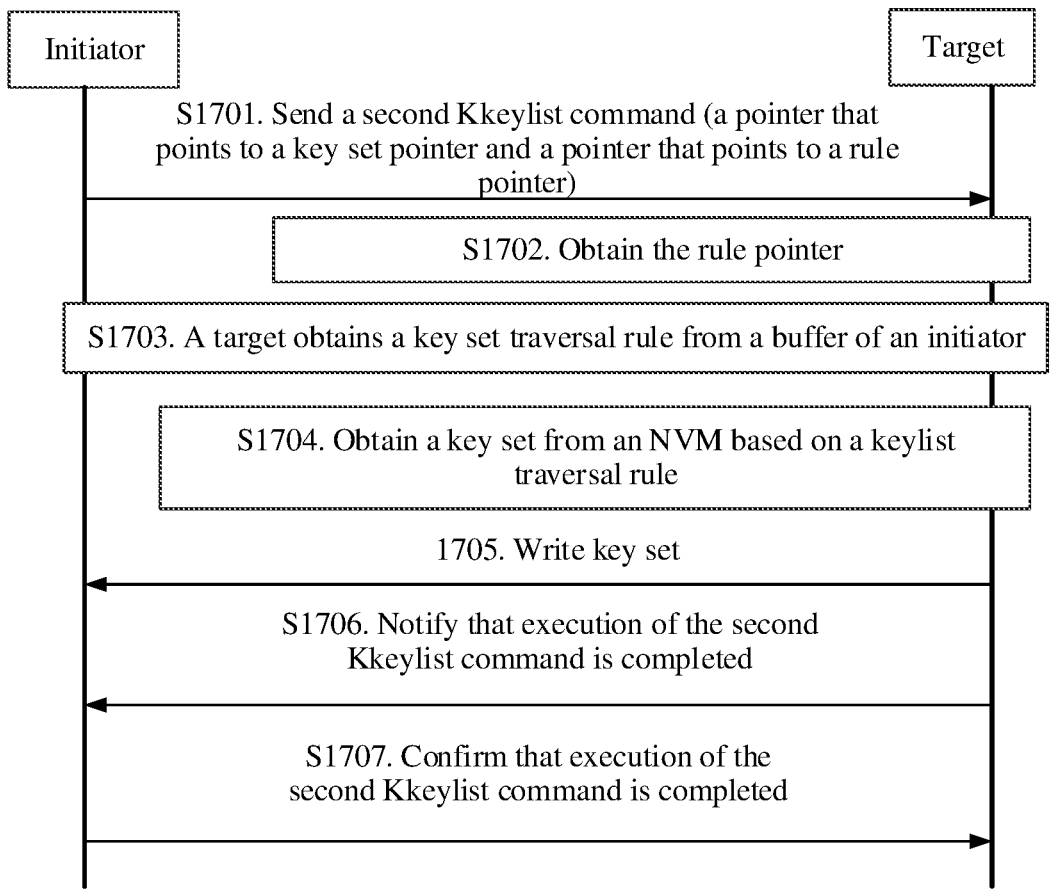
FIG. 17A is a schematic flowchart of another data access method according to an embodiment of the present disclosure.

Referring to FIG. 17A, FIG. 17A is a schematic flowchart of a data access method in an NoF scenario corresponding to a Kkeylist command according to another embodiment of the present disclosure. As shown in FIG. 17A, the data access method provided in another embodiment of the present disclosure may include the following steps.

Step S1701: An initiator sends a second Kkeylist command (a pointer that points to a key set pointer and a pointer that points to a rule pointer) to a target.

Figure 17B:
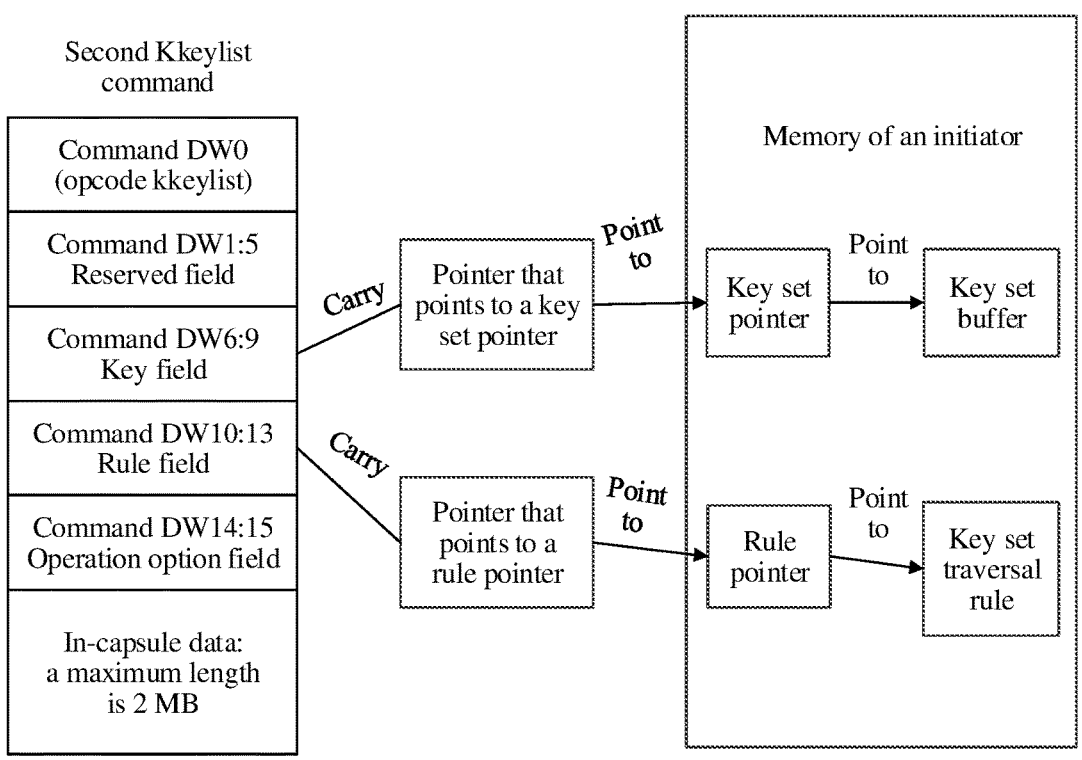
FIG. 17B and FIG. 17C are schematic diagrams of formats of several Kkeylist commands and pointer mapping relationships according to an embodiment of the present disclosure.

It is assumed that a format of the second Kkeylist command is shown in FIG. 17B. The second Kkeylist command includes a key field (DW6:9), a rule field (DW10:13), and the like. The key field in the second Kkeylist command carries a pointer that points to a key set pointer, and the key set pointer points to a buffer that is of the initiator and that is allocated by the initiator to a key set.

The rule field (DW10:13) in the second Kkeylist command carries a pointer that points to a rule pointer, and the rule pointer points to a buffer that is of the initiator and that is allocated by the initiator to a key set traversal rule. An operation option field (DW14:15) in the second Kkeylist command indicates that the second Kkeylist command is a command used to request to obtain a key set.

For example, an operation object type indicated by an operation object type indicator carried in the operation option field in the second Kkeylist command includes or is a key. For example, an operation indicated by an operation manner indicator carried in an opcode field in the second Kkeylist command is an obtain operation.

Step S1702: The target receives the second Kkeylist command, the target obtains, by parsing the second Kkeylist command, a pointer that points to a key set pointer and that is carried in a key field in the second Kkeylist command, and the target obtains, by parsing the second Kkeylist command, a pointer that points to a rule pointer and that is carried in a rule field in the second Kkeylist command.

If the pointer that points to the key set pointer and that is carried in the key field in the second Kkeylist command points to a buffer of the initiator (as shown in FIG. 17B), the target may obtain the key set pointer from the buffer of the initiator in an RDMA manner based on the pointer that points to the key set pointer and that is carried in the key field in the second Kkeylist command. If the pointer that points to the rule pointer and that is carried in the rule field in the second Kkeylist command points to a buffer of the initiator, the target may obtain the rule pointer from the buffer of the initiator in an RDMA manner based on the pointer that points to the rule pointer and that is carried in the rule field in the second Kkeylist command.

Figure 17C:
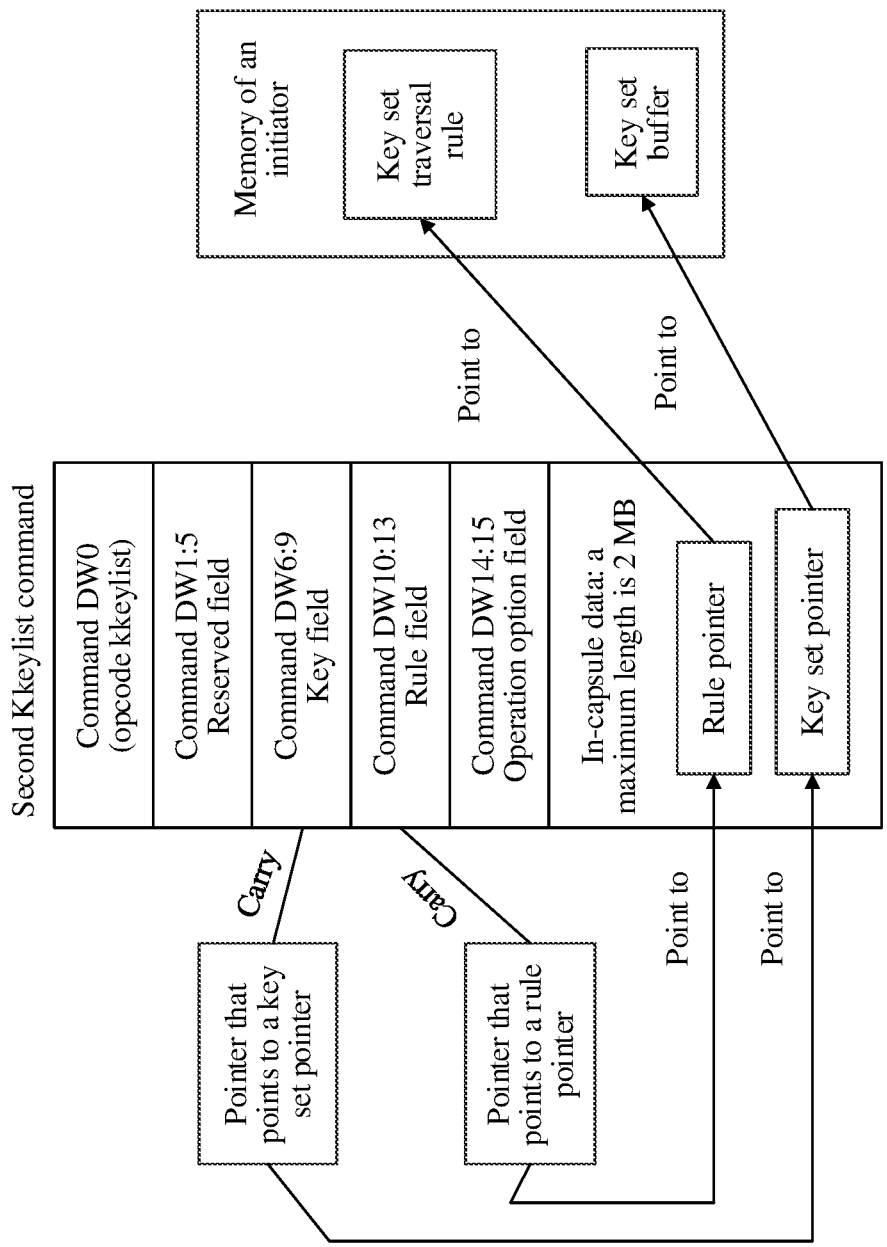

Alternatively, if the pointer that points to the key set pointer and that is carried in the key field in the second Kkeylist command points to in-capsule data of the second Kkeylist command (as shown in FIG. 17C), the target may obtain the key set pointer from the in-capsule data of the second Kkeylist command based on the pointer that points to the key set pointer and that is carried in the key field in the second Kkeylist command. If the pointer that points to the rule pointer and that is carried in the rule field in the second Kkeylist command points to the in-capsule data of the second Kkeylist command, the target may obtain the rule pointer from the in-capsule data of the second Kkeylist command based on the pointer that points to the rule pointer and that is carried in the rule field in the second Kkeylist command.

Step S1703: The target may obtain a key set traversal rule in an RDMA manner from a buffer to which the rule pointer points.

Step S1704: The target obtains, by searching an NVM based on the key set traversal rule, a key set that meets the key set traversal rule.

Step S1705: The target may write, in an RDMA manner, the obtained key set into a buffer that is of the initiator and to which the key set pointer points.

Step S1706: The target notifies the initiator that execution of the second Kkeylist command is completed.

Step S1707: The initiator may further confirm that execution of the second Kkeylist command is completed.

It may be learned that the foregoing example provides some possible implementation manners of efficiently obtaining a key in the NoF scenario.

The following further provides related apparatuses for implementing the foregoing solutions.

Figure 18:
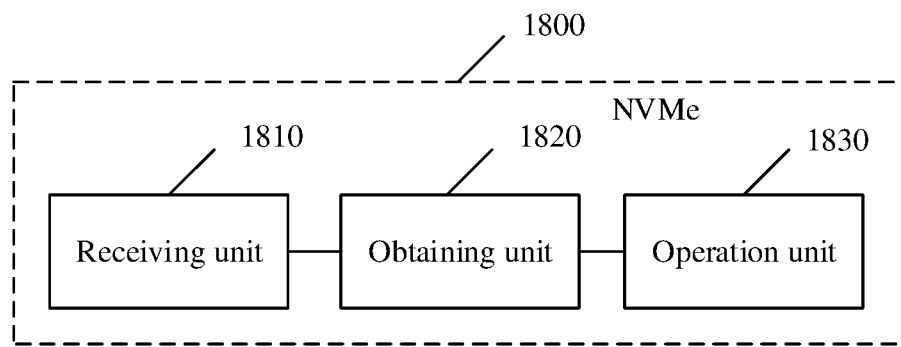
FIG. 18 is a schematic diagram of an NVMe according to an embodiment of the present disclosure.

Referring to FIG. 18, an embodiment of the present disclosure provides an NVMe 1800, and the NVMe 1800 may include a receiving unit 1810, an obtaining unit 1820, and an operation unit 1830.

The receiving unit 1810 is configured to receive, from a processor, a first key-value command whose format meets an NVMe interface standard, where the first key-value command carries a first operation manner indicator and a first operation object type indicator, and an operation object type indicated by the first operation object type indicator includes a value.

The obtaining unit 1820 is configured to obtain N keys corresponding to the first key-value command, where N is an integer greater than or equal to 1.

The operation unit 1830 is configured to perform, on a value corresponding to each of the N keys, an operation indicated by the first operation manner indicator.

Optionally, in some possible implementation manners of the present disclosure, the first key-value command further carries the N keys, and the obtaining unit 1820 is further configured to obtain, by parsing the first key-value command, the N keys carried in the key-value command, or the first key-value command further carries N key pointers, and the obtaining unit 1820 is further configured to obtain the N keys corresponding to the first key-value command from buffers to which the N key pointers point.

Optionally, in some possible implementation manners of the present disclosure, the first key-value command further carries N value pointers, and the operation indicated by the first operation manner indicator is an obtain operation. The operation unit 1830 is further configured to obtain N values corresponding to the N keys from an NVM of the NVMe 1800, and write all of the obtained N values into buffers to which different value pointers in the N value pointers point, where a value in the N values corresponding to a key-i is written into a buffer to which a value pointer in the N value pointers corresponding to the key-i points, and the key-i is any one of the N keys.

Optionally, in some possible implementation manners of the present disclosure, before receiving the first key-value command, the receiving unit 1810 is further configured to receive a second key-value command whose format meets the NVMe interface standard, where the second key-value carries a second operation manner indicator and a second operation object type indicator, an operation indicated by the second operation manner indicator is an obtain operation, an operation object type indicated by the second operation object type indicator includes metadata of a value, and the second key-value command further carries N metadata pointers.

The obtaining unit 1820 may be further configured to obtain N keys from buffers to which the N key pointers point when the second key-value command further carries N key pointers, or obtain, by parsing the second key-value command, the N keys carried in the second key-value command when the second key-value command further carries N keys.

The operation unit 1830 is further configured to search the NVM of the NVMe 1800 for metadata of N values corresponding to the N keys, and write the metadata of all of the N values into buffers to which different metadata pointers in the N metadata pointers point, where metadata that is of a value corresponding to a key-i and that is in the metadata of the N values is written into a buffer to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N value pointers or N values.

The operation unit 1830 is further configured to obtain N values corresponding to the N keys from buffers to which the N value pointers carried in the first key-value command point, and write the N values into an NVM of the NVMe 1800 when the first key-value command further carries the N value pointers, or the operation unit 1830 is further configured to obtain, by parsing the first key-value command, the N values carried in the first key-value command, and write the N values into an NVM of the NVMe 1800 when the first key-value command further carries the N values.

Optionally, in some possible implementation manners of the present disclosure, the operation indicated by the first operation manner indicator is a delete operation, and the operation unit 1830 is further configured to delete values corresponding to the N keys from an NVM of the NVMe 1800.

Optionally, in some possible implementation manners of the present disclosure, the receiving unit 1810 is further configured to receive a third command whose format meets the NVMe interface standard, where the third command carries a third operation manner indicator and a third operation object type indicator, an operation indicated by the third operation manner indicator is an obtain operation, an operation object type indicated by the third operation object indicator includes a key, and the third command further carries a key set pointer.

The obtaining unit 1820 is further configured to obtain a key set traversal rule from a buffer to which the rule pointer points when the third command further carries a rule pointer, or obtain, by parsing the third command, the key set traversal rule carried in the third command when the third command further carries a key set traversal rule.

The operation unit 1830 may be further configured to obtain a key set from the NVM of the NVMe 1800 based on the key set traversal rule, and write the obtained key set into a buffer to which the key set pointer points, where some or all of the N keys are some or all keys in the key set.

Figure 19:
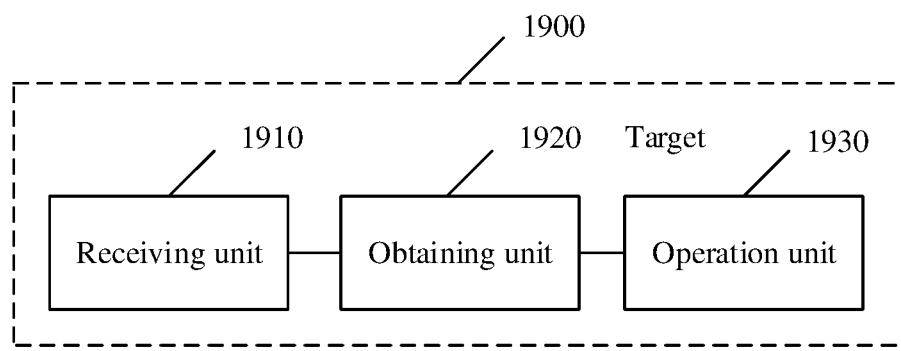
FIG. 19 is a schematic diagram of a target according to an embodiment of the present disclosure.

Referring to FIG. 19, an embodiment of the present disclosure further provides a target 1900, including a receiving unit 1910, an obtaining unit 1920, and an operation unit 1930.

The receiving unit 1910 is configured to receive, from an initiator, a first key-value command whose format meets an NVMe interface standard, where the first key-value command carries a first operation manner indicator and a first operation object type indicator, and an operation object type indicated by the first operation object type indicator includes a value.

The obtaining unit 1920 is configured to obtain N keys corresponding to the first key-value command, where N is an integer greater than or equal to 1.

The operation unit 1930 is configured to perform, on a value corresponding to each of the N keys, an operation indicated by the first operation manner indicator.

Optionally, in some possible implementation manners of the present disclosure, the first key-value command further carries the N keys or N key pointers or pointers that point to N key pointers.

The obtaining unit 1920 is further configured to obtain the N key pointers from buffers of the initiator or in-capsule data of the first key-value command based on the pointers that point to the N key pointers and that are carried in the first key-value command, and obtain the N keys corresponding to the first key-value command from buffers that are of the initiator and to which the N key pointers point when the first key-value command further carries the pointers that point to the N key pointers, or the obtaining unit 1920 is further configured to obtain, by parsing the first key-value command, the N key pointers carried in the first key-value command, and obtain the N keys corresponding to the first key-value command from buffers that are of the initiator and to which the N key pointers point when the first key-value command carries the N key pointers, or the obtaining unit 1920 is further configured to obtain, by parsing the first key-value command, the N keys carried in the first key-value command when the first key-value command carries the N keys.

Optionally, in some possible implementation manners of the present disclosure, the operation indicated by the first operation manner indicator is an obtain operation, and the first key-value command further carries N value pointers or pointers that point to N value pointers.

The obtaining unit 1920 is further configured to obtain, by parsing the first key-value command, the N value pointers carried in the first key-value command when the first key-value command further carries the N value pointers, or obtain the N value pointers from buffers of the initiator or the in-capsule data of the first key-value command based on the pointers that point to the N value pointers and that are carried in the first key-value command when the first key-value command further carries the pointers that point to the N value pointers.

The operation unit 1930 is further configured to obtain N values corresponding to the N keys from an NVM of the target 1900, and write all of the obtained N values into buffers that are of the initiator and to which different value pointers in the N value pointers point, where a value in the N values corresponding to a key-i is written into a buffer that is of the initiator and to which a value pointer in the N value pointers corresponding to the key-i points, and the key-i is any one of the N keys.

Optionally, in some possible implementation manners of the present disclosure, before receiving the first key-value command, the receiving unit 1910 is further configured to receive a fourth key-value command whose format meets the NVMe interface standard, where the fourth key-value command carries a fourth operation manner indicator and a fourth operation object type indicator, an operation indicated by the fourth operation manner indicator is an obtain operation, and an operation object type indicated by the fourth operation object type indicator includes metadata of a value.

The obtaining unit 1920 is further configured to obtain, by parsing the fourth key-value command, the N keys carried in the fourth key-value command when the fourth key-value command further carries N keys, obtain, by parsing the fourth key-value command, the N key pointers carried in the fourth key-value command, and obtain the N keys from buffers that are of the initiator and to which the N key pointers point when the fourth key-value command further carries N key pointers, or obtain the N key pointers from buffers of the initiator or in-capsule data of the fourth key-value command based on the pointers that point to the N key pointers and that are carried in the fourth key-value command, and obtain the N keys from buffers that are of the initiator and to which the N key pointers point when the fourth key-value command carries pointers that point to N key pointers.

The obtaining unit 1920 is further configured to obtain, by parsing the fourth key-value command, the N metadata pointers carried in the fourth key-value command when the fourth key-value command further carries N metadata pointers, or obtain the N metadata pointers from buffers of the initiator or the in-capsule data of the fourth key-value command based on the pointers that point to the N metadata pointers and that are carried in the fourth key-value command when the fourth key-value command further carries pointers that point to N metadata pointers.

The operation unit 1930 is further configured to search the NVM of the target 1900 for metadata of N values corresponding to the N keys, and write the metadata of all of the N values into buffers that are of the initiator and to which different metadata pointers in the N metadata pointers point, where metadata that is of a value corresponding to a key-i and that is in the metadata of the N values is written into a buffer that is of the initiator and to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N values or N value pointers or pointers that point to N value pointers.

The operation unit 1930 is further configured to obtain, by parsing the first key-value command, the N values carried in the first key-value command, and write the N values into an NVM of the target 1900 when the first key-value command carries the N values, the operation unit 1930 is further configured to obtain, by parsing the first key-value command, the N value pointers carried in the first key-value command when the first key-value command further carries the N value pointers, obtain N values corresponding to the N keys from buffers that are of the initiator and to which the N value pointers point, and write the N values into an NVM of the target 1900, or the operation unit 1930 is further configured to obtain the N value pointers from buffers of the initiator or the in-capsule data of the first key-value command based on the pointers that point to the N value pointers and that are carried in the first key-value command when the first key-value command further carries the pointers that point to the N value pointers, obtain N values corresponding to the N keys from buffers that are of the initiator and to which the N value pointers point, and write the N values into an NVM of the target 1900.

Optionally, in some possible implementation manners of the present disclosure, the operation indicated by the first operation manner indicator is a delete operation, and performing, on a value corresponding to each of the N keys, an operation indicated by the first operation manner indicator includes deleting values corresponding to the N keys from an NVM of the target 1900.

Optionally, in some possible implementation manners of the present disclosure, the receiving unit 1910 is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key. The obtaining unit 1920 is further configured to obtain the rule pointer from a buffer of the initiator or in-capsule data of the fifth command based on the pointer that points to the rule pointer and that is carried in the fifth command when the fifth command further carries a pointer that points to a rule pointer and a pointer that points to a key set pointer, obtain the key set pointer from a buffer of the initiator or the in-capsule data of the fifth command based on the pointer that points to the key set pointer and that is carried in the fifth command, and obtain a key set traversal rule from a buffer that is of the initiator and to which the rule pointer points, and the operation unit 1930 is further configured to obtain a key set from the NVM of the target 1900 based on the key set traversal rule, and write the obtained key set into a buffer that is of the initiator and to which the key set pointer points, where some or all of the N keys are some or all keys in the key set, or the receiving unit 1910 is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key. The obtaining unit 1920 is further configured to obtain a key set traversal rule from a buffer that is of the initiator and to which the rule pointer points when the fifth command further carries a rule pointer and a key set pointer, and the operation unit 1930 may be further configured to obtain a key set from the NVM of the target 1900 based on the key set traversal rule, and write the obtained key set into a buffer that is of the initiator and to which the key set pointer points, where some or all of the N keys are some or all keys in the key set, or the receiving unit 1910 is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key. The obtaining unit 1920 is further configured to obtain, by parsing the fifth command, the key set traversal rule carried in the fifth command when the fifth command further carries a key set traversal rule and carries a key set pointer, and the operation unit 1930 is further configured to obtain a key set from the NVM of the target 1900 based on the key set traversal rule, and write the obtained key set into a buffer that is of the initiator and to which the key set pointer points, where some or all of the N keys are some or all keys in the key set.

Figure 20:
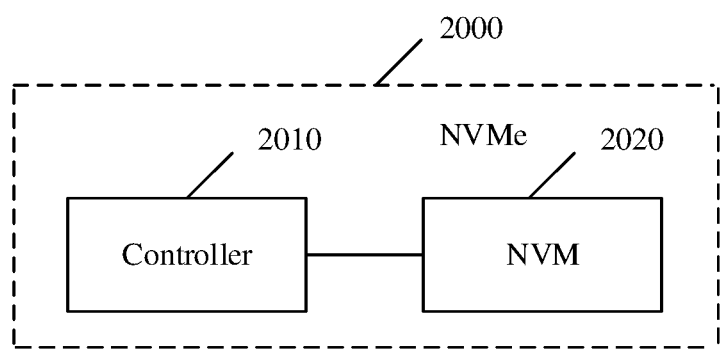
FIG. 20 is a schematic diagram of another NVMe according to an embodiment of the present disclosure.

Referring to FIG. 20, an embodiment of the present disclosure provides an NVMe 2000, including a controller 2010 and an NVM 2020.

The NVM 2020 is configured to provide storage space for data such as a value. For example, the NVM 2020 may be further configured to provide storage space for a key, metadata, and the like.

The controller 2010 is configured to receive, from a processor, a first key-value command whose format meets an NVMe interface standard, where the first key-value command carries a first operation manner indicator and a first operation object type indicator, and an operation object type indicated by the first operation object type indicator includes a value, obtain N keys corresponding to the first key-value command, where N is an integer greater than or equal to 1, and perform, on a value corresponding to each of the N keys, an operation indicated by the first operation manner indicator.

Optionally, in some possible implementation manners of the present disclosure, the first key-value command further carries the N keys, and for obtaining N keys corresponding to the first key-value command, the controller 2010 is further configured to obtain, by parsing the first key-value command, the N keys carried in the key-value command, or the first key-value command further carries N key pointers, and for obtaining N keys corresponding to the first key-value command, the controller 2010 is further configured to obtain the N keys corresponding to the first key-value command from buffers to which the N key pointers point.

Optionally, in some possible implementation manners of the present disclosure, the first key-value command further carries N value pointers, and the operation indicated by the first operation manner indicator is an obtain operation.

For the performing, on a value corresponding to each of the N keys, an operation indicated by the first operation manner indicator, the controller 2010 is further configured to obtain N values corresponding to the N keys from the NVM 2020 of the NVMe 2000, and write all of the obtained N values into buffers to which different value pointers in the N value pointers point, where a value in the N values corresponding to a key-i is written into a buffer to which a value pointer in the N value pointers corresponding to the key-i points, and the key-i is any one of the N keys.

Optionally, in some possible implementation manners of the present disclosure, the controller 2010 may be further configured to receive a second key-value command whose format meets the NVMe interface standard before receiving the first key-value command, where the second key-value carries a second operation manner indicator and a second operation object type indicator, an operation indicated by the second operation manner indicator is an obtain operation, an operation object type indicated by the second operation object type indicator includes metadata of a value, and the second key-value command further carries N metadata pointers, obtain N keys from buffers to which the N key pointers point when the second key-value command further carries N key pointers, or obtain, by parsing the second key-value command, the N keys carried in the second key-value command when the second key-value command further carries N keys, search the NVM of the NVMe for metadata of N values corresponding to the N keys, and write the metadata of all of the N values into buffers to which different metadata pointers in the N metadata pointers point, where metadata that is of a value corresponding to a key-i and that is in the metadata of the N values is written into a buffer to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N value pointers or N values.

When the first key-value command further carries the N value pointers, for the performing, on a value corresponding to each of the N keys, an operation indicated by the first operation manner indicator, the controller 2010 is further configured to obtain N values corresponding to the N keys from buffers to which the N value pointers carried in the first key-value command point, and write the N values into the NVM 2020 of the NVMe 2000, or when the first key-value command further carries the N values, for performing, on a value corresponding to each of the N keys, an operation indicated by the first operation manner indicator, the controller 2010 is further configured to obtain, by parsing the first key-value command, the N values carried in the first key-value command, and write the N values into the NVM 2020 of the NVMe 2000.

Optionally, in some possible implementation manners of the present disclosure, the operation indicated by the first operation manner indicator is a delete operation, and performing, on a value corresponding to each of the N keys, an operation indicated by the first operation manner indicator includes deleting values corresponding to the N keys from the NVM 2020 of the NVMe 2000.

Optionally, in some possible implementation manners of the present disclosure, before receiving, from the processor, the first key-value command whose format meets the NVMe interface standard, the controller 2010 may be further configured to receive a third command whose format meets the NVMe interface standard, where the third command carries a third operation manner indicator and a third operation object type indicator, an operation indicated by the third operation manner indicator is an obtain operation, an operation object type indicated by the third operation object indicator includes a key, and the third command further carries a key set pointer, obtain a key set traversal rule from a buffer to which the rule pointer points when the third command further carries a rule pointer, or obtain, by parsing the third command, the key set traversal rule carried in the third command when the third command further carries a key set traversal rule, and obtain a key set from the NVM 2020 of the NVMe 2000 based on the key set traversal rule, and write the obtained key set into a buffer to which the key set pointer points, where some or all of the N keys are some or all keys in the key set.

Figure 21:
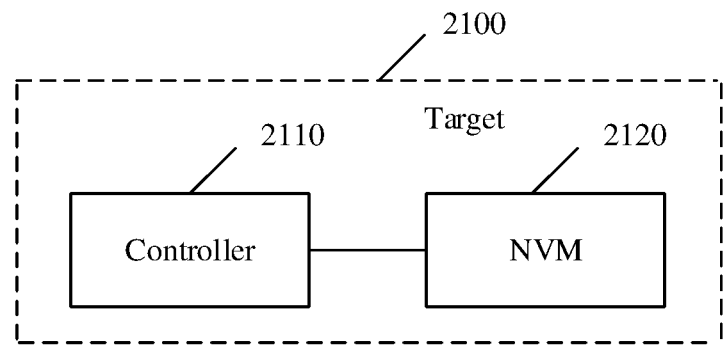
FIG. 21 is a schematic diagram of another target according to an embodiment of the present disclosure.

Referring to FIG. 21, an embodiment of the present disclosure further provides a target 2100, including a controller (for example, an NVMe controller or an NoF controller) 2110 and an NVM 2120.

The NVM 2120 is configured to provide storage space for data such as a value. For example, the NVM 2120 may be further configured to provide storage space for a key, metadata, and the like.

The controller 2110 is configured to receive, from an initiator, a first key-value command whose format meets an NVMe interface standard, where the first key-value command carries a first operation manner indicator and a first operation object type indicator, and an operation object type indicated by the first operation object type indicator includes a value, obtain N keys corresponding to the first key-value command, where N is an integer greater than or equal to 1, and perform, on a value corresponding to each of the N keys, an operation indicated by the first operation manner indicator.

Optionally, in some possible implementation manners of the present disclosure, the first key-value command further carries the N keys or N key pointers or pointers that point to N key pointers.

When the first key-value command further carries the pointers that point to the N key pointers, for obtaining N keys corresponding to the first key-value command, the controller 2110 is further configured to obtain the N key pointers from buffers of the initiator or in-capsule data of the first key-value command based on the pointers that point to the N key pointers and that are carried in the first key-value command, and obtain the N keys corresponding to the first key-value command from buffers that are of the initiator and to which the N key pointers point, when the first key-value command carries the N key pointers, for the obtaining N keys corresponding to the first key-value command, the controller 2110 is further configured to obtain, by parsing the first key-value command, the N key pointers carried in the first key-value command, and obtain the N keys corresponding to the first key-value command from buffers that are of the initiator and to which the N key pointers point, or when the first key-value command carries the N keys, for obtaining N keys corresponding to the first key-value command, the controller 2110 is further configured to obtain, by parsing the first key-value command, the N keys carried in the first key-value command.

Optionally, in some possible implementation manners of the present disclosure, the operation indicated by the first operation manner indicator is an obtain operation, and the first key-value command further carries N value pointers or pointers that point to N value pointers.

The controller 2110 is further configured to obtain, by the target by parsing the first key-value command, the N value pointers carried in the first key-value command when the first key-value command further carries the N value pointers, or obtain, by the target, the N value pointers from buffers of the initiator or the in-capsule data of the first key-value command based on the pointers that point to the N value pointers and that are carried in the first key-value command when the first key-value command further carries the pointers that point to the N value pointers.

For performing, on a value corresponding to each of the N keys, an operation indicated by the first operation manner indicator, the controller 2110 is further configured to obtain N values corresponding to the N keys from the NVM of the target, and write all of the obtained N values into buffers that are of the initiator and to which different value pointers in the N value pointers point, where a value in the N values corresponding to a key-i is written into a buffer that is of the initiator and to which a value pointer in the N value pointers corresponding to the key-i points, and the key-i is any one of the N keys.

Optionally, in some possible implementation manners of the present disclosure, before receiving the first key-value command, the controller 2110 is further configured to receive a fourth key-value command whose format meets the NVMe interface standard, where the fourth key-value command carries a fourth operation manner indicator and a fourth operation object type indicator, an operation indicated by the fourth operation manner indicator is an obtain operation, and an operation object type indicated by the fourth operation object type indicator includes metadata of a value, obtain, by parsing the fourth key-value command, the N keys carried in the fourth key-value command when the fourth key-value command further carries N keys, obtain, by parsing the fourth key-value command, the N key pointers carried in the fourth key-value command, and obtain the N keys from buffers that are of the initiator and to which the N key pointers point when the fourth key-value command further carries N key pointers, or obtain the N key pointers from buffers of the initiator or in-capsule data of the fourth key-value command based on the pointers that point to the N key pointers and that are carried in the fourth key-value command, and obtain the N keys from buffers that are of the initiator and to which the N key pointers point when the fourth key-value command carries pointers that point to N key pointers, obtain, by parsing the fourth key-value command, the N metadata pointers carried in the fourth key-value command when the fourth key-value command further carries N metadata pointers, or obtain the N metadata pointers from buffers of the initiator or the in-capsule data of the fourth key-value command based on the pointers that point to the N metadata pointers and that are carried in the fourth key-value command when the fourth key-value command further carries pointers that point to N metadata pointers, search the NVM of the target for metadata of N values corresponding to the N keys, and write the metadata of all of the N values into buffers that are of the initiator and to which different metadata pointers in the N metadata pointers point, where metadata that is of a value corresponding to a key-i and that is in the metadata of the N values is written into a buffer that is of the initiator and to which a metadata pointer in the N metadata pointers corresponding to the key-i points, and the metadata of the value corresponding to the key-i includes length information of the value corresponding to the key-i.

Optionally, in some possible implementation manners of the present disclosure, the operation indicated by the first operation manner indicator is a write operation, and the first key-value command further carries N values or N value pointers or pointers that point to N value pointers.

When the first key-value command carries the N values, for performing, on a value corresponding to each of the N keys, an operation indicated by the first operation manner indicator, the controller is further configured to obtain, by parsing the first key-value command, the N values carried in the first key-value command, and write the N values into the NVM 2120 of the target 2100, when the first key-value command further carries the N value pointers, for performing, on a value corresponding to each of the N keys, an operation indicated by the first operation manner indicator, the controller 2110 is further configured to obtain, by parsing the first key-value command, the N value pointers carried in the first key-value command, and obtain N values corresponding to the N keys from buffers that are of the initiator and to which the N value pointers point, and write the N values into the NVM 2120 of the target 2100, or when the first key-value command further carries the pointers that point to the N value pointers, for performing, on a value corresponding to each of the N keys, an operation indicated by the first operation manner indicator, the controller 2110 is further configured to obtain the N value pointers from buffers of the initiator or the in-capsule data of the first key-value command based on the pointers that point to the N value pointers and that are carried in the first key-value command, and obtain N values corresponding to the N keys from buffers that are of the initiator and to which the N value pointers point, and write the N values into the NVM 2120 of the target 2100.

Optionally, in some possible implementation manners of the present disclosure, the operation indicated by the first operation manner indicator is a delete operation, and for performing, on a value corresponding to each of the N keys, an operation indicated by the first operation manner indicator, the controller is further configured to delete values corresponding to the N keys from the NVM 2120 of the target 2100.

Optionally, in some possible implementation manners of the present disclosure, before receiving, from the initiator, the first key-value command whose format meets the NVMe interface standard, the controller 2110 may be further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtain the rule pointer from a buffer of the initiator or in-capsule data of the fifth command based on the pointer that points to the rule pointer and that is carried in the fifth command when the fifth command further carries a pointer that points to a rule pointer and a pointer that points to a key set pointer, obtain the key set pointer from a buffer of the initiator or the in-capsule data of the fifth command based on the pointer that points to the key set pointer and that is carried in the fifth command, obtain a key set traversal rule from a buffer that is of the initiator and to which the rule pointer points, obtain a key set from the NVM 2120 of the target 2100 based on the key set traversal rule, and write the obtained key set into a buffer that is of the initiator and to which the key set pointer points, where some or all of the N keys are some or all keys in the key set, before receiving, from the initiator, the first key-value command whose format meets the NVMe interface standard, the controller 2110 is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtain a key set traversal rule from a buffer that is of the initiator and to which the rule pointer points when the fifth command further carries a rule pointer and a key set pointer, obtain a key set from the NVM 2120 of the target 2100 based on the key set traversal rule, and write the obtained key set into a buffer that is of the initiator and to which the key set pointer points, where some or all of the N keys are some or all keys in the key set, or before receiving, from the initiator, the first key-value command whose format meets the NVMe interface standard, the controller 2110 is further configured to receive a fifth command whose format meets the NVMe interface standard, where the fifth command carries a fifth operation manner indicator and a fifth operation object type indicator, an operation indicated by the fifth operation manner indicator is an obtain operation, and an operation object type indicated by the fifth operation object type indicator includes a key, obtain, by parsing the fifth command, the key set traversal rule carried in the fifth command when the fifth command further carries a key set traversal rule and carries a key set pointer, obtain a key set from the NVM 2120 of the target 2100 based on the key set traversal rule, and write the obtained key set into a buffer that is of the initiator and to which the key set pointer points, where some or all of the N keys are some or all keys in the key set.

Figure 22:
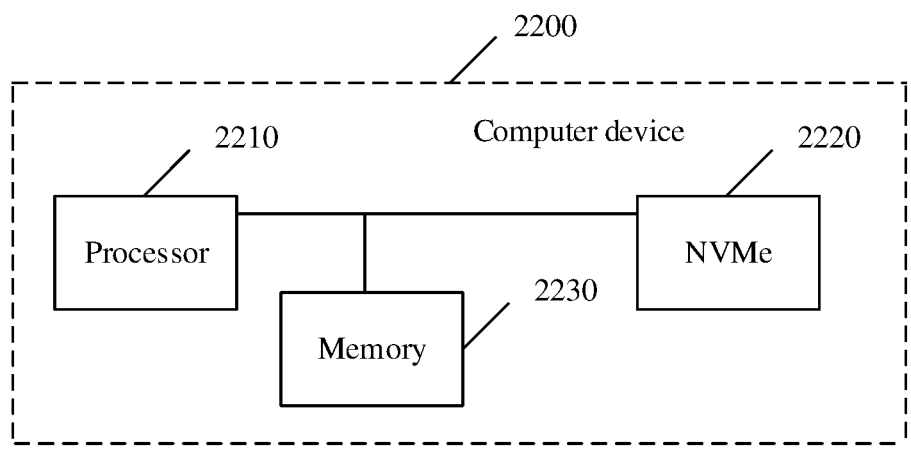
FIG. 22 is a schematic diagram of a computer device according to an embodiment of the present disclosure.

Referring to FIG. 22, an embodiment of the present disclosure further provides a computer device 2200, including a processor 2210 and an NVMe 2220. The NVMe 2220 may be any NVMe provided in the embodiments of the present disclosure. The computer device 2200 may further include a memory 2230 and the like. The computer device 2200 may be, for example, a computer device such as a personal computer, a workstation, an application server, or a site server.

Figure 23:
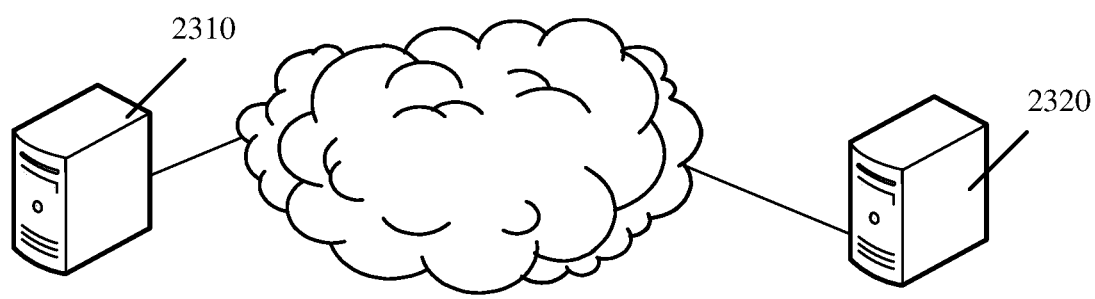
FIG. 23 is a schematic diagram of a data access system according to an embodiment of the present disclosure.

Referring to FIG. 23, an embodiment of the present disclosure further provides a data access system, including an initiator 2310 and a target 2320. The target 2320 may be any target provided in the embodiments of the present disclosure.

The initiator 2310 and the target 2320 are different computer devices. The initiator 2310 and the target 2320 may have various actual product forms. For example, the target 2320 may be a storage service provision device such as a storage server or a storage array. The initiator 2310 may be, for example, a storage service requesting device such as a personal computer, a workstation, an application server, or a site server.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are examples of embodiments, and the related actions and modules are not necessarily mandatory to the present disclosure.

In the embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-accessible storage medium. Based on such an understanding, the technical solutions in the present disclosure essentially, or the part contributing to the prior art, or all or some of the technical solutions may be implemented in the form of a software product. The software product is stored in a storage medium and includes instructions for instructing a computer device (which may be a personal computer, a server, or a network device, and may be a processor in a computer device) to perform all or some of the steps of the foregoing methods described in the embodiments of the present disclosure. The foregoing storage medium includes any medium that can store program code, such as a universal serial bus (USB) flash drive, a removable hard disk, a magnetic disk, an optical disc, a read-only memory (ROM), or a random access memory (RAM).

The foregoing embodiments are merely intended for describing the technical solutions in the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present disclosure.

What is claimed is:

1. A data access method, comprising:
   receiving, by a non-volatile memory express (NVMe) from a processor, a first key-value command whose format meets an NVMe interface standard, wherein the first key-value command carries a first operation manner indicator and a first operation object type indicator, and wherein an operation object type indicated by the first operation object type indicator comprises a value;
   obtaining, by the NVMe, N keys corresponding to the first key-value command, wherein N is an integer greater than or equal to one, wherein the N keys are obtained from buffers to which N key pointers point when the first key-value command carries the N key pointers; and
   performing, by the NVMe, on a value corresponding to each of the N keys, an operation indicated by the first operation manner indicator.

2. The data access method of claim 1, wherein the first key-value command further carries N value pointers, each value pointer is configure to indicate a storage location of one value corresponding to the value pointer in the buffers, wherein the operation indicated by the first operation manner indicator is an obtain value operation, and wherein performing the operation indicated by the first operation manner indicator comprises:
   obtaining, by the NVMe, N values corresponding to the N keys from a non-volatile memory (NVM); and
   writing, by the NVMe, the obtained N values into buffers to which the N value pointers point.

3. The data access method of claim 2, wherein before receiving the first key-value command, the data access method further comprises:
   receiving, by the NVMe, a second key-value command whose format meets the NVMe interface standard, wherein the second key-value command carries a second operation manner indicator and a second operation object type indicator, wherein an operation indicated by the second operation manner indicator is obtain metadata of value operation, wherein an operation object type indicated by the second operation object type indicator comprises metadata of a value, and wherein the second key-value command further carries N metadata pointers;
   obtaining the N keys from the buffers to which the N key pointers point when the second key-value command further carries the N key pointers;
   searching, by the NVMe, the NVM for metadata of the N values corresponding to the N keys; and
   writing, by the NVMe, the metadata of the N values into buffers to which the N metadata pointers point,
   wherein metadata of the value corresponding to the key-i in the metadata of the N values is written into a buffer to which a metadata pointer in the N metadata pointers corresponding to the key-i points;
   wherein the metadata of the value corresponding to the key-i comprises length of the value corresponding to the key-i; the storage location for key-i value in the buffers is determined according to the length of the value corresponding to the key-i.

4. The data access method of claim 1, wherein the operation indicated by the first operation manner indicator is a write operation, and wherein performing the operation indicated by the first operation manner indicator comprises:
   obtaining N values corresponding to the N keys from buffers to which N value pointers point when the first key-value command further carries the N value pointers; and
   writing, by the NVMe, the N values into a non-volatile memory (NVM).

5. The data access method of claim 1, wherein the operation indicated by the first operation manner indicator is a delete operation, and wherein performing the operation indicated by the first operation manner indicator comprises:
   deleting, by the NVMe, values corresponding to the N keys from a non-volatile memory (NVM).

6. The data access method of claim 1, wherein before receiving the first key-value command, the method further comprises:
   receiving, by the NVMe, a third key-value command whose format meets the NVMe interface standard, wherein the third key-value command carries a third operation manner indicator and a third operation object type indicator, wherein an operation indicated by the third operation manner indicator is an obtain operation, wherein an operation object type indicated by the third operation object indicator comprises a key, and wherein the third key-value command further carries a key set pointer;
   obtaining, by the NVMe, a key set traversal rule from a buffer to which a rule pointer points when the third key-value command further carries the rule pointer;
   obtaining, by the NVMe by parsing the third key-value command, the key set traversal rule when the third key-value command further carries the key set traversal rule;
   obtaining, by the NVMe, a key set from a NVM based on the key set traversal rule; and
   writing, by the NVMe, the obtained key set into a buffer to which the key set pointer points, and
   wherein the key set comprises M key, 1≤M, N and M comprise multiple same keys, or M comprises all keys in N.

7. A data access method, comprising:
   receiving, by a target from an initiator, a first key-value command whose format meets a non-volatile memory express (NVMe) interface standard, wherein the first key-value command carries a first operation manner indicator and a first operation object type indicator, and wherein an operation object type indicated by the first operation object type indicator comprises a value;
   obtaining, by the NVMe, N keys corresponding to the first key-value command, wherein N is an integer greater than or equal to one, wherein the N keys are obtained from buffers to which N key pointers point when the first key-value command carries the N key pointers; and performing, by the NVMe on a value corresponding to each of the N keys, an operation indicated by the first operation manner indicator.

8. The data access method of claim 7, wherein the operation indicated by the first operation manner indicator is an obtain operation, and wherein the method further comprises:

obtaining, by the target, the N value pointers from buffers of the initiator or in-capsule data of the first key-value command based on pointers that point to the N value pointers when the first key-value command further carries the pointers that point to the N value pointers, and wherein performing the operation indicated by the first operation manner indicator comprises:
obtaining N values corresponding to the N keys from a non-volatile memory (NVM) of the target; and
writing all of the obtained N values into buffers of the initiator and to which the N value pointers point,
wherein a value in the N values corresponding to a key-i is written into a buffer of the initiator and to which a value pointer in the N value pointers corresponding to the key-i points, and
wherein the key-i is any one of the N keys.

9. The data access method of claim 8, wherein before receiving the first key-value command, the method further comprises:

receiving, by the target, a fourth key-value command whose format meets the NVMe interface standard, wherein the fourth key-value command carries a fourth operation manner indicator and a fourth operation object type indicator, wherein an operation indicated by the fourth operation manner indicator is another obtain operation, and wherein an operation object type indicated by the fourth operation object type indicator comprises metadata of a value;
obtaining, by parsing the fourth key-value command, the N key pointers when the fourth key-value command further carries the N key pointers;
obtaining the N keys from the buffers of the initiator and to which the N key pointers point;
obtaining, by parsing the fourth key-value command, N metadata pointers when the fourth key-value command further carries the N metadata pointers;
searching the NVM of the target for metadata of N values corresponding to the N keys; and
writing the metadata of all of the N values into buffers of the initiator and to which the N metadata pointers point,
wherein metadata of the value corresponding to the key-i in the metadata of the N values is written into the buffer of the initiator and to which a metadata pointer in the N metadata pointers corresponding to the key-i points, and
wherein the metadata of the value corresponding to the key-i comprises length information of the value corresponding to the key-i.

10. The data access method of claim 7, wherein the operation indicated by the first operation manner indicator is a write operation, and wherein performing the operation indicated by the first operation manner indicator comprises:
obtaining, by parsing the first key-value command, N value pointers when the first key-value command further carries the N value pointers;
obtaining the N values corresponding to the N keys from buffers of the initiator and to which the N value pointers point; and
writing the N values into a non-volatile memory (NVM) of the target.

11. The data access method of claim 7, wherein the operation indicated by the first operation manner indicator is a delete operation, and wherein performing the operation indicated by the first operation manner indicator comprises deleting values corresponding to the N keys from a non-volatile memory (NVM) of the target.

12. The data access method of claim 11, wherein before receiving the first key-value command, the method further comprises:
receiving, by the target, a fifth key-value command whose format meets the NVMe interface standard, wherein the fifth key-value command carries a fifth operation manner indicator and a fifth operation object type indicator, wherein an operation indicated by the fifth operation manner indicator is an obtain operation, and wherein an operation object type indicated by the fifth operation object type indicator comprises a key;
obtaining a key set pointer from the buffer of the initiator;
obtaining a key set traversal rule from a buffer of the initiator and to which the rule pointer points;
obtaining the key set traversal rule from the buffer of the initiator and to which the rule pointer points when the fifth key-value command further carries the rule pointer and the key set pointer;
obtaining, by parsing the fifth key-value command, the key set traversal rule when the fifth key-value command further carries the key set traversal rule and the key set pointer;
obtaining a key set from the NVM of the target based on the key set traversal rule; and
writing the obtained key set into a buffer of the initiator and to which the key set pointer points, and
wherein some or all of the N keys are some or all keys in the key set.

13. A non-volatile memory express (NVMe), comprising:
a non-volatile memory (NVM) configured to provide storage space for a value; and
a controller coupled to the NVM and configured to:
receive, from a processor, a first key-value command whose format meets an NVMe interface standard, wherein the first key-value command carries a first operation manner indicator and a first operation object type indicator, and wherein an operation object type indicated by the first operation object type indicator comprises a value;
obtain N keys corresponding to the first key-value command, wherein N is an integer greater than or equal to one, and wherein the N keys are obtained from buffers to which N key pointers point when the first key-value command carries the N key pointers; and
perform, on a value corresponding to each of the N keys, an operation indicated by the first operation manner indicator.

14. The NVMe of claim 13, wherein the first key-value command further carries N value pointers, wherein the operation indicated by the first operation manner indicator is an obtain operation, wherein when performing the operation indicated by the first operation manner indicator, the controller is configured to:
obtain N values corresponding to the N keys from the NVM of the NVMe; and write all of the obtained N values into buffers to which the N value pointers point, wherein a value in the N values corresponding to a key-i is written into a buffer to which a value pointer in the N value pointers corresponding to the key-i points, and wherein the key-i is any one of the N keys.

15. The NVMe of claim 14, wherein the controller is further configured to:

receive a second key-value command whose format meets the NVMe interface standard before receiving the first key-value command, wherein the second key-value command carries a second operation manner indicator and a second operation object type indicator, wherein an operation indicated by the second operation manner indicator is another obtain operation, wherein an operation object type indicated by the second operation object type indicator comprises metadata of a value, and wherein the second key-value command further carries N metadata pointers;

obtain the N keys from the buffers to which the N key pointers point when the second key-value command further carries the N key pointers;

search the NVM of the NVMe for metadata of the N values corresponding to the N keys; and write the metadata of all of the N values into buffers to which the N metadata pointers point, wherein metadata of the value corresponding to the key-i in the metadata of the N values is written into a buffer to which a metadata pointer in the N metadata pointers corresponding to the key-i points.

16. The NVMe of claim 13, wherein the operation indicated by the first operation manner indicator is a write operation, and wherein when performing the operation indicated by the first operation manner indicator, the controller is further configured to:

obtain N values corresponding to the N keys from buffers to which N value pointers point when the first key-value command further carries the N value pointers;

write the N values into the NVM of the NVMe.

17. The NVMe of claim 13, wherein the controller is further configured to:

receive a third key-value command whose format meets the NVMe interface standard before receiving the first key-value command, wherein the third key-value command carries a third operation manner indicator and a third operation object type indicator, wherein an operation indicated by the third operation manner indicator is an obtain operation, wherein an operation object type indicated by the third operation object indicator comprises a key, and wherein the third key-value command further carries a key set pointer, obtain, by parsing a third key-value command, the key set traversal rule when the third key-value command further carries the key set traversal rule;

obtain a key set from the NVM of the NVMe based on the key set traversal rule; and write the obtained key set into a buffer to which the key set pointer points, and wherein some or all of the N keys are some or all keys in the key set.

18. A target, comprising:

a non-volatile memory (NVM) configured to provide storage space for a value; and a controller coupled to the NVM and configured to:

receive, from an initiator, a first key-value command whose format meets a non-volatile memory express (NVMe) interface standard, wherein the first key-value command carries a first operation manner indicator and a first operation object type indicator, and wherein an operation object type indicated by the first operation object type indicator comprises a value;

obtain N keys corresponding to the first key-value command, wherein N is an integer greater than or equal to one, and wherein the N keys are obtained from buffers to which N key pointers point when the first key-value command carries the N key pointers; and perform, on a value corresponding to each of the N keys, an operation indicated by the first operation manner indicator.

19. The target of claim 18, wherein the operation indicated by the first operation manner indicator is an obtain operation, and wherein the controller is further configured to:

obtain the N value pointers from buffers of the initiator or in-capsule data of the first key-value command based on pointers that point to the N value pointers when the first key-value command further carries the pointers that point to the N value pointers, and wherein when performing the operation indicated by the first operation manner indicator, the controller is configured to:

obtain N values corresponding to the N keys from the NVM of the target; and write all of the obtained N values into buffers of the initiator and to which the N value pointers point, wherein a value in the N values corresponding to a key-i is written into a buffer of the initiator and to which a value pointer in the N value pointers corresponding to the key-i points, and wherein the key-i is any one of the N keys.

20. The target of claim 19, wherein the controller is further configured to:

receive a fourth key-value command whose format meets the NVMe interface standard before receiving the first key-value command, wherein the fourth key-value command carries a fourth operation manner indicator and a fourth operation object type indicator, wherein an operation indicated by the fourth operation manner indicator is another obtain operation, and wherein an operation object type indicated by the fourth operation object type indicator comprises metadata of a value;

obtain, by parsing the fourth key-value command, the N key pointers when the fourth key-value command further carries the N key pointers;

obtain the N keys from the buffers of the initiator and to which the N key pointers point;

obtain, by parsing the fourth key-value command, N metadata pointers when the fourth key-value command further carries the N metadata pointers;

search the NVM of the target for metadata of N values corresponding to the N keys; and write the metadata of all of the N values into buffers of the initiator and to which the N metadata pointers point, wherein metadata of the value corresponding to the key-i in the metadata of the N values is written into a buffer of the initiator and to which a metadata pointer in the N metadata pointers corresponding to the key-i points, and wherein the metadata of the value corresponding to the key-i comprises length information of the value corresponding to the key-i.

21. The target of claim 18, wherein the operation indicated by the first operation manner indicator is a write operation, and wherein when performing the operation indicated by the first operation manner indicator, the controller is further configured to:
obtain, by parsing the first key-value command, N value pointers when the first key-value command further carries the N value pointers; and
obtain the N values corresponding to the N keys from buffers of the initiator and to which the N value pointers point; and
write the N values into the NVM of the target.

22. The target of claim 18, wherein the operation indicated by the first operation manner indicator is a delete operation, and wherein when performing the operation indicated by the first operation manner indicator, the controller is further configured to delete values corresponding to the N keys from the NVM of the target.

23. The target of claim 18, wherein before receiving the first key-value command, the controller is further configured to:
receive a fifth key-value command whose format meets the NVMe interface standard, wherein the fifth key-value command carries a fifth operation manner indicator and a fifth operation object type indicator, wherein an operation indicated by the fifth operation manner indicator is an obtain operation, and wherein an operation object type indicated by the fifth operation object type indicator comprises a key;
obtain a key set pointer from a buffer of the initiator or the in-capsule data of the fifth key-value command based on the pointer that points to the key set pointer and that is carried in the fifth key-value command;
obtain a key set traversal rule from a buffer of the initiator and to which the rule pointer points;
obtain the key set traversal rule from the buffer of the initiator and to which the rule pointer points when the fifth key-value command further carries the rule pointer and the key set pointer;
obtain, by parsing the fifth key-value command, the key set traversal rule when the fifth key-value command further carries the key set traversal rule and carries the key set pointer;
obtain a key set from the NVM of the target based on the key set traversal rule; and
write the obtained key set into a buffer of the initiator and to which the key set pointer points, and
wherein some or all of the N keys are some or all keys in the key set.

24. A computer device, comprising:
a processor configured to send a first key-value command whose format meets an non-volatile memory express (NVMe) interface standard; and
a NVME coupled to the processor and configured to:
receive, from the processor, the first key-value command, wherein the first key-value command carries a first operation manner indicator and a first operation object type indicator, and wherein an operation object type indicated by the first operation object type indicator comprises a value;
obtain N keys corresponding to the first key-value command, wherein N is an integer greater than or equal to one, and wherein the N keys are obtained from buffers to which N key pointers point when the first key-value command carries the N key pointers; and
perform, on a value corresponding to each of the N keys, an operation indicated by the first operation manner indicator.

25. A data access system, comprising:
an initiator configured to send a first key-value command whose format meets a non-volatile memory express (NVMe) interface standard; and
a target coupled to the initiator and configured to:
receive, from the initiator, the first key-value command whose format meets the NVMe interface standard, wherein the first key-value command carries a first operation manner indicator and a first operation object type indicator, and wherein an operation object type indicated by the first operation object type indicator comprises a value;
obtain N keys corresponding to the first key-value command, wherein N is an integer greater than or equal to one, and wherein the N keys are obtained from buffers to which N key pointers point when the first key-value command carries the N key pointers; and
perform, on a value corresponding to each of the N keys, an operation indicated by the first operation manner indicator.

26. A data access method, comprising:
receiving, by a non-volatile memory express (NVMe) from a processor, a first key-value command whose format meets an NVMe interface standard, wherein the first key-value command comprises a first operation manner and N key pointers, wherein the NVMe is coupled to the processor and a non-volatile memory (NVM), and the processor is coupled to one or more buffers;
obtaining, by the NVMe, N keys from buffers according to N key pointers, wherein N is an integer greater than or equal to one; and
performing, by the NVMe on a value corresponding to each of the N keys, an operation indicated by the first operation manner indicator.

27. The data access method of claim 26, wherein the first key-value command further comprises N value pointers, each value pointer is configure to indicate a storage location of one value corresponding to the value pointer in the buffers, the first operation manner is an obtain value operation, and the performing, on a value corresponding to each of the N keys, an operation indicated by the first operation manner indicator comprises:
obtaining, by the NVMe, N values corresponding to the N keys from a non-volatile memory (NVM); and
writing, by the NVMe, the obtained N values into buffers according to N value pointers point.

28. The data access method of claim 27, wherein before receiving the first key-value command, the data access method further comprises:
receiving, by the NVMe, a second key-value command whose format meets the NVMe interface standard, wherein the second key-value command carries a second operation manner indicator and a second operation object type indicator, wherein an operation indicated by the second operation manner indicator is obtain metadata of value operation, wherein an operation object type indicated by the second operation object type indicator comprises metadata of a value, and wherein the second key-value command further carries N metadata pointers;

obtaining, by the NVMe, the N keys from the buffers to which the N key pointers point when the second key-value command further carries the N key pointers;

searching, by the NVMe, the NVM for metadata of the N metadata of values corresponding to the N keys;

writing, by the NVMe, the metadata of the N metadata of values into buffers to which the N metadata pointers point; wherein metadata of the value corresponding to the key-i in the metadata of the N values is written into a buffer to which a metadata pointer in the N metadata pointers corresponding to the key-i points; wherein the metadata comprises the length of the value.

29. The data access method of claim 26, wherein the obtaining, by the NV Me, N keys from buffers according to N key pointers comprises:

obtaining, by the NVMe, N keys from buffers by using Direct Memory Access (DMA) or Remote Direct Memory Access (DMA) according to N key pointers according to N key pointers.

30. A data access method, comprising:

receiving, by a non-volatile memory express (NVMe), a first key-value command whose format meets an NVMe interface standard, wherein the first key-value command carries a first operation manner indicator and N value keys, and wherein an operation object type indicated by the first operation object type indicator comprises a value;

parsing, by the NVMe, the first key-value command to obtain the N value keys; and performing, by the NVMe on a value corresponding to each of the N keys, an operation indicated by the first operation manner indicator.

* * * * *